US009467480B2

(12) United States Patent
Mandyam et al.

(10) Patent No.: US 9,467,480 B2
(45) Date of Patent: Oct. 11, 2016

(54) SELECTIVELY MULTIPLEXING INCOMING WEBRTC TRAFFIC AND/OR DE-MULTIPLEXING OUTGOING WEBRTC TRAFFIC BY A CLIENT-BASED WEBRTC PROXY ON BEHALF OF A WEBRTC MULTIMEDIA CLIENT APPLICATION

(71) Applicant: QUALCOMM Incorporated, San Diego, CA (US)

(72) Inventors: Giridhar Dhati Mandyam, San Diego, CA (US); Vijay Anandrao Suryavanshi, San Diego, CA (US); Kirankumar Bhoja Anchan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 76 days.

(21) Appl. No.: 14/484,026

(22) Filed: Sep. 11, 2014

(65) Prior Publication Data

US 2015/0078295 A1   Mar. 19, 2015

Related U.S. Application Data

(60) Provisional application No. 61/878,510, filed on Sep. 16, 2013.

(51) Int. Cl.
  *H04W 4/00* (2009.01)
  *H04L 29/06* (2006.01)
  *H04W 72/08* (2009.01)

(52) U.S. Cl.
  CPC .......... *H04L 65/1003* (2013.01); *H04L 65/40* (2013.01); *H04L 65/403* (2013.01); *H04L 65/4038* (2013.01); *H04L 65/4061* (2013.01); *H04L 65/80* (2013.01); *H04W 72/08* (2013.01)

(58) Field of Classification Search
  CPC . H04W 28/04; H04W 72/04; H04W 72/042; H04W 88/08; H04L 5/0007
  See application file for complete search history.

(56) References Cited

U.S. PATENT DOCUMENTS

| 8,560,729 | B2 | 10/2013 | Jabri et al. | |
|---|---|---|---|---|
| 8,861,692 | B1 * | 10/2014 | Phelps | H04M 15/39 370/401 |
| 2006/0291502 | A1 * | 12/2006 | Kalofonos | H04L 12/2856 370/466 |

(Continued)

OTHER PUBLICATIONS

International Search Report and Written Opinion—PCT/US2014/055554—ISA/EPO—Dec. 4, 2014.

(Continued)

*Primary Examiner* — Mark Rinehart
*Assistant Examiner* — Sanjay K Dewan
(74) *Attorney, Agent, or Firm* — Shirin Tefagh

(57) ABSTRACT

In an embodiment, a first WebRTC proxy module on a first UE receives a multiplexed stream from a first WebRTC multimedia client application on the first UE. The first WebRTC proxy module de-multiplexes into at least first and second de-multiplexed streams. The first WebRTC proxy module sends the first de-multiplexed stream to a second WebRTC proxy module on a second UE via a first set of links with QoS, and sends a second de-multiplexed stream to the second WebRTC proxy module on a second set of links. The second WebRTC proxy module re-multiplexes the first and second de-multiplexed streams to obtain either an original or compressed version of the multiplexed stream, and then delivers the re-multiplexed stream to a second WebRTC multimedia client application on the second UE.

35 Claims, 31 Drawing Sheets

(56) References Cited

U.S. PATENT DOCUMENTS

| | | | |
|---|---|---|---|
| 2012/0210010 A1* | 8/2012 | Mensah | H04L 29/12547 709/228 |
| 2012/0287784 A1* | 11/2012 | Shatzkamer | H04W 28/26 370/230.1 |
| 2013/0073743 A1* | 3/2013 | Ramasamy | H04L 67/1027 709/238 |
| 2014/0044123 A1 | 2/2014 | Lawson et al. | |
| 2014/0064071 A1 | 3/2014 | Paladugu et al. | |
| 2014/0064084 A1 | 3/2014 | Paladugu et al. | |
| 2014/0162676 A1* | 6/2014 | Shaw | H04W 76/00 455/452.2 |
| 2014/0376563 A1 | 12/2014 | Suryavanshi | |
| 2015/0078295 A1* | 3/2015 | Mandyam | H04L 65/1003 370/329 |

OTHER PUBLICATIONS

Ivov., et al., "No Plan: Economical Use of the Offer/Answer Model in WebRTC Sessions with Multiple Media Sources; draft-ivov-rtcweb-noplan-01.txt", No Plan: Economical Use of the Offer/Answer Model in WebRTC Sessions With Multiple Media Sources; draft-ivov-rtcweb-noplan-01.txt, Internet Engineering Task Force, IETF; Standardworkingdraft, Internet Society (ISOC) 4, Rue Des Falaises CH-1205 GENEV, Jun. 17, 2013, pp. 1-20, XP015090531, [retrieved on Jun. 17, 2013].

Jennings C., et al., "Real-Time Communications for the Web," 2014, 20 Pages. http://cnds.eecs.jacobs-university.de/courses/acn-2014/enache-webrtc.pdf.

Karadogan G.M., "Evaluating WebSocket and WebRTC in the Context of a Mobile Internet of Things Gateway," KTH Information and Communication Technology, Jan. 12, 2013, pp. 142.

Reddy T., et al., "Considerations with WebRTC in Mobile Networks", The Internet Engineering Task Force, draft-reddy-rtcweb-mobile-03, May 9, 2013, pp. 16.

Singh V., et al., "Performance Analysis of Receive-Side Real-Time Congestion Control for WebRTC," Proceedings of IEEE Packet Video, Dec. 2013, pp. 1-8.

Alvestrand H., "Overview: Real Time Protocols for Browser-Based Applications", The Internet Engineering Task Force, draft-ietf-rtcweb-overview-06, Feb. 20, 2013, 21 Pages.

Bergkvist A., et al., "WebRTC 1.0: Real-time Communication Between Browsers", W3C Editor's Draft, Sep. 10, 2013, 40 Pages.

Perkins C., et al., "Web Real-Time Communication (WebRTC): Media Transport and Use of RTP", The Internet Engineering Task Force. draft-ietf-rtcweb-rtp-usage-07, Jul. 15, 2013, 61 Pages.

* cited by examiner

SELECTIVELY MULTIPLEXING INCOMING WEBRTC TRAFFIC AND/OR DE-MULTIPLEXING OUTGOING WEBRTC TRAFFIC BY A CLIENT-BASED WEBRTC PROXY ON BEHALF OF A WEBRTC MULTIMEDIA CLIENT APPLICATION

CLAIM OF PRIORITY UNDER 35 U.S.C. §119

The present application for patent claims priority to Provisional Application No. 61/878,510, entitled "SELECTIVELY MULTPLEXING INCOMING WEBRTC TRAFFIC AND/OR DE-MULTIPLEXING OUTGOING WEBRTC TRAFFIC BY A CLIENT-BASED WEBRTC PROXY ON BEHALF OF A WEBRTC MULTIMEDIA CLIENT APPLICATION", filed Sep. 16, 2013, by the same inventors as the subject application, assigned to the assignee hereof and hereby expressly incorporated by reference herein in its entirety.

BACKGROUND OF THE INVENTION

1. Field of the Invention

Embodiments of the invention relate to selectively multiplexing incoming Web Real-Time Communication (WebRTC) traffic and/or de-multiplexing outgoing WebRTC traffic by a client-based WebRTC proxy on behalf of a WebRTC multimedia client application.

2. Description of the Related Art

Wireless communication systems have developed through various generations, including a first-generation analog wireless phone service (1G), a second-generation (2G) digital wireless phone service (including interim 2.5G and 2.75G networks) and third-generation (3G) and fourth (4G) high speed data/Internet-capable wireless services. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

More recently, Long Term Evolution (LTE) has been developed as a wireless communications protocol for wireless communication of high-speed data for mobile phones and other data terminals. LTE is based on GSM, and includes contributions from various GSM-related protocols such as Enhanced Data rates for GSM Evolution (EDGE), and Universal Mobile Telecommunications System (UMTS) protocols such as High-Speed Packet Access (HSPA).

The Worldwide Web Consortium (W3C) along with the Internet Engineering Task Force (IETF) started development in 2011 of a web developer technology called Web Real-Time Communication (WebRTC). WebRTC is a protocol that permits a browser (or endpoint) to engage in peer-to-peer (P2P) real-time communication with one or more other endpoints regardless of the relative location of the endpoints (e.g., whether the respective endpoints on the same device, in the same private network, both behind distinct Network Address Translation (NATs) and/or firewalls, etc.).

WebRTC leverages the Real-Time Transport Protocol (RTP) for the transmission of real-time media. RTP is a flexible protocol that can serve as a transport protocol for many different media types. These media types can be broadly classified as mapping to audio or video, or can be more specific by designating information such as an associated audio or video codec, bandwidth requirements, audio or video resolution, etc. Moreover, in a mesh conferencing model, multiple media streams may be sent P2P to enable client-based audio mixing or video compositing.

Because endpoints communicating via WebRTC can be separated by one or more NATs and/or firewalls that limit the number of end-to-end connections between the respective endpoints, WebRTC allows for multiplexing of RTP streams through a single IP address and port. Due in part to this limitation, existing WebRTC specifications recommend that multiplexing be employed for RTP and RTP control protocol (RTCP) communications. When streams of multiple types are multiplexed through one IP address and port, offering differentiated Quality of Service (QoS) to different types of media becomes more challenging.

SUMMARY

In an embodiment, a first WebRTC proxy module on a first UE receives a multiplexed stream from a first WebRTC multimedia client application on the first UE. The first WebRTC proxy module de-multiplexes into at least first and second de-multiplexed streams. The first WebRTC proxy module sends the first de-multiplexed stream to a second WebRTC proxy module on a second UE via a first set of links with QoS, and sends a second de-multiplexed stream to the second WebRTC proxy module on a second set of links. The second WebRTC proxy module re-multiplexes the first and second de-multiplexed streams to obtain either an original or compressed version of the multiplexed stream, and then delivers the re-multiplexed stream to a second WebRTC multimedia client application on the second UE.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
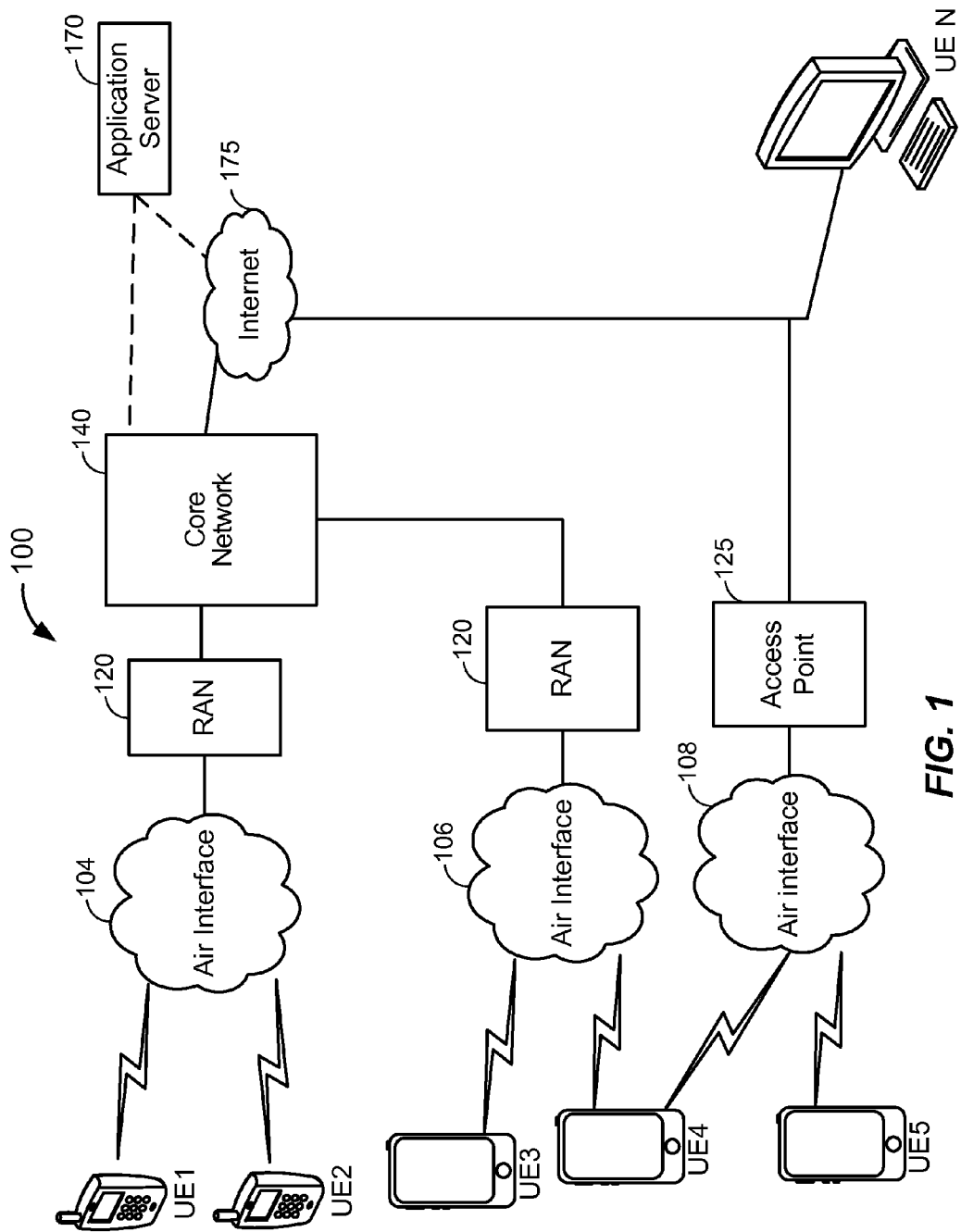
FIG. 1 illustrates a high-level system architecture of a wireless communications system in accordance with an embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile terminal", a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an embodiment of the invention. The wireless communications system 100 contains UEs 1 ... N. The UEs 1 ... N can include cellular telephones, personal digital assistant (PDAs), pagers, a laptop computer, a desktop computer, and so on. For example, in FIG. 1, UEs 1 ... 2 are illustrated as cellular calling phones, UEs 3 ... 5 are illustrated as cellular touchscreen phones or smart phones, and UE N is illustrated as a desktop computer or PC.

Referring to FIG. 1, UEs 1 ... N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UE N and UEs 1 ... N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, an application server 170 is shown as connected to the Internet 175, the core network 140, or both. The application server 170 can be implemented as a plurality of structurally separate servers, or alternately may correspond to a single server. As will be described below in more detail, the application server 170 is configured to support one or more communication services (e.g., Voice-over-Internet Protocol (VoIP) sessions, Push-to-Talk (PTT) sessions, group communication sessions, social networking services, etc.) for UEs that can connect to the application server 170 via the core network 140 and/or the Internet 175.

Examples of protocol-specific implementations for the RAN 120 and the core network 140 are provided below with respect to FIGS. 2A through 2D to help explain the wireless communications system 100 in more detail. In particular, the components of the RAN 120 and the core network 140 corresponds to components associated with supporting packet-switched (PS) communications, whereby legacy circuit-switched (CS) components may also be present in these networks, but any legacy CS-specific components are not shown explicitly in FIGS. 2A-2D.

Figure 2A:
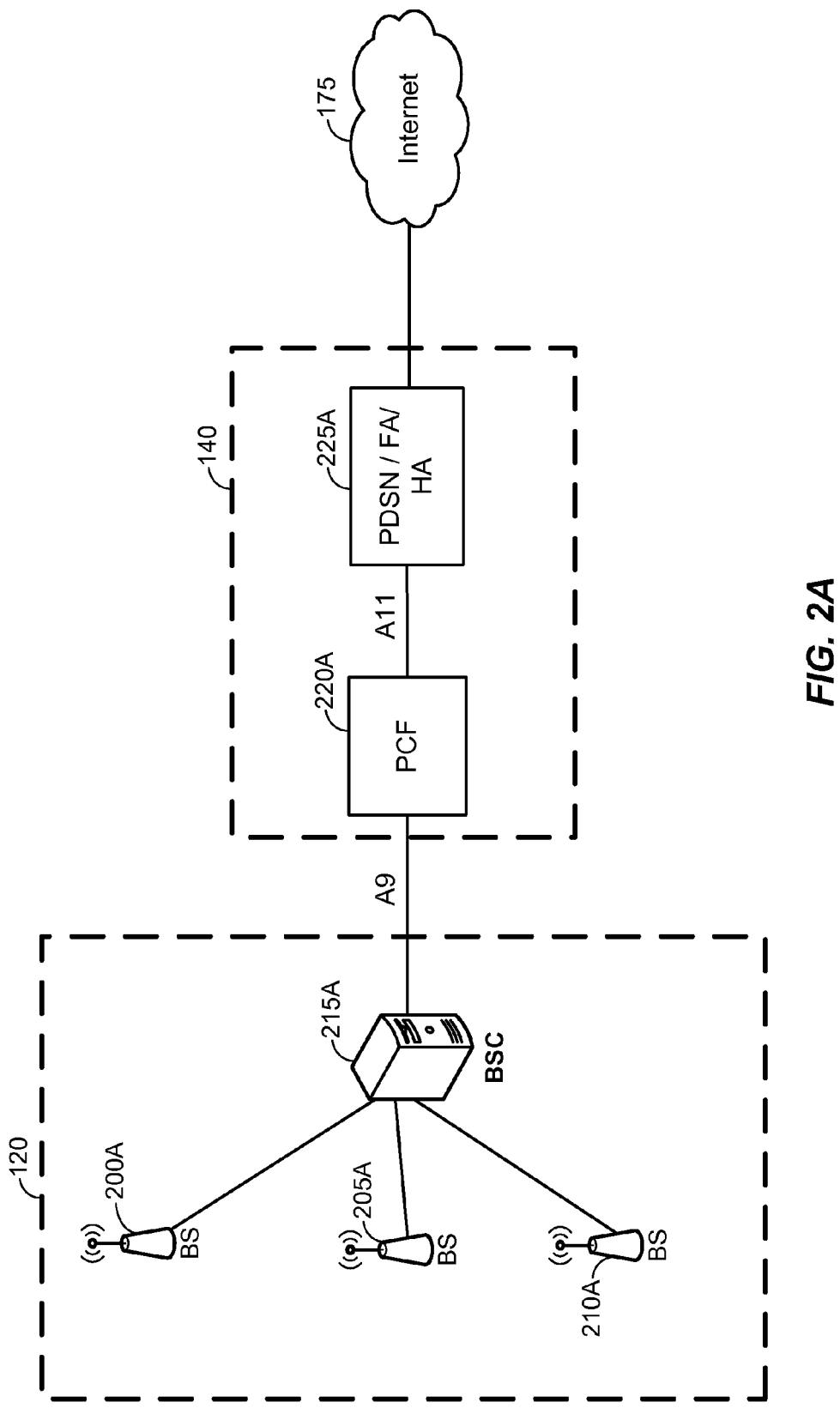
FIG. 2A illustrates an example configuration of a radio access network (RAN) and a packet-switched portion of a core network for a 1× EV-DO network in accordance with an embodiment of the invention.

FIG. 2A illustrates an example configuration of the RAN 120 and the core network 140 for packet-switched communications in a CDMA2000 1× Evolution-Data Optimized (EV-DO) network in accordance with an embodiment of the invention. Referring to FIG. 2A, the RAN 120 includes a plurality of base stations (BSs) 200A, 205A and 210A that are coupled to a base station controller (BSC) 215A over a wired backhaul interface. A group of BSs controlled by a single BSC is collectively referred to as a subnet. As will be appreciated by one of ordinary skill in the art, the RAN 120 can include multiple BSCs and subnets, and a single BSC is shown in FIG. 2A for the sake of convenience. The BSC 215A communicates with a packet control function (PCF) 220A within the core network 140 over an A9 connection. The PCF 220A performs certain processing functions for the BSC 215A related to packet data. The PCF 220A communicates with a Packet Data Serving Node (PDSN) 225A within the core network 140 over an A11 connection. The PDSN 225A has a variety of functions, including managing Point-to-Point (PPP) sessions, acting as a home agent (HA) and/or foreign agent (FA), and is similar in function to a Gateway General Packet Radio Service (GPRS) Support Node (GGSN) in GSM and UMTS networks (described below in more detail). The PDSN 225A connects the core network 140 to external IP networks, such as the Internet 175.

Figure 2B:
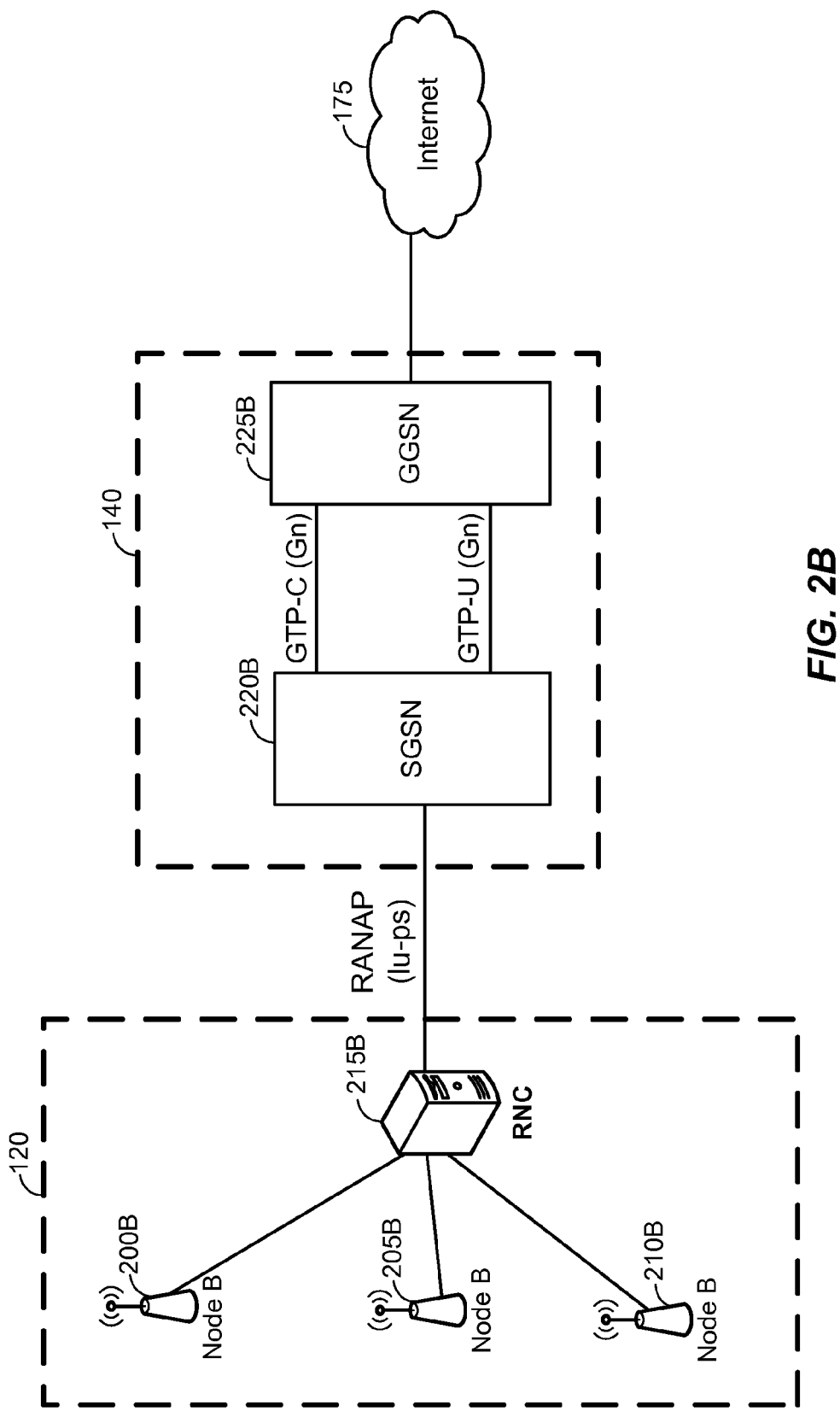
FIG. 2B illustrates an example configuration of the RAN and a packet-switched portion of a General Packet Radio Service (GPRS) core network within a 3G UMTS W-CDMA system in accordance with an embodiment of the invention.

FIG. 2B illustrates an example configuration of the RAN 120 and a packet-switched portion of the core network 140 that is configured as a GPRS core network within a 3G UMTS W-CDMA system in accordance with an embodiment of the invention. Referring to FIG. 2B, the RAN 120 includes a plurality of Node Bs 200B, 205B and 210B that are coupled to a Radio Network Controller (RNC) 215B over a wired backhaul interface. Similar to 1× EV-DO networks, a group of Node Bs controlled by a single RNC is collectively referred to as a subnet. As will be appreciated by one of ordinary skill in the art, the RAN 120 can include multiple RNCs and subnets, and a single RNC is shown in FIG. 2B for the sake of convenience. The RNC 215B is responsible for signaling, establishing and tearing down bearer channels (i.e., data channels) between a Serving GPRS Support Node (SGSN) 220B in the core network 140 and UEs served by the RAN 120. If link layer encryption is enabled, the RNC 215B also encrypts the content before forwarding it to the RAN 120 for transmission over an air interface. The function of the RNC 215B is well-known in the art and will not be discussed further for the sake of brevity.

In FIG. 2B, the core network 140 includes the above-noted SGSN 220B (and potentially a number of other SGSNs as well) and a GGSN 225B. Generally, GPRS is a protocol used in GSM for routing IP packets. The GPRS core network (e.g., the GGSN 225B and one or more SGSNs 220B) is the centralized part of the GPRS system and also provides support for W-CDMA based 3G access networks. The GPRS core network is an integrated part of the GSM core network (i.e., the core network 140) that provides mobility management, session management and transport for IP packet services in GSM and W-CDMA networks.

The GPRS Tunneling Protocol (GTP) is the defining IP protocol of the GPRS core network. The GTP is the protocol which allows end users (e.g., UEs) of a GSM or W-CDMA network to move from place to place while continuing to connect to the Internet 175 as if from one location at the GGSN 225B. This is achieved by transferring the respective UE's data from the UE's current SGSN 220B to the GGSN 225B, which is handling the respective UE's session.

Three forms of GTP are used by the GPRS core network; namely, (i) GTP-U, (ii) GTP-C and (iii) GTP' (GTP Prime). GTP-U is used for transfer of user data in separated tunnels for each packet data protocol (PDP) context. GTP-C is used for control signaling (e.g., setup and deletion of PDP contexts, verification of GSN reach-ability, updates or modifications such as when a subscriber moves from one SGSN to another, etc.). GTP' is used for transfer of charging data from GSNs to a charging function.

Referring to FIG. 2B, the GGSN 225B acts as an interface between a GPRS backbone network (not shown) and the Internet 175. The GGSN 225B extracts packet data with associated a packet data protocol (PDP) format (e.g., IP or PPP) from GPRS packets coming from the SGSN 220B, and sends the packets out on a corresponding packet data network. In the other direction, the incoming data packets are directed by the GGSN connected UE to the SGSN 220B which manages and controls the Radio Access Bearer (RAB) of a target UE served by the RAN 120. Thereby, the GGSN 225B stores the current SGSN address of the target UE and its associated profile in a location register (e.g., within a PDP context). The GGSN 225B is responsible for IP address assignment and is the default router for a connected UE. The GGSN 225B also performs authentication and charging functions.

The SGSN 220B is representative of one of many SGSNs within the core network 140, in an example. Each SGSN is responsible for the delivery of data packets from and to the UEs within an associated geographical service area. The tasks of the SGSN 220B includes packet routing and transfer, mobility management (e.g., attach/detach and location management), logical link management, and authentication and charging functions. The location register of the SGSN 220B stores location information (e.g., current cell, current VLR) and user profiles (e.g., IMSI, PDP address(es) used in the packet data network) of all GPRS users registered with the SGSN 220B, for example, within one or more PDP contexts for each user or UE. Thus, SGSNs 220B are responsible for (i) de-tunneling downlink GTP packets from the GGSN 225B, (ii) uplink tunnel IP packets toward the GGSN 225B, (iii) carrying out mobility management as UEs move between SGSN service areas and (iv) billing mobile subscribers. As will be appreciated by one of ordinary skill in the art, aside from (i)-(iv), SGSNs configured for GSM/EDGE networks have slightly different functionality as compared to SGSNs configured for W-CDMA networks.

The RAN 120 (e.g., or UTRAN, in UMTS system architecture) communicates with the SGSN 220B via a Radio Access Network Application Part (RANAP) protocol. RANAP operates over a Iu interface (Iu-ps), with a transmission protocol such as Frame Relay or IP. The SGSN 220B communicates with the GGSN 225B via a Gn interface, which is an IP-based interface between SGSN 220B and other SGSNs (not shown) and internal GGSNs (not shown), and uses the GTP protocol defined above (e.g., GTP-U, GTP-C, GTP', etc.). In the embodiment of FIG. 2B, the Gn between the SGSN 220B and the GGSN 225B carries both the GTP-C and the GTP-U. While not shown in FIG. 2B, the Gn interface is also used by the Domain Name System (DNS). The GGSN 225B is connected to a Public Data Network (PDN) (not shown), and in turn to the Internet 175, via a Gi interface with IP protocols either directly or through a Wireless Application Protocol (WAP) gateway.

Figure 2C:
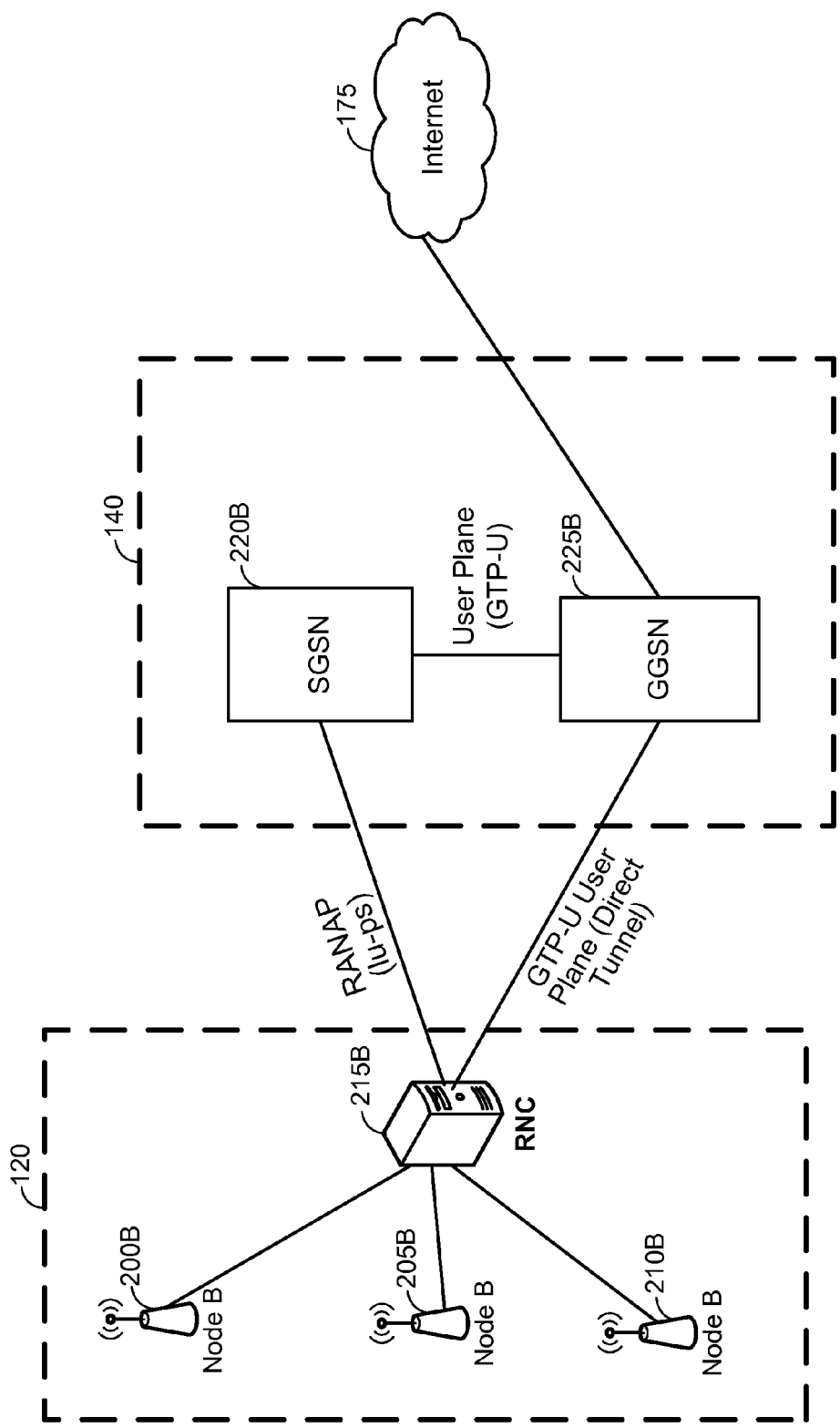
FIG. 2C illustrates another example configuration of the RAN and a packet-switched portion of a GPRS core network within a 3G UMTS W-CDMA system in accordance with an embodiment of the invention.

FIG. 2C illustrates another example configuration of the RAN 120 and a packet-switched portion of the core network 140 that is configured as a GPRS core network within a 3G UMTS W-CDMA system in accordance with an embodiment of the invention. Similar to FIG. 2B, the core network 140 includes the SGSN 220B and the GGSN 225B. However, in FIG. 2C, Direct Tunnel is an optional function in Iu mode that allows the SGSN 220B to establish a direct user plane tunnel, GTP-U, between the RAN 120 and the GGSN 225B within a PS domain. A Direct Tunnel capable SGSN, such as SGSN 220B in FIG. 2C, can be configured on a per GGSN and per RNC basis whether or not the SGSN 220B can use a direct user plane connection. The SGSN 220B in FIG. 2C handles the control plane signaling and makes the decision of when to establish Direct Tunnel. When the RAB assigned for a PDP context is released (i.e. the PDP context is preserved) the GTP-U tunnel is established between the GGSN 225B and SGSN 220B in order to be able to handle the downlink packets.

Figure 2D:
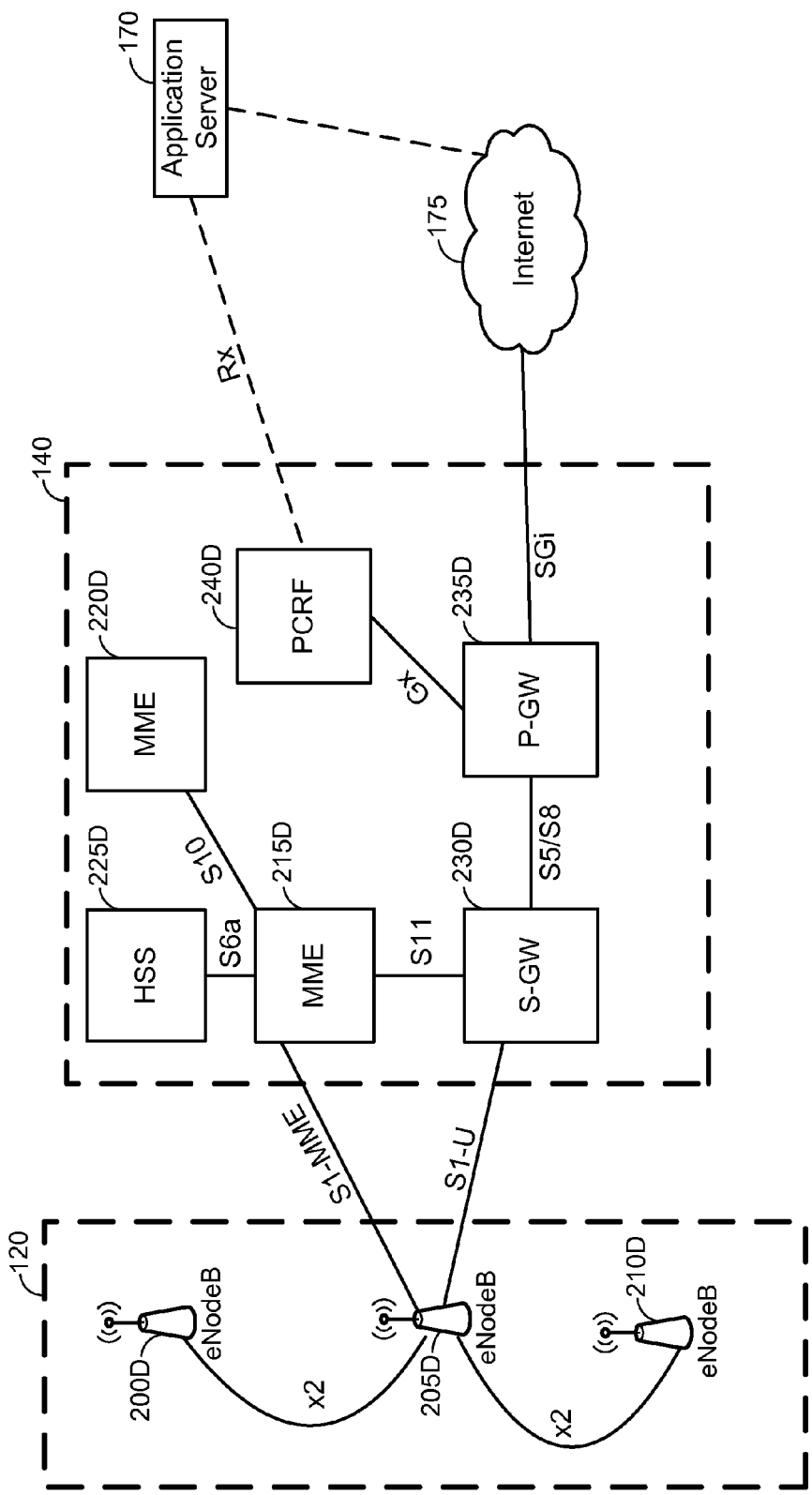
FIG. 2D illustrates an example configuration of the RAN and a packet-switched portion of the core network that is based on an Evolved Packet System (EPS) or Long Term Evolution (LTE) network in accordance with an embodiment of the invention.

FIG. 2D illustrates an example configuration of the RAN 120 and a packet-switched portion of the core network 140 based on an Evolved Packet System (EPS) or LTE network, in accordance with an embodiment of the invention. Referring to FIG. 2D, unlike the RAN 120 shown in FIGS. 2B-2C, the RAN 120 in the EPS/LTE network is configured with a plurality of Evolved Node Bs (ENodeBs or eNBs) 200D, 205D and 210D, without the RNC 215B from FIGS. 2B-2C. This is because ENodeBs in EPS/LTE networks do not require a separate controller (i.e., the RNC 215B) within the RAN 120 to communicate with the core network 140. In other words, some of the functionality of the RNC 215B from FIGS. 2B-2C is built into each respective eNodeB of the RAN 120 in FIG. 2D.

In FIG. 2D, the core network 140 includes a plurality of Mobility Management Entities (MMEs) 215D and 220D, a Home Subscriber Server (HSS) 225D, a Serving Gateway (S-GW) 230D, a Packet Data Network Gateway (P-GW) 235D and a Policy and Charging Rules Function (PCRF) 240D. Network interfaces between these components, the RAN 120 and the Internet 175 are illustrated in FIG. 2D and are defined in Table 1 (below) as follows:

TABLE 1

EPS/LTE Core Network Connection Definitions

| Network Interface | Description |
|---|---|
| S1-MME | Reference point for the control plane protocol between RAN 120 and MME 215D. |
| S1-U | Reference point between RAN 120 and S-GW 230D for the per bearer user plane tunneling and inter-eNodeB path switching during handover. |
| S5 | Provides user plane tunneling and tunnel management between S-GW 230D and P-GW 235D. It is used for S-GW relocation due to UE mobility and if the S-GW 230D needs to connect to a non-collocated P-GW for the required PDN connectivity. |
| S6a | Enables transfer of subscription and authentication data for authenticating/authorizing user access to the evolved system (Authentication, Authorization, and Accounting [AAA] interface) between MME 215D and HSS 225D. |
| Gx | Provides transfer of Quality of Service (QoS) policy and charging rules from PCRF 240D to Policy and Charging Enforcement Function (PCEF) component (not shown) in the P-GW 235D. |
| S8 | Inter-PLMN reference point providing user and control plane between the S-GW 230D in a Visited Public Land Mobile Network (VPLMN) and the P-GW 235D in a Home Public Land Mobile Network (HPLMN). S8 is the inter-PLMN variant of S5. |
| S10 | Reference point between MMEs 215D and 220D for MME relocation and MME to MME information transfer. |
| S11 | Reference point between MME 215D and S-GW 230D. |
| SGi | Reference point between the P-GW 235D and the packet data network, shown in FIG. 2D as the Internet 175. The Packet data network may be an operator external public or private packet data network or an intra-operator packet data network (e.g., for provision of IMS services). This reference point corresponds to Gi for 3GPP accesses. |
| X2 | Reference point between two different eNodeBs used for UE handoffs. |
| Rx | Reference point between the PCRF 240D and an application function (AF) that is used to exchanged application-level session information, where the AF is represented in FIG. 1 by the application server 170. |

A high-level description of the components shown in the RAN 120 and core network 140 of FIG. 2D will now be described. However, these components are each well-known in the art from various 3GPP TS standards, and the description contained herein is not intended to be an exhaustive description of all functionalities performed by these components.

Referring to FIG. 2D, the MMEs 215D and 220D are configured to manage the control plane signaling for the EPS bearers. MME functions include: Non-Access Stratum (NAS) signaling, NAS signaling security, Mobility management for inter- and intra-technology handovers, P-GW and S-GW selection, and MME selection for handovers with MME change.

Referring to FIG. 2D, the S-GW 230D is the gateway that terminates the interface toward the RAN 120. For each UE associated with the core network 140 for an EPS-based system, at a given point of time, there is a single S-GW. The functions of the S-GW 230D, for both the GTP-based and the Proxy Mobile IPv6 (PMIP)-based S5/S8, include: Mobility anchor point, Packet routing and forwarding, and setting the DiffServ Code Point (DSCP) based on a QoS Class Identifier (QCI) of the associated EPS bearer.

Referring to FIG. 2D, the P-GW 235D is the gateway that terminates the SGi interface toward the Packet Data Network (PDN), e.g., the Internet 175. If a UE is accessing multiple PDNs, there may be more than one P-GW for that UE; however, a mix of S5/S8 connectivity and Gn/Gp connectivity is not typically supported for that UE simultaneously. P-GW functions include for both the GTP-based S5/S8: Packet filtering (by deep packet inspection), UE IP address allocation, setting the DSCP based on the QCI of the associated EPS bearer, accounting for inter operator charging, uplink (UL) and downlink (DL) bearer binding as defined in 3GPP TS 23.203, UL bearer binding verification as defined in 3GPP TS 23.203. The P-GW 235D provides PDN connectivity to both GSM/EDGE Radio Access Network (GERAN)/UTRAN only UEs and E-UTRAN-capable UEs using any of E-UTRAN, GERAN, or UTRAN. The P-GW 235D provides PDN connectivity to E-UTRAN capable UEs using E-UTRAN only over the S5/S8 interface.

Referring to FIG. 2D, the PCRF 240D is the policy and charging control element of the EPS-based core network 140. In a non-roaming scenario, there is a single PCRF in the HPLMN associated with a UE's Internet Protocol Connectivity Access Network (IP-CAN) session. The PCRF terminates the Rx interface and the Gx interface. In a roaming scenario with local breakout of traffic, there may be two PCRFs associated with a UE's IP-CAN session: A Home PCRF (H-PCRF) is a PCRF that resides within a HPLMN, and a Visited PCRF (V-PCRF) is a PCRF that resides within a visited VPLMN. PCRF is described in more detail in 3GPP TS 23.203, and as such will not be described further for the sake of brevity. In FIG. 2D, the application server 170 (e.g., which can be referred to as the AF in 3GPP terminology) is shown as connected to the core network 140 via the Internet 175, or alternatively to the PCRF 240D directly via an Rx interface. Generally, the application server 170 (or AF) is an element offering applications that use IP bearer resources with the core network (e.g. UMTS PS domain/GPRS domain resources/LTE PS data services). One example of an application function is the Proxy-Call Session Control Function (P-CSCF) of the IP Multimedia Subsystem (IMS) Core Network sub system. The AF uses the Rx reference point to provide session information to the PCRF 240D. Any other application server offering IP data services over cellular network can also be connected to the PCRF 240D via the Rx reference point.

Figure 2E:
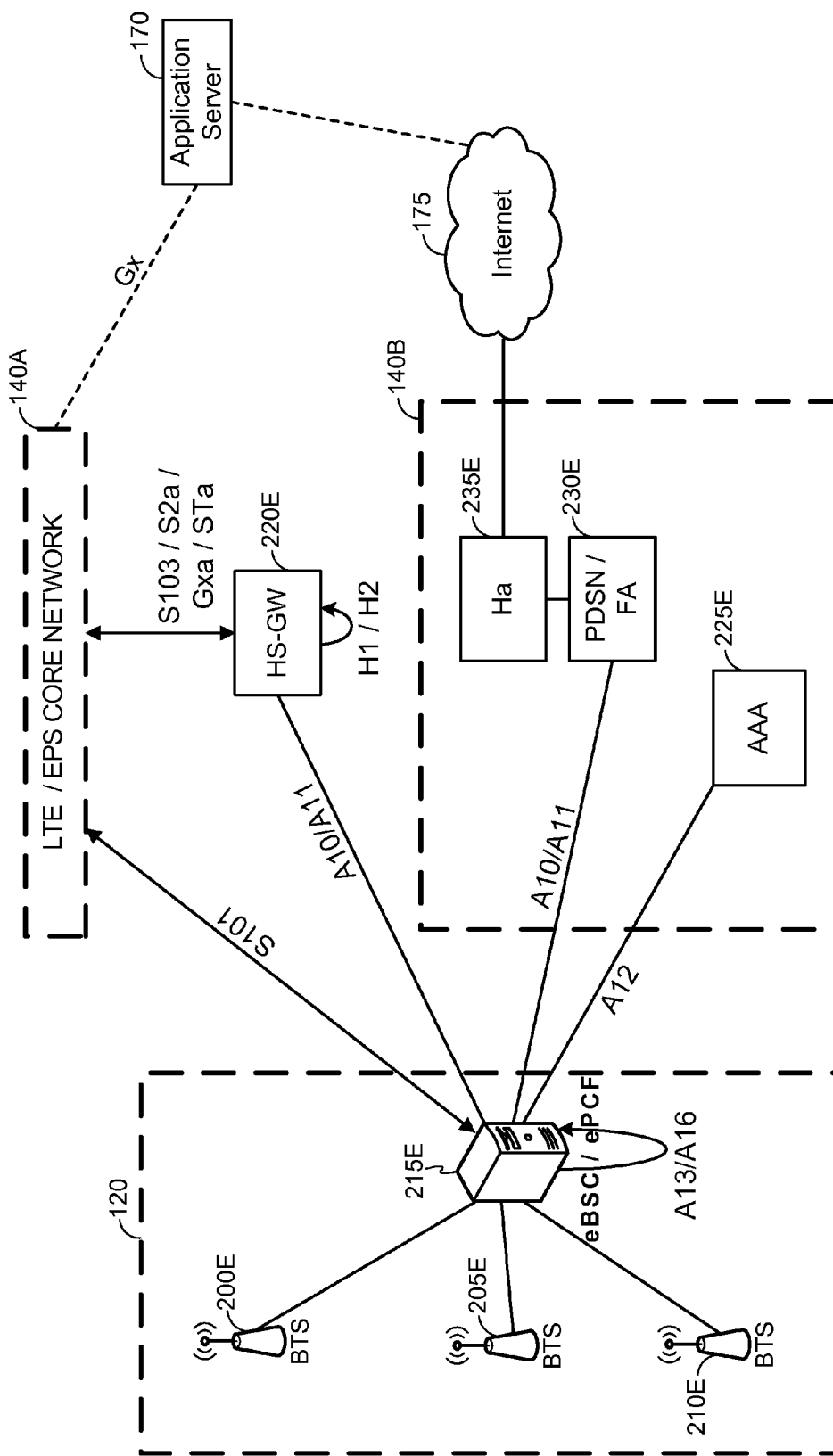
FIG. 2E illustrates an example configuration of the enhanced High Rate Packet Data (HRPD) RAN connected to an EPS or LTE network and also a packet-switched portion of an HRPD core network in accordance with an embodiment of the invention.

FIG. 2E illustrates an example of the RAN 120 configured as an enhanced High Rate Packet Data (HRPD) RAN connected to an EPS or LTE network 140A and also a packet-switched portion of an HRPD core network 140B in accordance with an embodiment of the invention. The core network 140A is an EPS or LTE core network, similar to the core network described above with respect to FIG. 2D.

In FIG. 2E, the eHRPD RAN includes a plurality of base transceiver stations (BTSs) 200E, 205E and 210E, which are connected to an enhanced BSC (eBSC) and enhanced PCF (ePCF) 215E. The eBSC/ePCF 215E can connect to one of the MMEs 215D or 220D within the EPS core network 140A over an S101 interface, and to an HRPD serving gateway (HSGW) 220E over A10 and/or A11 interfaces for interfacing with other entities in the EPS core network 140A (e.g., the S-GW 230D over an S103 interface, the P-GW 235D over an S2a interface, the PCRF 240D over a Gxa interface, a 3GPP AAA server (not shown explicitly in FIG. 2D) over an STa interface, etc.). The HSGW 220E is defined in 3GPP2 to provide the interworking between HRPD networks and EPS/LTE networks. As will be appreciated, the eHRPD RAN and the HSGW 220E are configured with interface functionality to EPC/LTE networks that is not available in legacy HRPD networks.

Turning back to the eHRPD RAN, in addition to interfacing with the EPS/LTE network 140A, the eHRPD RAN can also interface with legacy HRPD networks such as HRPD network 140B. As will be appreciated the HRPD network 140B is an example implementation of a legacy HRPD network, such as the EV-DO network from FIG. 2A. For example, the eBSC/ePCF 215E can interface with an authentication, authorization and accounting (AAA) server 225E via an A12 interface, or to a PDSN/FA 230E via an A10 or A11 interface. The PDSN/FA 230E in turn connects to HA 235E, through which the Internet 175 can be accessed. In FIG. 2E, certain interfaces (e.g., A13, A16, H1, H2, etc.) are not described explicitly but are shown for completeness and would be understood by one of ordinary skill in the art familiar with HRPD or eHRPD.

Referring to FIGS. 2B-2E, it will be appreciated that LTE core networks (e.g., FIG. 2D) and HRPD core networks that interface with eHRPD RANs and HSGWs (e.g., FIG. 2E) can support network-initiated Quality of Service (QoS) (e.g., by the P-GW, GGSN, SGSN, etc.) in certain cases.

Figure 3:
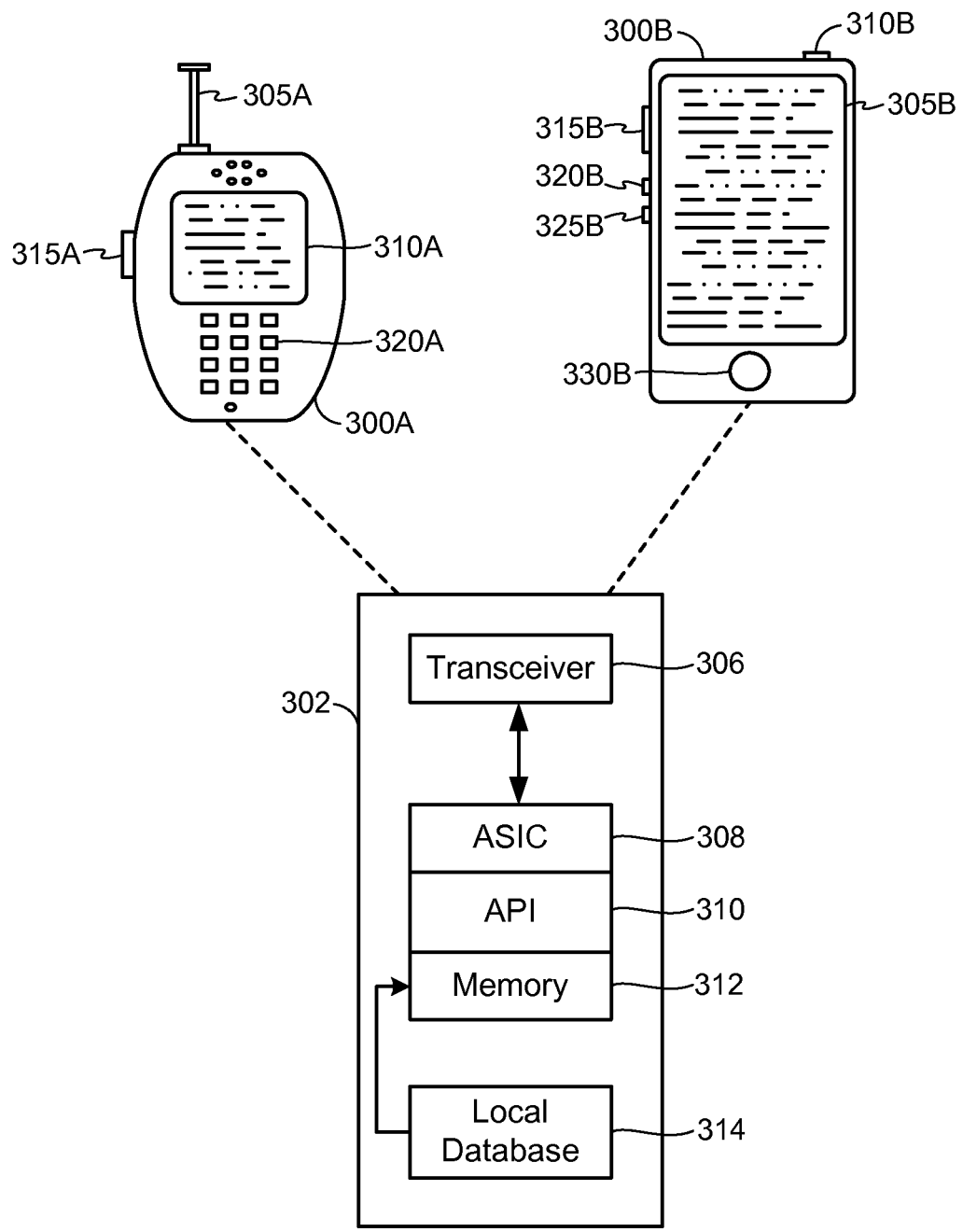
FIG. 3 illustrates examples of user equipments (UEs) in accordance with embodiments of the invention.

FIG. 3 illustrates examples of UEs in accordance with embodiments of the invention. Referring to FIG. 3, UE 300A is illustrated as a calling telephone and UE 300B is illustrated as a touchscreen device (e.g., a smart phone, a tablet computer, etc.). As shown in FIG. 3, an external casing of UE 300A is configured with an antenna 305A, display 310A, at least one button 315A (e.g., a PTT button, a power button, a volume control button, etc.) and a keypad 320A among other components, as is known in the art. Also, an external casing of UE 300B is configured with a touchscreen display 305B, peripheral buttons 310B, 315B, 320B and 325B (e.g., a power control button, a volume or vibrate control button, an airplane mode toggle button, etc.), at least one front-panel button 330B (e.g., a Home button, etc.), among other components, as is known in the art. While not shown explicitly as part of UE 300B, the UE 300B can include one or more external antennas and/or one or more integrated antennas that are built into the external casing of UE 300B, including but not limited to WiFi antennas, cellular antennas, satellite position system (SPS) antennas (e.g., global positioning system (GPS) antennas), and so on.

While internal components of UEs such as the UEs 300A and 300B can be embodied with different hardware configurations, a basic high-level UE configuration for internal hardware components is shown as platform 302 in FIG. 3. The platform 302 can receive and execute software applications, data and/or commands transmitted from the RAN 120 that may ultimately come from the core network 140, the Internet 175 and/or other remote servers and networks (e.g., application server 170, web URLs, etc.). The platform 302 can also independently execute locally stored applications without RAN interaction. The platform 302 can include a transceiver 306 operably coupled to an application specific integrated circuit (ASIC) 308, or other processor, microprocessor, logic circuit, or other data processing device. The ASIC 308 or other processor executes the application programming interface (API) 310 layer that interfaces with any resident programs in the memory 312 of the wireless device. The memory 312 can be comprised of read-only or random-access memory (RAM and ROM), EEPROM, flash cards, or any memory common to computer platforms. The platform 302 also can include a local database 314 that can store applications not actively used in memory 312, as well as other data. The local database 314 is typically a flash memory cell, but can be any secondary storage device as known in the art, such as magnetic media, EEPROM, optical media, tape, soft or hard disk, or the like.

Accordingly, an embodiment of the invention can include a UE (e.g., UE 300A, 300B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 308, memory 312, API 310 and local database 314 may all be used cooperatively to load, store and execute the various functions disclosed herein and thus the logic to perform these functions may be distributed over various elements. Alternatively, the functionality could be incorporated into one discrete component. Therefore, the features of the UEs 300A and 300B in FIG. 3 are to be considered merely illustrative and the invention is not limited to the illustrated features or arrangement.

The wireless communication between the UEs 300A and/or 300B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Figure 4:
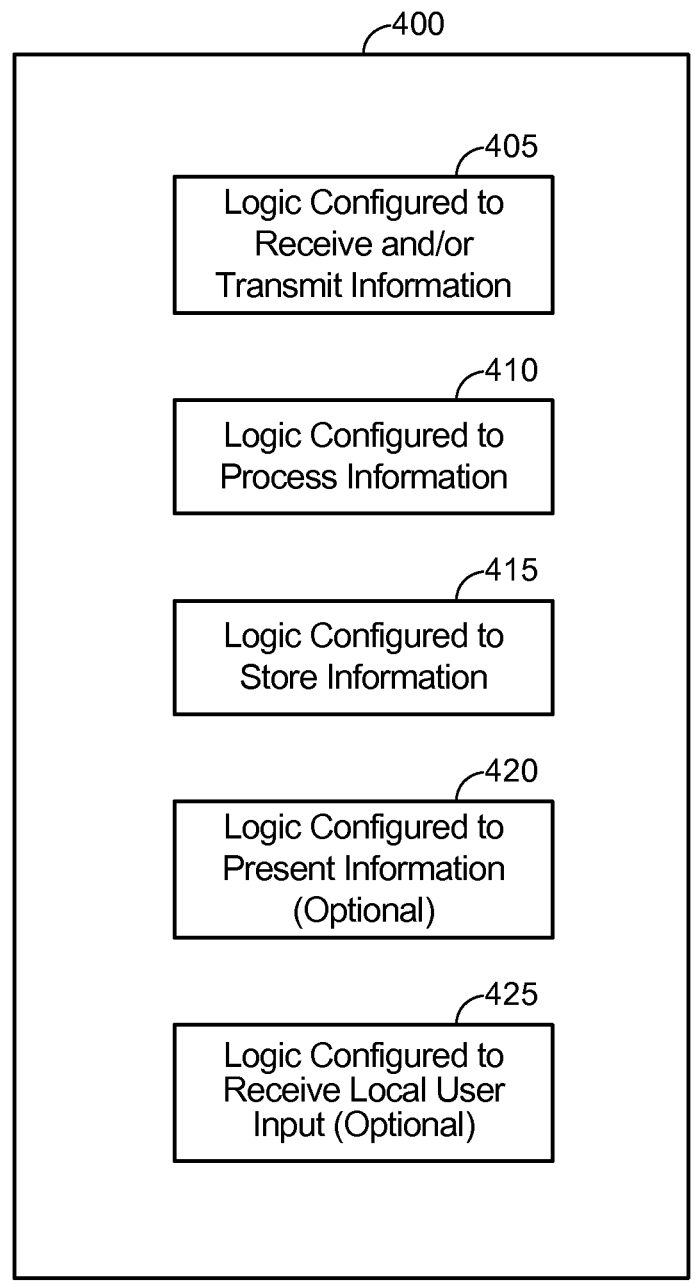
FIG. 4 illustrates a communication device that includes logic configured to perform functionality in accordance with an embodiment of the invention.

FIG. 4 illustrates a communication device 400 that includes logic configured to perform functionality. The communication device 400 can correspond to any of the above-noted communication devices, including but not limited to UEs 300A or 300B, any component of the RAN 120

(e.g., BSs 200A through 210A, BSC 215A, Node Bs 200B through 210B, RNC 215B, eNodeBs 200D through 210D, etc.), any component of the core network 140 (e.g., PCF 220A, PDSN 225A, SGSN 220B, GGSN 225B, MME 215D or 220D, HSS 225D, S-GW 230D, P-GW 235D, PCRF 240D), any components coupled with the core network 140 and/or the Internet 175 (e.g., the application server 170), and so on. Thus, communication device 400 can correspond to any electronic device that is configured to communicate with (or facilitate communication with) one or more other entities over the wireless communications system 100 of FIG. 1.

Referring to FIG. 4, the communication device 400 includes logic configured to receive and/or transmit information 405. In an example, if the communication device 400 corresponds to a wireless communications device (e.g., UE 300A or 300B, one of BSs 200A through 210A, one of Node Bs 200B through 210B, one of eNodeBs 200D through 210D, etc.), the logic configured to receive and/or transmit information 405 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 405 can correspond to a wired communications interface (e.g., a serial connection, a USB or Firewire connection, an Ethernet connection through which the Internet 175 can be accessed, etc.). Thus, if the communication device 400 corresponds to some type of network-based server (e.g., PDSN, SGSN, GGSN, S-GW, P-GW, MME, HSS, PCRF, the application 170, etc.), the logic configured to receive and/or transmit information 405 can correspond to an Ethernet card, in an example, that connects the network-based server to other communication entities via an Ethernet protocol. In a further example, the logic configured to receive and/or transmit information 405 can include sensory or measurement hardware by which the communication device 400 can monitor its local environment (e.g., an accelerometer, a temperature sensor, a light sensor, an antenna for monitoring local RF signals, etc.). The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 4, the communication device 400 further includes logic configured to process information 410. In an example, the logic configured to process information 410 can include at least a processor. Example implementations of the type of processing that can be performed by the logic configured to process information 410 includes but is not limited to performing determinations, establishing connections, making selections between different information options, performing evaluations related to data, interacting with sensors coupled to the communication device 400 to perform measurement operations, converting information from one format to another (e.g., between different protocols such as .wmv to .avi, etc.), and so on. For example, the processor included in the logic configured to process information 410 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 4, the communication device 400 further includes logic configured to store information 415. In an example, the logic configured to store information 415 can include at least a non-transitory memory and associated hardware (e.g., a memory controller, etc.). For example, the non-transitory memory included in the logic configured to store information 415 can correspond to RAM memory, flash memory, ROM memory, EPROM memory, EEPROM memory, registers, hard disk, a removable disk, a CD-ROM, or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 4, the communication device 400 further optionally includes logic configured to present information 420. In an example, the logic configured to present information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 400. For example, if the communication device 400 corresponds to UE 300A or UE 300B as shown in FIG. 3, the logic configured to present information 420 can include the display 310A of UE 300A or the touchscreen display 305B of UE 300B. In a further example, the logic configured to present information 420 can be omitted for certain communication devices, such as network communication devices that do not have a local user (e.g., network switches or routers, remote servers, etc.). The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 4, the communication device 400 further optionally includes logic configured to receive local user input 425. In an example, the logic configured to receive local user input 425 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 400. For example, if the communication device 400 corresponds to UE 300A or UE 300B as shown in FIG. 3, the logic configured to receive local user input 425 can include the keypad 320A, any of the buttons 315A or 310B through 325B, the touchscreen display 305B, etc. In a further example, the logic configured to receive local user input 425 can be omitted for certain communication devices, such as network communication devices that do not have a local user (e.g., network switches or routers, remote servers, etc.). The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 4, while the configured logics of 405 through 425 are shown as separate or distinct blocks in FIG. 4, it will be appreciated that the hardware and/or software by which the respective configured logic performs its functionality can overlap in part. For example, any software used to facilitate the functionality of the configured logics of 405 through 425 can be stored in the non-transitory memory associated with the logic configured to store information 415, such that the configured logics of 405 through 425 each performs their functionality (i.e., in this case, software execution) based in part upon the operation of software stored by the logic configured to store information 415. Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410.

Generally, unless stated otherwise explicitly, the phrase "logic configured to" as used throughout this disclosure is intended to invoke an embodiment that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

Sessions that operate over networks such as 1× EV-DO in FIG. 2A, UMTS-based W-CDMA in FIGS. 2B-2C, LTE in FIG. 2D and eHRPD in FIG. 2E can be supported on channels (e.g. RABs, flows, etc.) for which a guaranteed quality level is reserved, which is referred to as Quality of Service (QoS). For example, establishing a given level of QoS on a particular channel may provide one or more of a minimum guaranteed bit rate (GBR) on that channel, a maximum delay, jitter, latency, bit error rate (BER), and so on. QoS resources can be reserved (or setup) for channels associated with real-time or streaming communication sessions, such as Voice-over IP (VoIP) sessions, group communication sessions (e.g., PTT sessions, etc.), online games, IP TV, and so on, to help ensure seamless end-to-end packet transfer for these sessions.

Conventionally, when a QoS bearer is setup or activated for a communication session associated with a particular application (e.g., VoIP, PTT, etc.), denoted herein as App*, QoS is setup on both uplink and downlink channels for the entire duration of the communication session. However, as will be appreciated by one of ordinary skill in the art, a client application on a given UE participating in the App* communication session may not have high-priority traffic to transmit and/or receive on both the uplink and downlink channels for the communication sessions continuously and/or concurrently.

For example, in a half-duplex App* communication session (e.g., a 1:1 or direct call, or a group call such as PTT), a floorholder may have high-priority traffic to transmit on the uplink channel (i.e., to the non-floorholders), but the floorholder will not typically have high-priority traffic to receive on the downlink channel due to the half-duplex nature of the App* session. Similarly, in the half-duplex App* communication session noted above, non-floorholder(s) may have high-priority traffic to receive on the downlink channel (i.e., from the floorholder), but the non-floorholder(s) will not typically have high-priority traffic to transmit on the uplink channel due to the half-duplex nature of the App* session. Further, during a half-duplex App* session, there are times when no one holds the floor (e.g., no high-priority traffic in either direction, except for floor-requests). Turning to full-duplex App* communication sessions (e.g., a 1:1 or direct call), a given party in the call may have their session muted or may simply not be talking, so that the given party does not have high-priority traffic to transmit on the uplink channel. As will be appreciated, during at least a portion of the half-duplex or full-duplex App* sessions noted above, reserving QoS for the respective session participant in both directions (i.e., uplink and downlink) continuously throughout the App* communication session can be inefficient, because each QoS reservation reduces the overall resource capacity of the system 100.

Accordingly, embodiments of the invention relate to selectively increasing or decreasing an allocation of QoS resources to uplink and/or downlink channels for an App* communication session in a dynamic manner based on a direction (e.g., uplink and/or downlink) that high-priority traffic is expected to flow (or is actually flowing) during the App* communication session. In particular, the embodiments of the invention described below are directed to QoS-based communication sessions that are configured to be arbitrated by the application server 170 across one or more of the core networks shown in FIGS. 2A through 2E above.

For example, in a case where the QoS-based App* communication sessions correspond to VoIP sessions that are mediated between one or more UEs over the 1× EV-DO core network shown in FIG. 2A, each VoIP session managed by the application server 170 may be associated with three (3) flows that are potentially allocated QoS (i.e., a call setup signaling flow, an incall signaling flow and a media traffic flow). The 1× EV-DO core network does not recognize GBR QoS as a reservable parameter, such that QoS setup for EV-DO is implemented at the RAN 120.

In another example, in a case where the QoS-based App* communication sessions correspond to VoIP sessions that are mediated between one or more UEs over a UMTS-based W-CDMA core network as shown in FIG. 2B or FIG. 2C, each VoIP session can be configured with an 'Interactive' traffic class QoS and can receive the GBR QoS at the RAN 120 (i.e., the UTRAN) and over the air-interface by configuring the MAC-es/MAC-hs GBR, and, using non-scheduled Transmission Grant for UL. Similar to the example above related to the 1× EV-DO core network, the GBR QoS resources are not reserved and cannot be configured in the W-CDMA core network of FIGS. 2B-2C for the "Interactive" traffic class (only the RAN 120) because the W-CDMA core network does not recognize GBR QoS as a reservable parameter, such that only the logical connections are maintained. Alternatively, when the "Conversational" traffic class is used instead of the "Interactive" traffic class, GBR QoS resources can be negotiated/modified by both the UE and the W-CDMA core network. Typically, VoIP sessions use the "Conversational" traffic class in W-CDMA.

In another example, in a case where the QoS-based App* communication sessions correspond to VoIP sessions that are mediated between one or more UEs over the LTE core network shown in FIG. 2D, the VoIP sessions managed by the application server 170 use a QoS Class Identifier (QCI) of "1" or an application-specific QCI for the App* GBR QoS bearer (denoted as $QCI_{App*}$) on a dedicated application-specific PDN connection (denoted as $PDN_{App*}$), and requires the S5 connection either to be maintained even when the UE is in an RRC-Idle state or to be quickly setup after an RRC Idle-to-Connected transition. Accordingly, unlike the 1× EV-DO core network of FIG. 2A and the W-CDMA core network of FIGS. 2B-2C, the LTE core network of FIG. 2D thereby supports GBR QoS at the core network 140 in addition to the RAN 120.

The embodiments of the invention which will be described in more detail below are each configured for operation within one or more of the core networks from FIGS. 2A-2B, as summarized in Table 2 (below) as follows:

TABLE 2

Overview of Embodiment Applicability to Core Network Types

Figure 5:
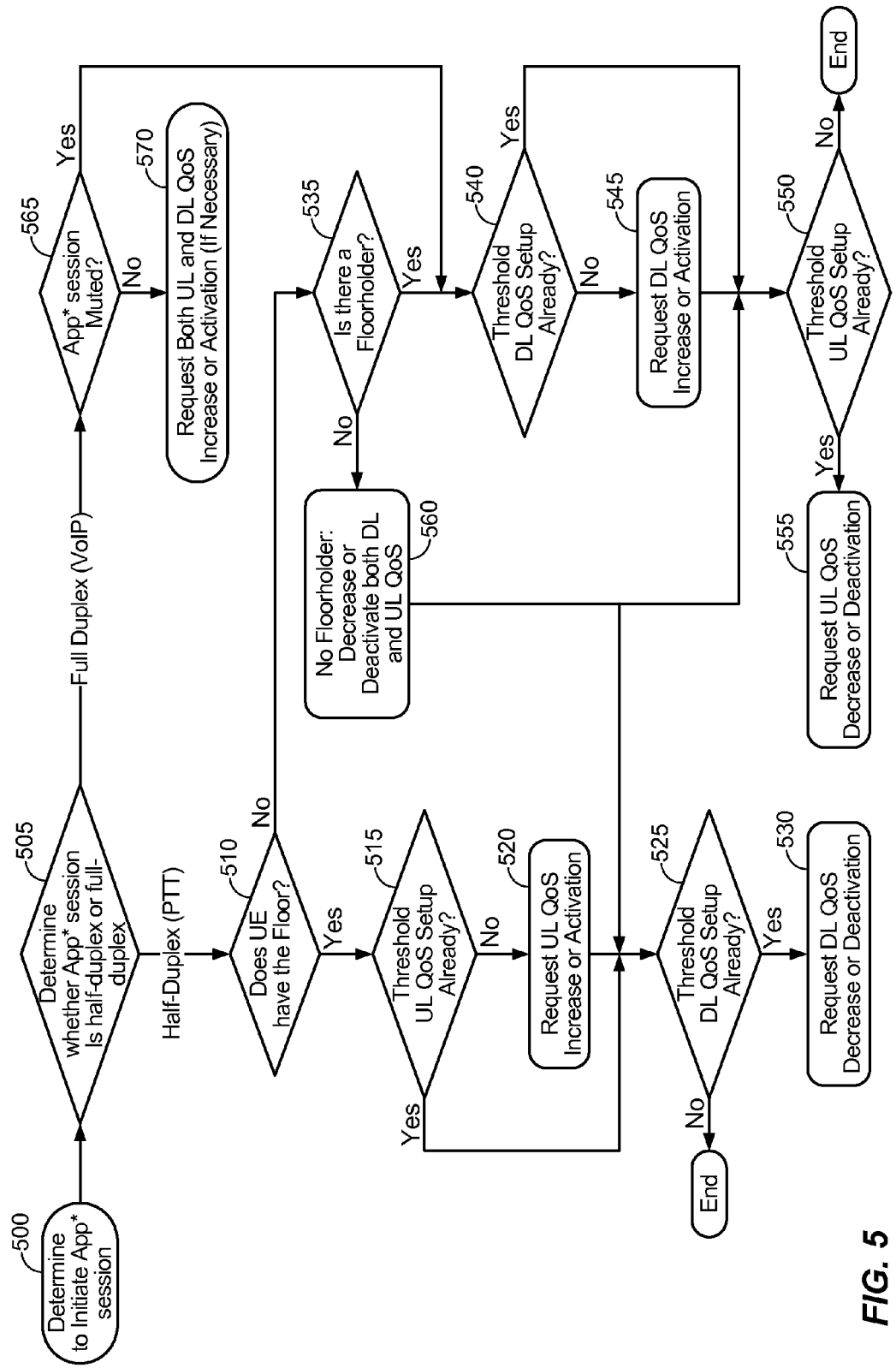
FIG. 5 illustrates a more detailed implementation example of a client application initiated directional QoS management procedure in accordance with an embodiment of the invention.
Figure 6A:
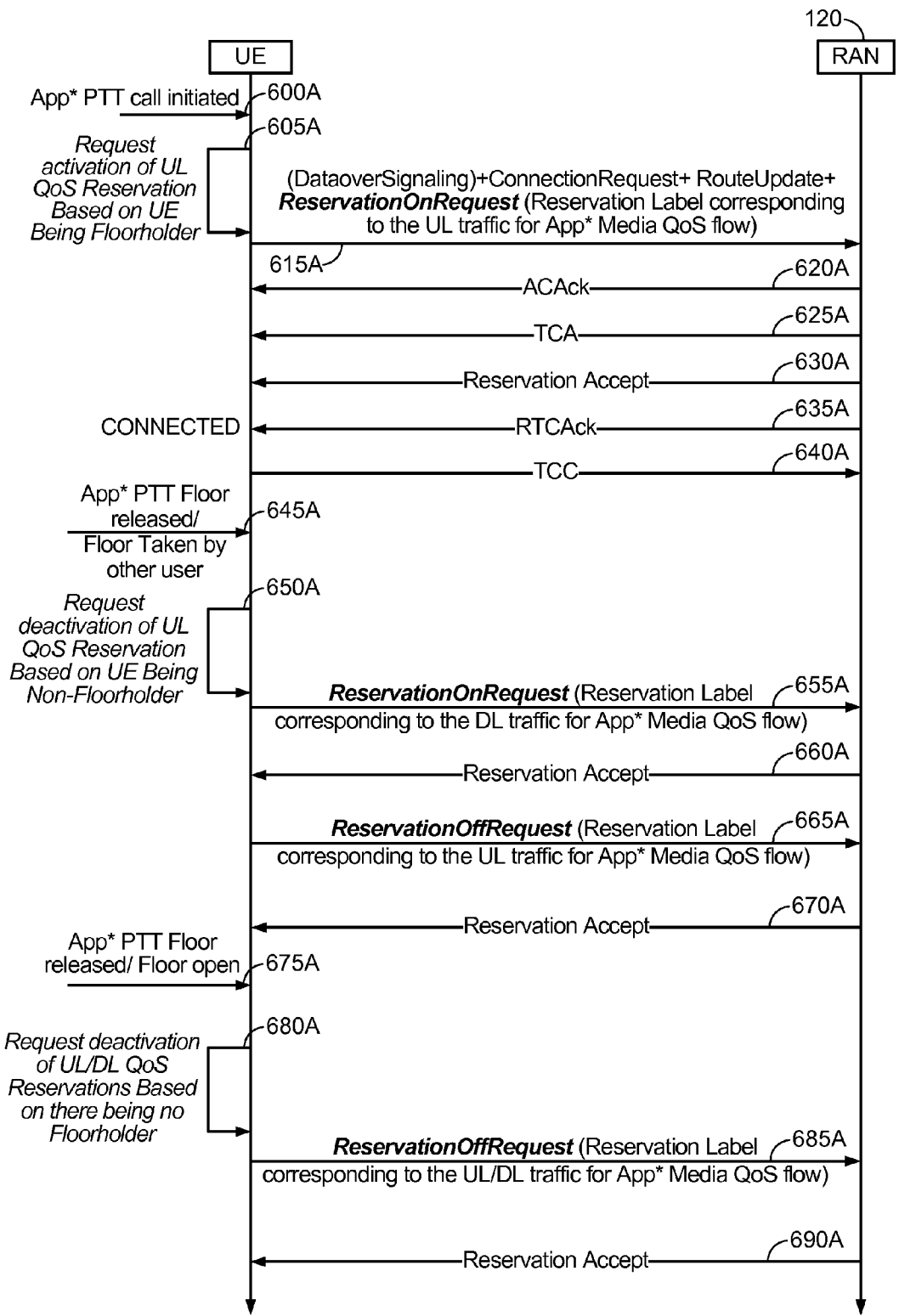
FIG. 6A illustrates an example implementation of the process of FIG. 5 for a given UE that joins a half-duplex PTT session while being served by a 1× EV-DO network (Legacy HRPD) as in FIG. 2A or an eHRPD network as in FIG. 2E in accordance with an embodiment of the invention.
Figure 6B:
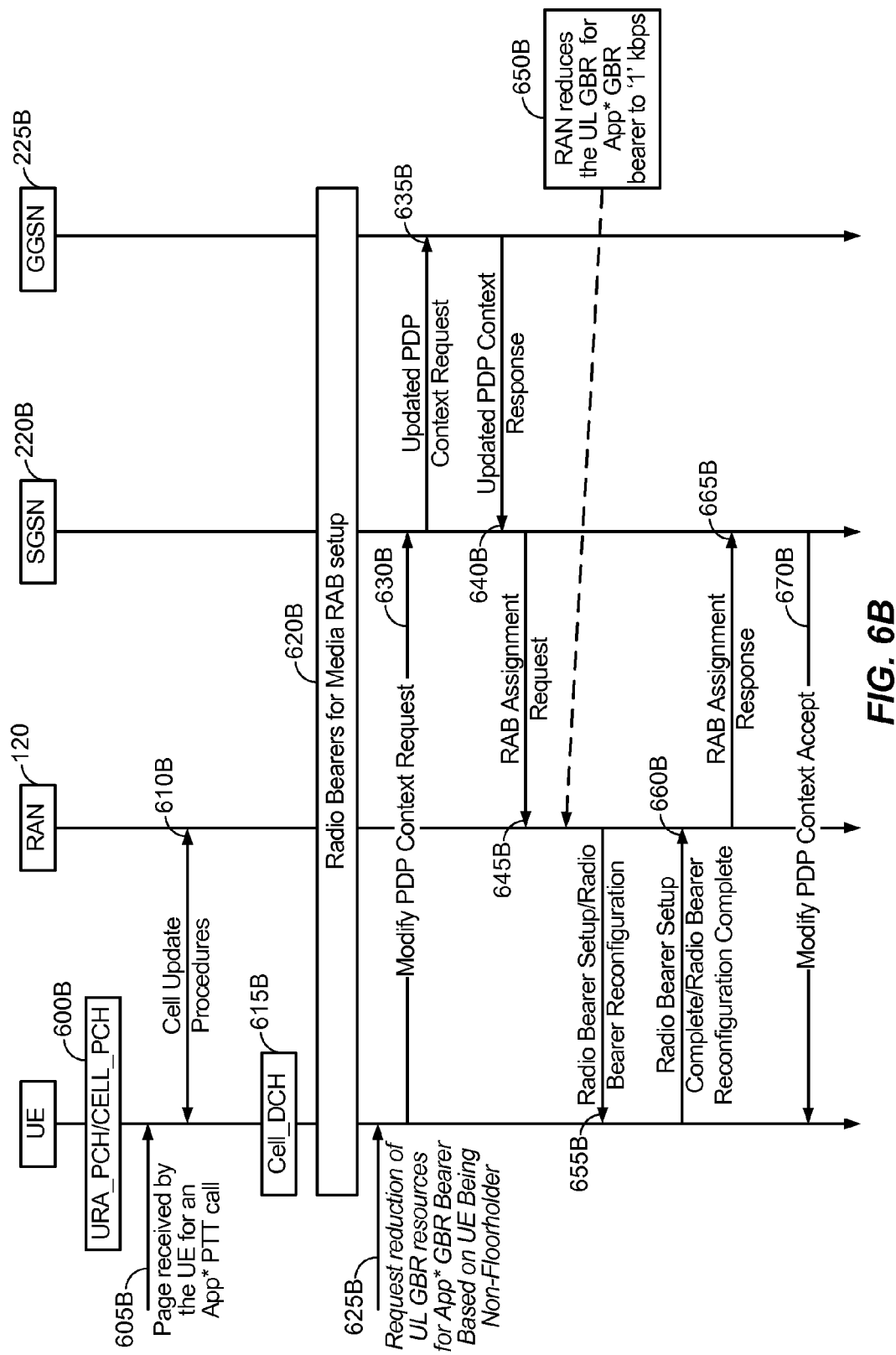
FIG. 6B illustrates an example implementation of the process of FIG. 5 for a given UE that joins a half-duplex PTT session while being served by a W-CDMA network as in FIG. 2B or FIG. 2C in accordance with an embodiment of the invention.
Figure 6C:
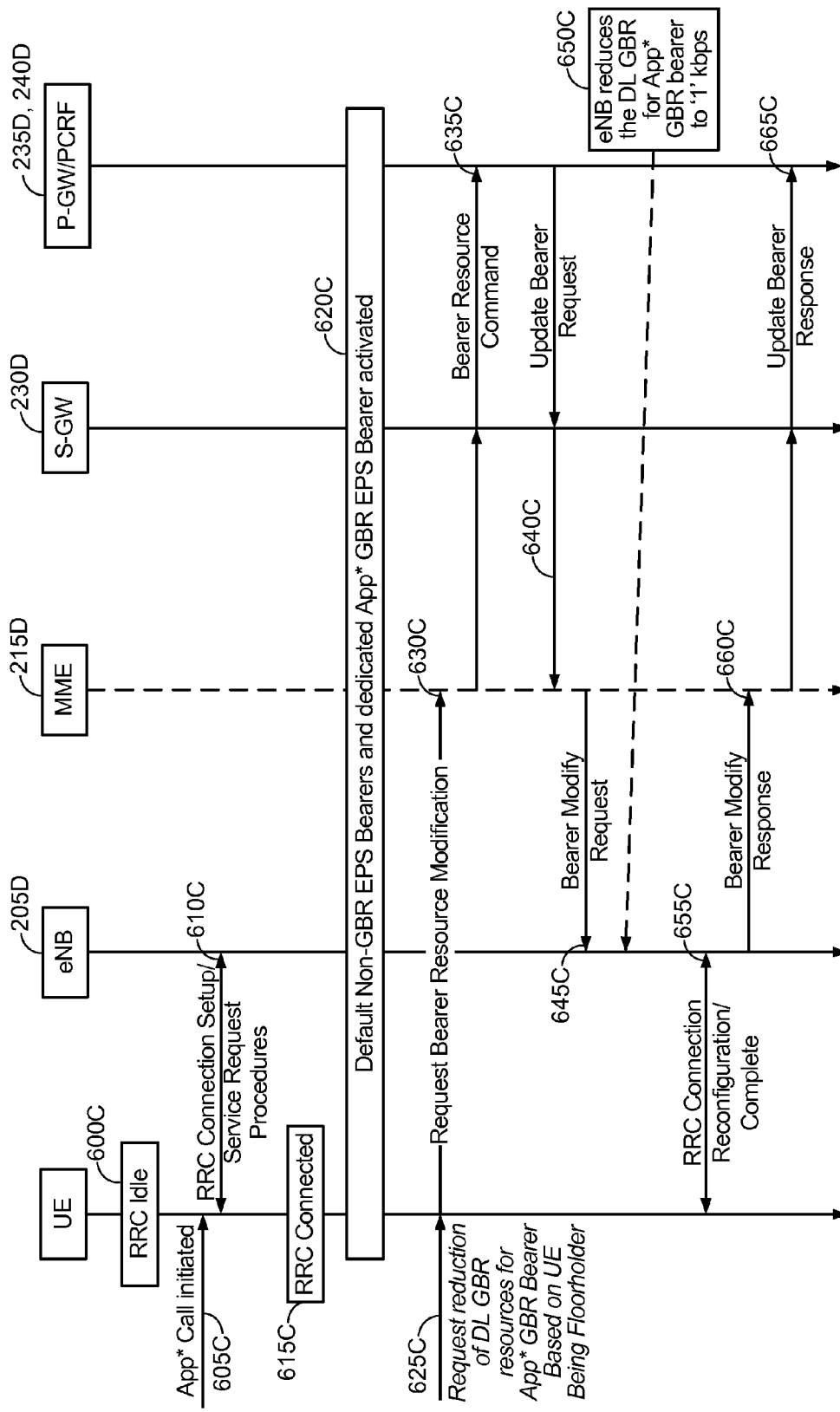
FIG. 6C illustrates an example implementation of the process of FIG. 5 for a given UE that originates a half-duplex PTT session while being served by an LTE network as in FIG. 2D in accordance with an embodiment of the invention.
Figure 7A:
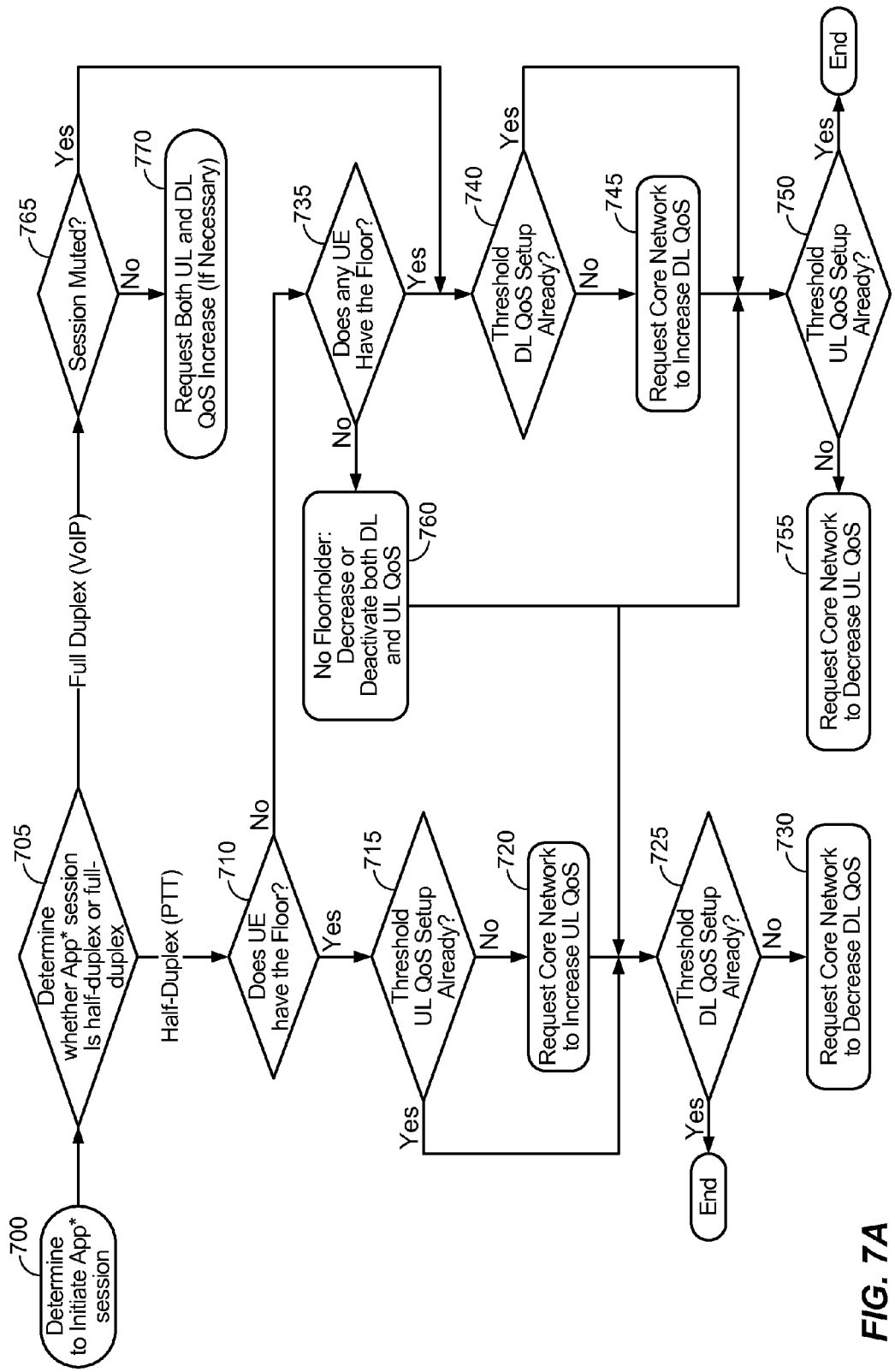
FIGS. 7A-7B are directed to selective QoS control procedures that are similar to FIG. 5 but are implemented at an application server 170 instead of the UE client application in accordance with an embodiment of the invention.
Figure 7B:
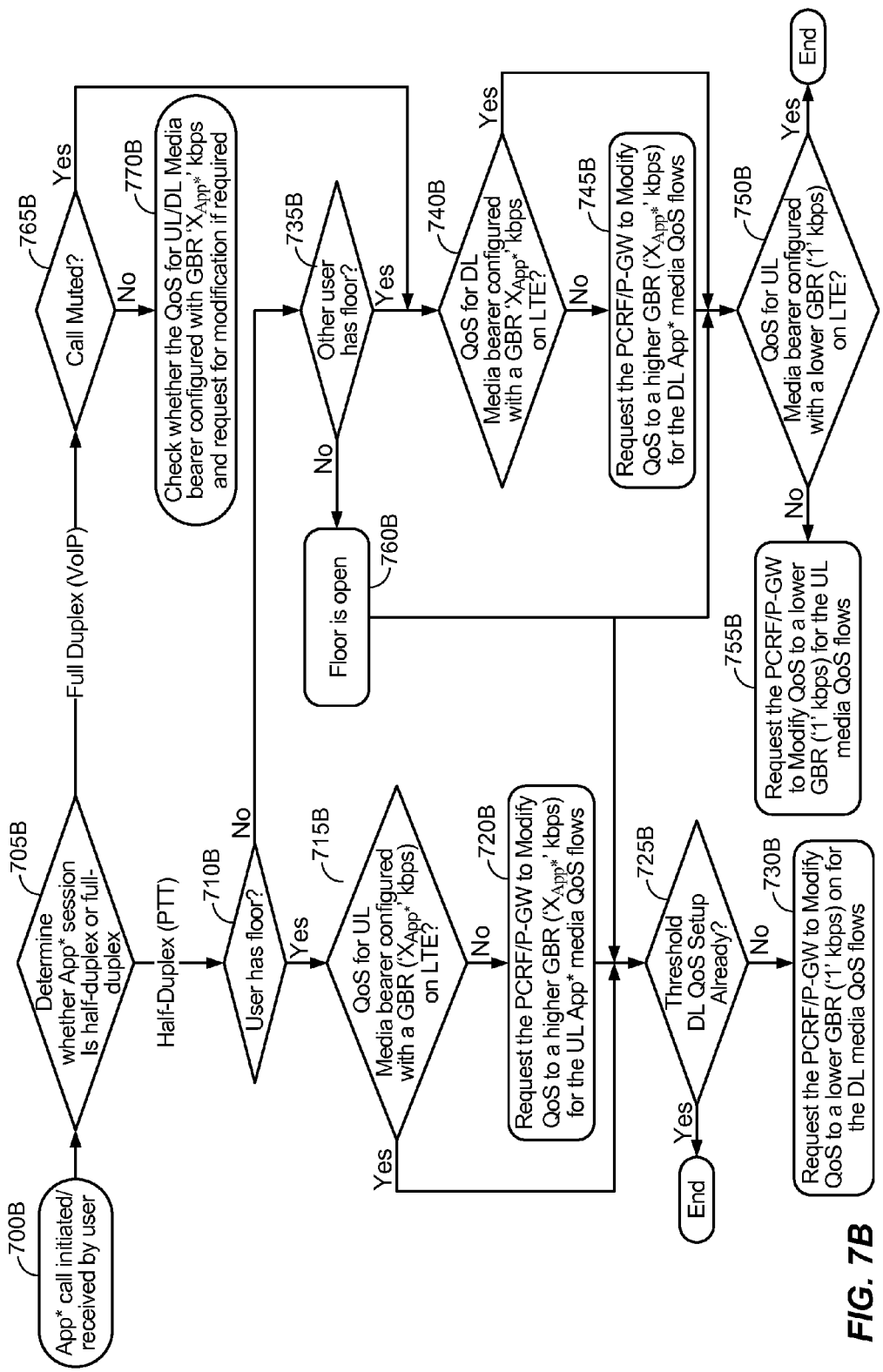

| Embodiment Name | Embodiment Description | LTE | W-CDMA | EV-DO (Legacy HRPD) | eHRPD |
|---|---|---|---|---|---|
| #1-Client Application initiated directional QoS management [FIGS. 5-6C] | Application on the UE based on the type of call (half duplex or full duplex) and the activity of the call (floor open, floor active, audio muted, etc) requests the Network to turn off /modify (increase or decrease) GBR QoS flows directionally (UL or DL) | Yes | Yes [for Conversational Traffic Class] | Yes | Yes |
| #2-Application Server assisted directional QoS management [FIGS. 7A-7B] | Application server based on the type of call (half duplex or full duplex) and the activity of the call (floor open, floor active, audio muted, etc) requests the Network to turn off/ modify (increase or decrease) GBR QoS flows directionally (UL or DL) for each UE in the call | yes | No | No | No |

FIG. 5 illustrates a more detailed implementation example of a client application initiated directional QoS management procedure in accordance with an embodiment of the invention. As explained in Table 2 (above), the client application initiated directional QoS management procedure (i.e., #1 from Table 2) can be implemented in the 1× EV-DO core network of FIG. 2A, the W-CDMA core network of FIGS. 2B-2C (if the "Conversational" traffic class is used for the session), LTE core network of FIG. 2D and/or the eHRPD core network of FIG. 2E. FIG. 5 is generic to any of these core network types, whereas FIGS. 6A-6C show more detailed flowcharts for mapping the procedure of FIG. 5 to the individual core network types.

Referring to FIG. 5, a client application for App* on the given UE determines to initiate an App* communication session (e.g., a VoIP session, a PTT session, etc.), 500. The determination of 500 can be based upon a request by an operator of the given UE to originate the communication session, in which case the given UE is an originating UE. Alternatively, the determination of 500 can be based upon a call announce message received at the given UE that announces the App* communication session originated by some other entity, in which case the given UE is a target UE. In the embodiment of FIG. 5, assume that the App* client application that is executing on the given UE and is configured to handle client-side operations associated with App* communication sessions (e.g., VoIP sessions, PTT sessions, etc.).

At 505, the App* client application determines whether the App* communication session to be initiated is half-duplex or full-duplex. If the App* client application determines that the App* communication session is half-duplex at 505 (e.g., a PTT call), the App* client application determines whether the given UE currently has the floor (or is the current floorholder) for the half-duplex App* session, 510. If the App* client application determines that the given UE has the floor at 510, the App* client application determines whether a threshold level of uplink (UL) QoS resources (e.g., GBR set to a threshold date rate or kpbs) are established for supporting uplink media transmissions by the given UE for the half-duplex App* session, 515. As will be appreciated, the floorholder for the half-duplex App* session is likely to be transmitting high-priority media on a UL channel for distribution to target UE(s) participating in the half-duplex App* session as non-floorholders or listeners, such that QoS on the UL channel from the floorholder can improve session quality for the half-duplex App* session. As will be explained in more detail below with respect to FIGS. 6A-6C, the uplink QoS resource determination of 515 can include (i) if the given UE is served by a 1× EV-DO network as in FIG. 2A or an eHRPD network as in FIG. 2E, determining whether QoS for a UL media traffic flow is setup, (ii) if the given UE is served by a W-CDMA network as in FIGS. 2B-2C or an LTE network as in FIG. 2D, whether a UL media bearer is configured with at least a threshold GBR for supporting the half-duplex session.

If the App* client application on the given UE determines that the threshold UL QoS resources are not already setup for the half-duplex App* session at 515, the given UE requests that UL QoS resources be activated and/or increased at 520. For example, if the given UE is served by a 1× EV-DO network as in FIG. 2A, the given UE can request that QoS for the UL media traffic flow be activated at 520. In another example, if the given UE is served by a W-CDMA network as in FIGS. 2B-2C or an LTE network as in FIG. 2D, the given UE can request to modify its current GBR on its UL media bearer to a higher GBR (e.g., $X_{App*}$ kpbs, where $X_{App*}$ kpbs corresponds to an application-specific dynamic data rate for App* communication sessions) at 520.

Further, if the given UE is determined to have the floor for the half-duplex App* session at 510, it will be appreciated that the given UE may not require QoS for downlink (DL) media. Accordingly, in addition to selectively setting up or increasing QoS for the UL channel (if necessary) at 515-520, the given UE will also selectively tear down or reduce existing QoS resources for the DL channel (if necessary) for the App* bearer at 525-530. Thus, the App* client application determines whether a threshold level of DL QoS resources are established for supporting DL media reception at the given UE for the half-duplex App* session, 525. As will be explained in more detail below with respect to FIGS. 6A-6C, the DL QoS resource determination of 525 can include (i) if the given UE is served by a 1× EV-DO network as in FIG. 2A or an eHRPD network as in FIG. 2E, determining whether QoS for a DL media traffic flow is setup, (ii) if the given UE is served by a W-CDMA network as in FIGS. 2B-2C or an LTE network as in FIG. 2D, whether a DL App* media bearer is configured with at least a threshold GBR.

If the App* client application on the given UE determines that the threshold DL QoS resources are already setup for the half-duplex App* session at 525, the App* client application on the given UE requests that the DL QoS resources be deactivated and/or decreased at 530. For example, if the given UE is served by a 1× EV-DO network as in FIG. 2A or an eHRPD network as in FIG. 2E, the given UE can request that QoS for the DL media traffic flow be deactivated or turned off at 530. In another example, if the given UE is served by a W-CDMA network as in FIGS. 2B-2C or an LTE network as in FIG. 2D, the App* client application on the given UE can request to modify its current GBR on its DL media bearer to a lower GBR at 530.

Still referring to FIG. 5, and turning back to the half-duplex floorholder determination of 510, if the App* client application determines that the given UE does not have the floor at 510, the App* client application determines whether another session participant holds the floor (i.e., whether media from some entity is being received over the DL channel for the half-duplex App* session), 535. As will be appreciated, non-floorholders (or target UEs) for the half-duplex App* session are likely to be receiving high-priority media on a DL, such that QoS on the DL channel for the non-floorholders or target UE(s) can improve session quality for the half-duplex App* session. Accordingly, if the App* client application determines that another entity holds the floor at 535 (i.e., media is being received at the given UE for the half-duplex App* session), the App* client application determines whether a threshold level of DL QoS resources is established for supporting DL media reception at the given UE for the half-duplex session, 540 (similar to 525).

If the App* client application on the given UE determines that the threshold DL QoS resources is not already setup for the half-duplex App* session at 540, the App* client application on the given UE requests that DL QoS resources be activated and/or increased at 545. For example, if the given UE is served by a 1× EV-DO network as in FIG. 2A or an eHRPD network as in FIG. 2E, the given UE can request that QoS for the DL media traffic flow be activated at 545. In another example, if the given UE is served by a W-CDMA network as in FIGS. 2B-2C or an LTE network as in FIG. 2D, the App* client application on the given UE can request to modify its current GBR on its DL media bearer to a higher GBR (e.g., $X_{App*}$ kpbs) at 545.

Further, if the given UE is determined not to have the floor for the half-duplex App* session at 510, it will be appreciated that the given UE may not require QoS for UL media. Accordingly, in addition to selectively setting up QoS for the DL channel (if necessary) at 540-545, the given UE will also selectively tear down or reduce existing QoS resources for the UL channel (if necessary) at 550-555. Thus, the App* client application determines whether a threshold level of UL QoS resources are established for supporting UL media reception at the given UE for the half-duplex session, 550 (similar to 520).

If the App* client application on the given UE determines that the threshold UL QoS resources are already setup for the half-duplex App* session at 550, the given UE requests that the UL QoS resources be deactivated and/or decreased at 555. For example, if the given UE is served by a 1× EV-DO network as in FIG. 2A or an eHRPD network as in FIG. 2E, the App* client application on the given UE can request that QoS for the UL media traffic flow be deactivated or turned off at 555. In another example, if the given UE is served by a W-CDMA network as in FIGS. 2B-2C or an LTE network as in FIG. 2D, the App* client application on the given UE can request to modify its current GBR on its UL media bearer to a lower GBR (e.g., 1 kpbs, or some other nominal data rate) at 555.

Still referring to FIG. 5, and turning back to the determination of 535 whereby the App* client application determines whether another floorholder is present after determining that the given UE itself does not hold the floor at 510, if the App* client application determines that no one holds the floor at 535, the App* client application determines to decrease or deactivate both DL and UL QoS resources for the half-duplex App* session (at least, until one of the session participants is granted the floor), 560. Accordingly, after 560, the process advances to both 525-530 and 550-555, where the DL and UL QoS resources are decreased and/or deactivated (if necessary).

Still referring to FIG. 5, and turning back to the duplex determination of 505, if the App* client application determines that the communication session is full-duplex (e.g., a VoIP call) instead of half-duplex, the App* client application determines whether audio is muted for the full-duplex App* session, 565. As will be appreciated, if audio is muted, the operator of the given UE is listening to the other UE(s) in the full-duplex App* session but does not actually want his/her own audio conveyed to the other UE(s). If the App* client application determines that the full-duplex App* session is not muted at 565, both UL and DL QoS resources for the full-duplex App* session are activated or increased (if necessary), 570. For example, 570 can correspond to an execution of 515-520 and 550-555, in an example. Otherwise, if the App* client application determines that the full-duplex App* session is muted at 565, the process advances to 540-555 where the DL QoS resources are increased or activated (if necessary) and the UL QoS resources are decreased or deactivated (if necessary).

FIG. 6A illustrates an example implementation of the process of FIG. 5 for a given UE that joins a half-duplex App* PTT session while being served by a 1× EV-DO network (Legacy HRPD) as in FIG. 2A or an eHRPD network as in FIG. 2E in accordance with an embodiment of the invention. Referring to FIG. 6A, while the given UE is in an idle state, the App* client application determines to originate the App* PTT call, 600A (e.g., in response to a PTT button push), and the App*client application determines that the given UE has the floor, 605A (e.g., similar to 500-515 in FIG. 5). Assuming that the given UE does not yet have QoS setup for its UL media flow for the App* PTT call, the App* client application on the given UE requests QoS activation for its UL media flow but not the DL media flow for the App* PTT call. This is shown in FIG. 6A whereby the given UE transmits a ReservationOnRequest message that indicates the UL media QoS flow (and not the DL media QoS flow), 615A, Thus, the RAN 120 sets up the UL QoS reservation for the UL media flow (shown by the signaling between 620A through 640A, which will be readily understood by one of ordinary skill in the art familiar with 1× EV-DO) while leaving the DL QoS reservation for the DL media flow in a suspended state (e.g., similar to 515-530 of FIG. 5). While not shown explicitly in FIG. 6A, the App* client application on the given UE can begin transmitting media as the floorholder after 640A.

Referring to FIG. 6A, the App* client application on the given UE eventually releases the floor, 645A, and the App* client application determines that another UE has the floor for the App* PTT session, 650A (similar to 510 and 535 of FIG. 5). Accordingly, the given UE turns on the DL QoS reservation for the DL media flow (655A-660A) and the given UE tears down the UL QoS reservation for the UL media flow (665A-670A), similar to 540-555 of FIG. 5.

Referring to FIG. 6A, the other UE eventually releases the floor, 675A, and the App* client application determines that no UE has the floor for the App* PTT session, 680A (similar to 535 and 560 of FIG. 5). Accordingly, the App* client application on the given UE tears down both the DL QoS reservation for the DL media flow and the UL QoS reservation for the UL media flow (680A-690A), similar to 525-530 and 550-555 of FIG. 5.

While FIG. 6A is directed to an example where the given UE is the originator for the App* PTT call, it will be appreciated that FIG. 6A could be modified to accommodate a scenario where the given UE is a call target for the App* PTT call instead. In a call target implementation of FIG. 6A, the App* client application on the call target UE becomes aware of the App* PTT call via a call announcement message (instead of a PTT button push as in 600A), and the call target UE will begin the App* PTT call as a non-floorholder (instead of a floorholder as in FIG. 6A). Other than these differences, the UL and DL QoS for the App* Media QoS flow can be managed for the call target UE in a similar manner as in FIG. 6A. Also, while not shown explicitly in FIG. 6A, FIG. 6A could be expanded so as to cover additional use cases from FIG. 5, such as a full-duplex example (e.g., 565, 570, etc., from FIG. 5) instead of the half-duplex session example in FIG. 6B. Further, while FIG. 6A is described with the App* PTT call being originated at 600A when the given UE is idle (i.e., no traffic channel (TCH)), it will be appreciated that FIG. 6A could be modified so that the App* PTT call is originated at the given UE while the given UE is already allocated a TCH (or announced to the given UE over the pre-established TCH, a target UE implementation).

FIG. 6B illustrates an example implementation of the process of FIG. 5 for a given UE that joins a half-duplex App* PTT session while being served by a W-CDMA network as in FIG. 2B or FIG. 2C in accordance with an embodiment of the invention. Referring to FIG. 6B, the given UE is operating in CELL_PCH or URA_PCH state, 600B, and the App* client application receives a page in association with a App* PTT call originated by some other UE, 605B (e.g., in response to a PTT button push at the other UE), which prompts the given UE to perform cell update procedures with the RAN 120, 610B, so as to transition into CELL_DCH state, 615B, to receive the PTT announce message (not shown) and to setup RABs for the App* PTT session, 620B. In particular, at 620B, the RAN 120 allocates at least a threshold GBR (e.g., $X_{App*}$ kpbs) on both the UL and DL for the media RAB that will support the App* PTT session.

Referring to FIG. 6B, assume that the App* client application determines that another UE has the floor for the App* PTT session, 625B (similar to 510 and 535 of FIG. 5). Accordingly, because the given UE was already allocated the threshold GBR at 620B, the App* client application determines to maintain the GBR allocated to the DL media bearer at $X_{App*}$ kpbs, but to reduce the GBR allocated to the UL media bearer (e.g., to 1 kpbs or some other nominal level), similar to 540-555 of FIG. 5. The GBR reduction to the UL media bearer is shown in FIG. 6B in the signaling between 630B through 670B, and this signaling will be readily understood by one of ordinary skill in the art familiar with UMTS and/or W-CDMA.

While FIG. 6B is directed to an example where the given UE is a call target UE for the App* PTT call, it will be appreciated that FIG. 6B could be modified to accommodate a scenario where the given UE is a call originator of the App* PTT call instead. In a call originator implementation of FIG. 6B, the App* client application on the call originator UE can become aware of the App* PTT call via a PTT button push (instead of a page/announce procedure as in 605B), and the call originator UE will begin the App* PTT call as a floorholder (instead of a non-floorholder as in FIG. 6B). Other than these differences, the UL and DL QoS for the App* Media QoS flow can be managed for the call target UE in a similar manner as in FIG. 6B. Also, while not shown explicitly in FIG. 6B, FIG. 6B could be expanded so as to cover additional use cases from FIG. 5, such as a full-duplex example (e.g., 565, 570, etc., from FIG. 5) instead of the half-duplex session example in FIG. 6B. Further, while FIG. 6B is described with the App* PTT call being originated at 605B based on a page received while the given UE is in URA_PCH/CELL_PCH state, it will be appreciated that FIG. 6B could be modified so that the App* PTT call the call announcement for the App* PTT session arrives while the given UE is already in CELL_DCH state (or a PTT button push for App* is detected at the given UE while in CELL_DCH state, for an originating UE implementation).

FIG. 6C illustrates an example implementation of the process of FIG. 5 for a given UE that originates a half-duplex App* PTT session while being served by an LTE network as in FIG. 2D in accordance with an embodiment of the invention. Referring to FIG. 6C, the given UE is operating in a Radio Resource Connected (RRC) idle mode, 600C, and the App* client application determines to initiate a half-duplex App*PTT session (e.g., in response to a PTT button push on the given UE), 605C. The given UE then performs an RCC connection setup and service request procedures with the RAN 120 (i.e., an eNodeB serving the given UE, such as eNodeB 205D), 610C, so as to transition into RCC Connected state, 615C, and to setup non-GBR EPS bearers and a dedicated GBR EPS bearer for the media of the half-duplex App*PTT session, 620C. In particular, at 620C, the eNodeB 205D allocates a at least a threshold GBR (e.g., $X_{App*}$ kpbs) on both the UL and DL for the App* GBR media bearer that will support the App* PTT session based on the QoS received from the MME 215B.

Referring to FIG. 6C, assume that the App* client application determines that the given UE will begin the half-duplex App* PTT session with the floor, 625C (e.g., similar to 500-515 in FIG. 5). Because the given UE already has QoS setup for its UL media bearer (e.g., the $X_{App*}$ kpbs of GBR allocated to the UL media bearer by the eNodeB 205D at 620C), the App* client application on the given UE requests QoS reduction for the DL media bearer from $X_{App*}$ kpbs to a kpbs level below the GBR threshold (e.g., a nominal kpbs level, such as 1 kpbs). The GBR reduction to the DL media bearer is shown in FIG. 6C in the signaling between 630C and 665C, and this signaling will be readily understood by one of ordinary skill in the art familiar with LTE.

While FIG. 6C is directed to an example where the given UE is the originator for the App* PTT call, it will be appreciated that FIG. 6A could be modified to accommodate a scenario where the given UE is a call target for the App* PTT call instead. In a call target implementation of FIG. 6C, the App* client application on the call target UE becomes aware of the App* PTT call via a call announcement message (instead of a PTT button push as in 605C), and the call target UE will begin the App* PTT call as a non-floorholder (instead of a floorholder as in FIG. 6C). Other than these differences, the UL and DL QoS for the App* Media QoS flow can be managed for the call target UE in a similar manner as in FIG. 6C. Also, while not shown explicitly in FIG. 6C, FIG. 6C could be expanded so as to cover additional use cases from FIG. 5, such as a full-duplex example (e.g., 565, 570, etc., from FIG. 5) instead of the half-duplex session example in FIG. 6C. Further, while FIG. 6C is described with the App* PTT call being originated at 605C when the given UE is in RCC-Idle state, it will be appreciated that FIG. 6C could be modified so that the App* PTT call is originated at the given UE while in RRC-Connected state (or announced to the given UE while in RRC-Connected state, for a target UE implementation).

While FIGS. 5-6C are described with respect to a UE-side or client application-based procedure for selective QoS control on the UL and DL channels of an App* communication session, FIGS. 7A-7B are directed to a similar selective QoS control procedure that is implemented at the application server 170 (e.g., the server configured to arbitrate the App* communication session) instead of the UEs participating in the App* communication session. As explained in Table 2 (above), the application server assisted directional QoS management procedure (i.e., #2 from Table 2) can be implemented in the LTE core network of FIG. 2D, but may not be capable of standard-compliant implementation in the 1× EV-DO core network of FIG. 2A, or the W-CDMA core network of FIGS. 2B-2C, or the eHRPD network of FIG. 2E.

To condense the description of FIG. 7A, 700 through 770 of FIG. 7A is similar to 500 through 570 of FIG. 5, respectively, except as noted hereafter. FIG. 5 in its entirety is implemented at a given UE participating in an App* communication session, whereas FIG. 7A is implemented at the application server 170 configured to arbitrate the App* communication session. FIG. 5 is representative of a procedure executed by an App* client application at one particular UE, whereas FIG. 7A is representative of a procedure that can be executed at the application server 170 for each UE participating in the communication session (although, the application server 170 need not perform the process of FIG. 7A for each of the participating UEs in at least one embodiment). While the App* client application on the given UE in FIG. 5 may determine to initiate the App* communication session at 500 of FIG. 5 based upon a user request or receipt of a call announce message at the given UE, the application server 170 at 700 of FIG. 7A may determine to initiate the App* communication session based upon receipt of a call request message from an originating UE and/or a call accept message from target UE(s) that indicates acceptance to an announced App* communication session. Further, it will be appreciated that some UEs in a full-duplex App* session may have their sessions muted, and others may not, and that some UEs may be floorholders to a half-duplex App* session, and other UEs may be non-floorholders. Thus, the various decision blocks shown in FIG. 7A may result in different procedural pathways being taken for each of the UEs being evaluated by the application server 170. Finally, because the FIG. 7A procedure is relevant to LTE, the various QoS evaluations and modifications shown in FIG. 7A may map to LTE specific core network elements. For example, the request at 720 to increase the UL QoS for the App* GBR QoS bearer may correspond to a request issued from the application server 170 to the PCRF 240D or P-GW 235D to raise the UL GBR on the App* GBR QoS bearer to $X_{App*}$ kpbs, the request at 730 to decrease the DL QoS on the App* GBR QoS bearer may correspond to a request issued from the application server 170 to the PCRF 240D or P-GW 235D to decrease the DL GBR on the App* GBR QoS bearer to a kpbs below a GBR threshold (e.g., 1 kpbs or some other nominal data rate), and so on. Aside from these differences, the remaining operation of FIG. 7A is similar to FIG. 5, and an LTE implementation of FIG. 7A could be similar to FIG. 6C except for certain operations being moved from the given UE to the application server 170 (and potentially being performed for more UEs). 700B through 770B of FIG. 7B illustrates an even more detailed implementation of 700 through 770 of FIG. 7A, respectively, whereby LTE-specific components and messages are referenced.

Figure 7C:
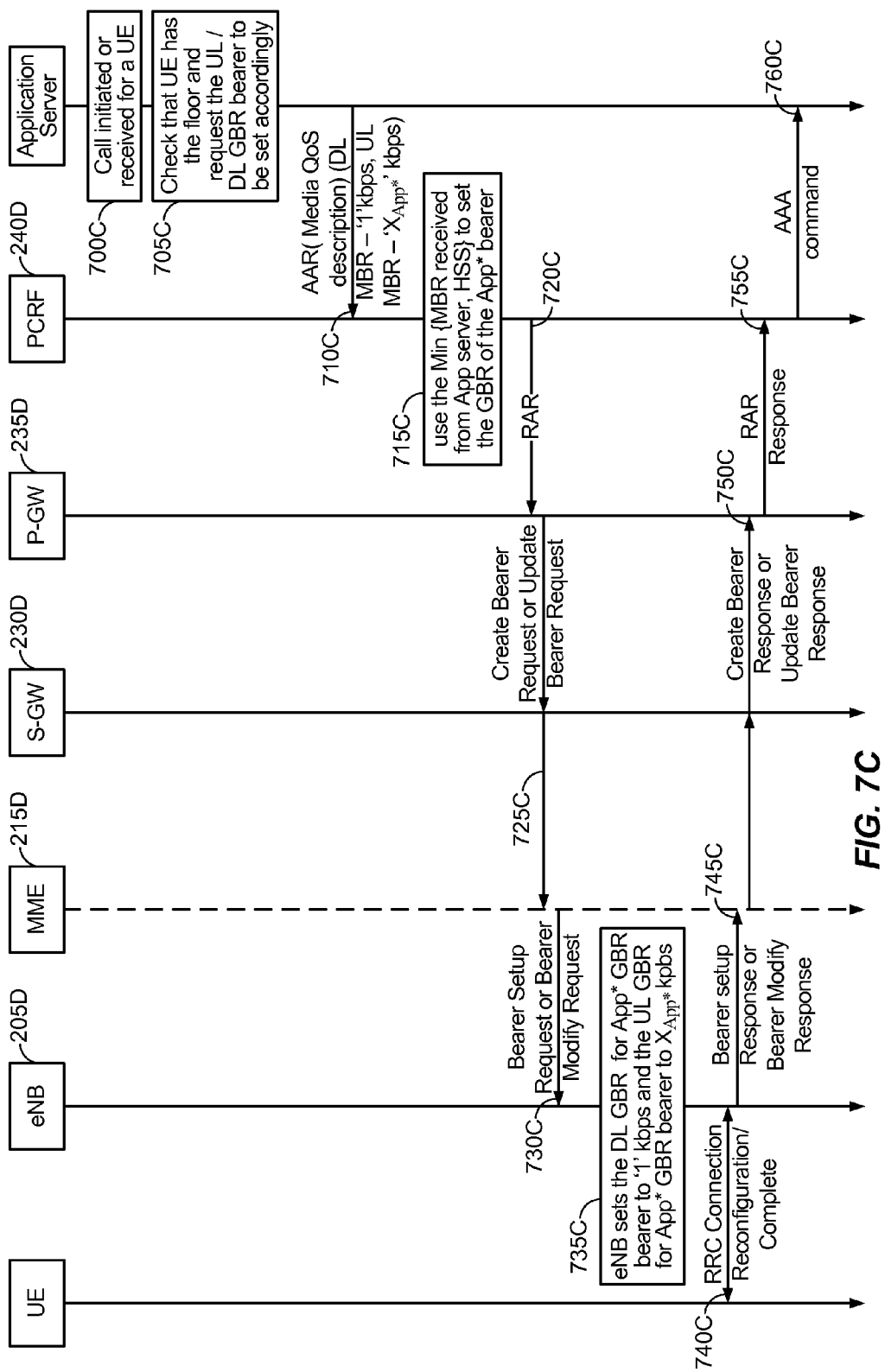
FIG. 7C illustrates an example implementation of FIG. 7B within an LTE network for a given UE (either a call originator or call target) joining a half-duplex PTT session in accordance with an embodiment of the invention.

FIG. 7C illustrates an example implementation of FIG. 7B within an LTE network for a given UE (either a call originator or call target) joining a half-duplex App* PTT session in accordance with an embodiment of the invention. Referring to FIG. 7C, the application server 170 determines to setup the half-duplex App* PTT call for the given UE, 700C (e.g., as in 700B and 705B of FIG. 7B), and the application server 170 determines that the given UE has the floor, and thereby sets a max bit rate (MBR) for the UL App* GBR bearer has the floor sets a DL GBR equal to a low kpbs, such as 1 kpbs, 705C (e.g., as in 710B through 730B of FIG. 7B). With these assumptions in mind, the signaling of 710C through 760C shows an LTE-specific example of how the UL and DL App* GBR bearer settings can be implemented. At 715C, for instance, the PCRF 240D is shown to be the LTE core network component that executes logic to map a MBS provided by the application server 170 into a suitable GBR value for achieving the designated MBS, which is denoted herein as $X_{App*}$. Also, the signaling shown between 725 through 750C covers the scenario where the App* GBR bearer is already setup on the UL and DL, and also the scenario where the App* GBR bearer is not already setup. If the App* GBR bearer is already setup, then the UL App* GBR bearer stays at $X_{App*}$ kpbs while the DL App* GBR bearer is reduced to 1 kpbs (or some other nominal kpbs) via an Update Bearer Request message at 725C. If the App* GBR bearer is not already setup, then the UL App* GBR bearer is setup for $X_{App*}$ kpbs while the DL App* GBR bearer is set to the nominal kpbs via a Create Bearer Request message at 725C. Likewise, a Bearer Setup Request message is used at 730C if the App* GBR bearer is not yet setup, and a Bearer Modify Request message is used at 730C if the App* GBR bearer is already setup. Likewise, a Create Bearer Response message is used at 750C if the App* GBR bearer is not yet setup, and an Update Bearer Response message is used at 750C if the App* GBR bearer is already setup. The remaining signaling shown in FIG. 7C is independent of the starting status of the App* GBR bearer, and will be readily understood by one of ordinary skill in the art familiar with LTE. While FIG. 7C is specific to a half-duplex PTT session, it will be readily appreciated how FIG. 7C could be modified to accommodate full-duplex sessions or half-duplex sessions other than PTT.

Figure 8A:
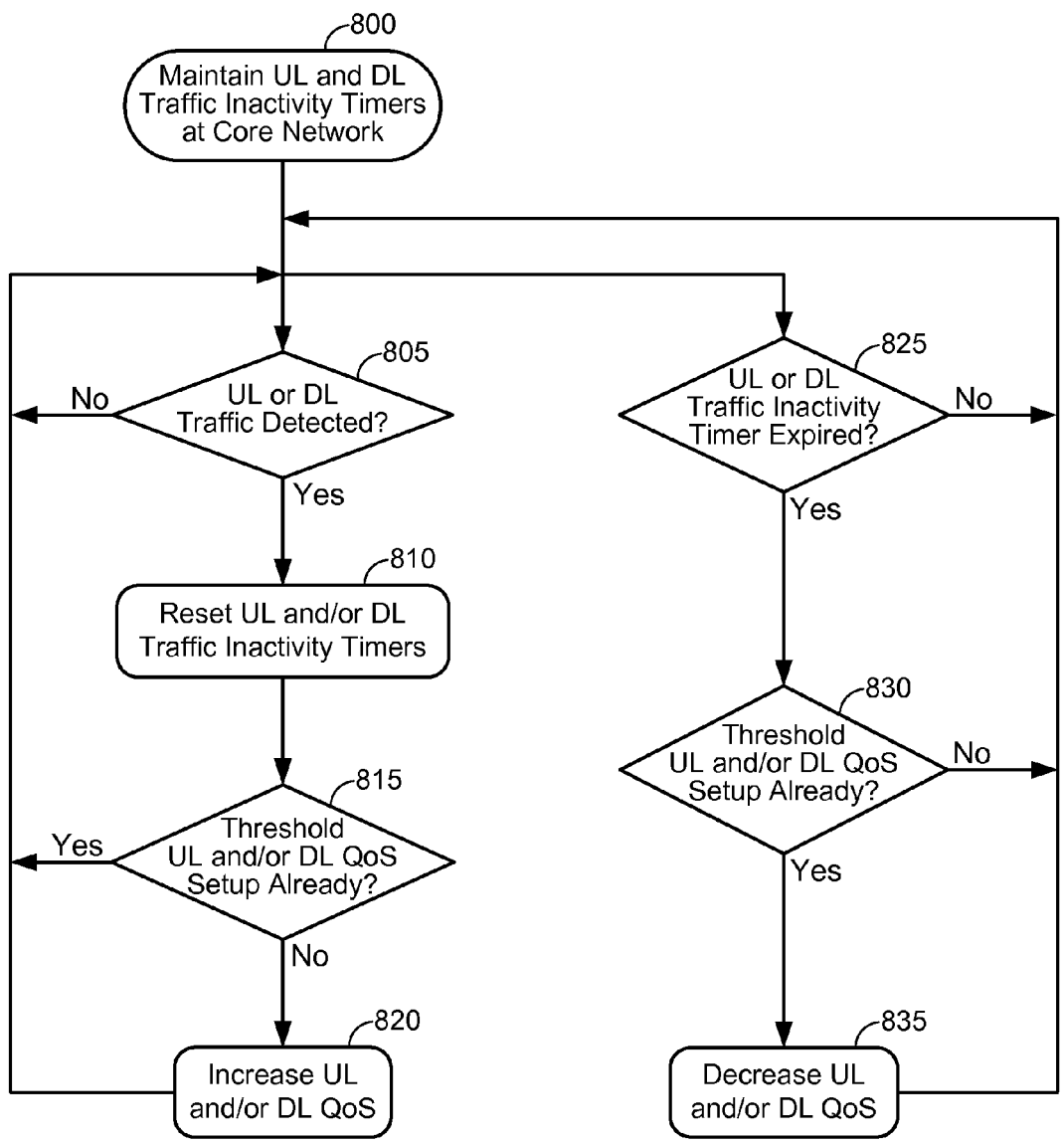
FIG. 8A illustrates a more detailed implementation example of a core network initiated directional QoS management procedure in accordance with an embodiment of the invention.

FIG. 8A illustrates a more detailed implementation example of a core network initiated directional QoS management procedure in accordance with an embodiment of the invention. As explained in Table 2 (above), the core network initiated directional QoS management procedure (i.e., #3 from Table 2) can be implemented in the W-CDMA core network of FIGS. 2B-2C (if the "Conversational" traffic class is used for the session) and/or the LTE core network of FIG. 2D, but may not be capable of standard-compliant implementation in the 1× EV-DO core network of FIG. 2A or the eHRPD network of FIG. 2E. For example, in a W-CDMA or UMTS implementation, the GGSN 225B or SGSN 220B may perform the process of FIG. 8A, and in an LTE implementation, the P-GW 235D or S-GW 230D may perform the process of FIG. 8A.

Referring to FIG. 8A, in response to detection of setup of a GBR media bearer for an App* communication session (e.g., a half-duplex session, a full-duplex session, etc.), the core network 140 starts data inactivity timers that monitor UL and DL traffic on the App* GBR media bearer, 800. In either case, as will be explained below, the data inactivity timers begin running once the App* GBR media bearer is activated for the App* session.

At 805, the core network 140 determines whether UL or DL traffic is detected on the App* GBR media bearer for the communication session. In particular, the core network 140 determines whether App* traffic associated with an access point name (APN) for the App* communication session (i.e., App*$_{APN}$) is detected in the UL or DL direction at 805. If UL or DL traffic is detected by the core network 140 at 805, the traffic inactivity timer for each direction (UL and/or DL) on which the traffic was detected is reset, 810. At 815, for each direction (UL and/or DL) in which traffic inactivity timers are still running (i.e., not yet expired), the core network 140 determines whether a threshold GBR is already setup for the App* GBR media bearer in the respective direction (e.g., similar to 515, 525, 540 and 550 of FIG. 5). If not, the core network 140 increases the GBR (e.g., to X$_{App*}$ kpbs) in each direction (UL or DL) for which the associated traffic inactivity timer is still running that does not yet have the threshold GBR, 820. As will be appreciated, the UE can be notified with respect to the QoS adjustment (or GBR increase) of 820 via an end-to-end communication, as shown below in FIG. 8C between 855C-890C and/or in FIG. 8D between 850D-865D.

Referring to FIG. 8A, the core network 140 monitors the UL and DL traffic inactivity timers to determine whether the UL and DL traffic inactivity timers expire, 825. If expiration is detected at 825, the core network 140 determines whether a threshold GBR is already setup for the App* GBR media bearer in the respective direction for which expiration is detected, 830 (e.g., similar to 515, 525, 540 and 550 of FIG. 5). If so, the core network 140 decreases the GBR (e.g., to 1 kpbs or some other nominal level) in each direction (UL or DL) for which expiration is detected that has the threshold GBR, 835, after which the core network 140 monitors (805) whether new traffic arrives on the directional channel that was decreased at 835 and the core network 140 can also continue to monitor whether expiration occurs (825) for the other directional channel that was not decreased at 835 (if any). As will be appreciated, the UE can be notified with respect to the QoS adjustment (or GBR decrease) of 830 via an end-to-end communication, as shown below in FIG. 8C between 855C-890C and/or in FIG. 8D between 850D-865D. 800B through 835B of FIG. 8B illustrates an even more detailed implementation of 800 through 835 of FIG. 8A, respectively, whereby LTE-specific and W-CDMA-specific components and messages are referenced more explicitly.

Figure 8B:
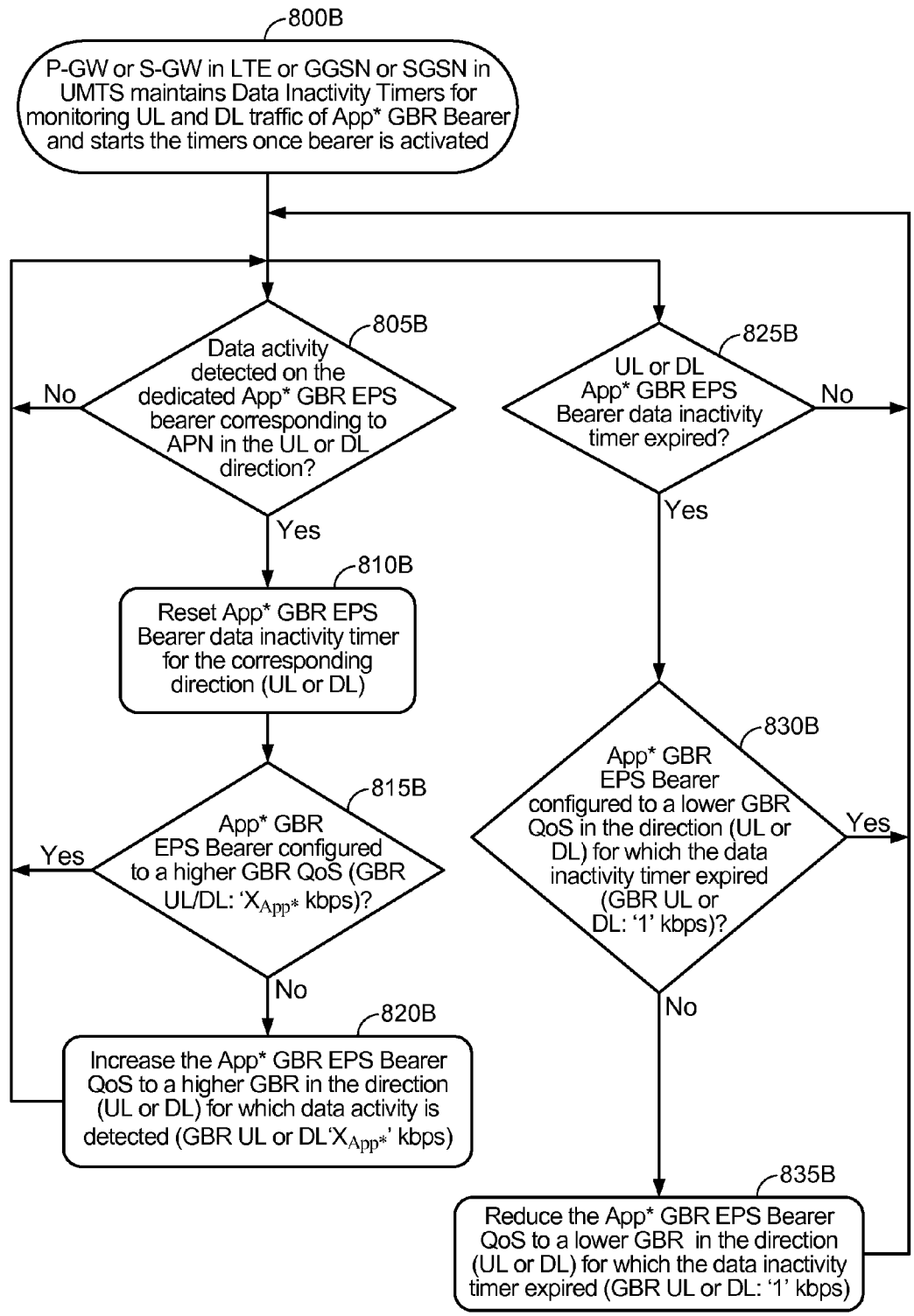
FIG. 8B illustrates an even more detailed implementation of FIG. 8A, respectively, whereby LTE-specific and W-CDMA-specific components and messages are referenced more explicitly in accordance with an embodiment of the invention.
Figure 8C:
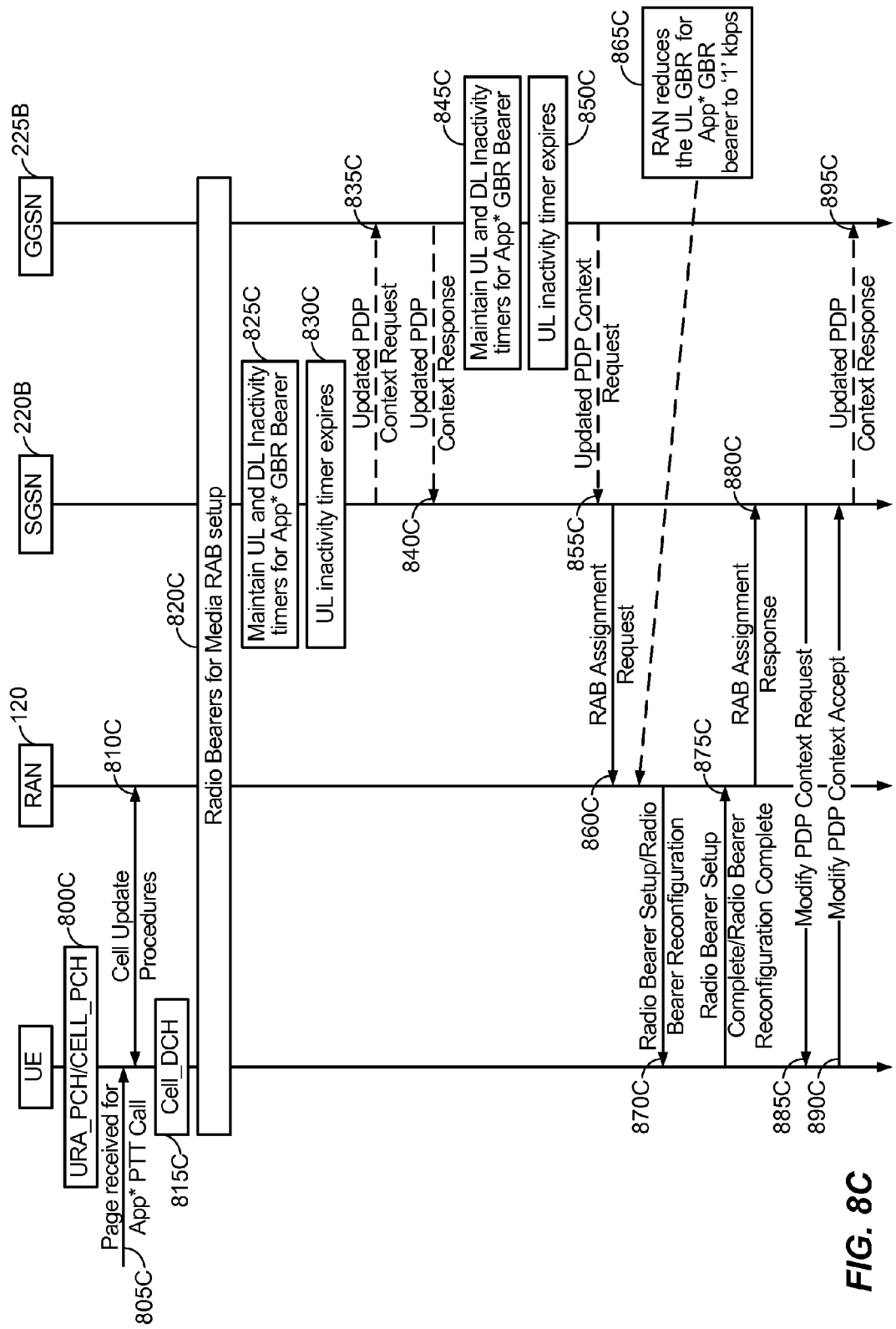
FIG. 8C illustrates an example implementation of FIG. 8B within a W-CDMA network for a given UE that is a call target of a half-duplex PTT session originated by some other UE in accordance with an embodiment of the invention.

FIG. 8C illustrates an example implementation of FIG. 8B within a W-CDMA network for a given UE that is a call target of a half-duplex App* PTT session originated by some other UE in accordance with an embodiment of the invention. Referring to FIG. 8C, 800C through 820C correspond to 600B through 620B from FIG. 6B, respectively. At 825C, the SGSN 220B starts and maintains UL and DL traffic inactivity timers (as in 800B through 820B of FIG. 8B). At some point, assume that the SGSN's 220B UL traffic inactivity timer expires, 830C (e.g., as in 825B of FIG. 8C). Accordingly, the SGSN 220B reduces its GBR on the App* UL GBR bearer to a nominal level, such as 1 kpbs, via the signaling of 835C and 840C with the GGSN 225B. At 845C, the GGSN 225B starts (after the App* GBR bearer is brought up at 820C) and maintains UL and DL traffic inactivity timers that are independent of the SGSN's 220B timers from 825C (as in 800B through 820B of FIG. 8B). At some point, assume that the GGSN's 225B UL traffic inactivity timer expires, 850C (e.g., as in 825B of FIG. 8C). Accordingly, the GGSN 225B prompts the RAN 120 to reduce the GBR on the App* UL GBR bearer to a nominal level, such as 1 kpbs, via the signaling between 855C through 895C. While FIG. 8C is specific to a half-duplex PTT session, it will be readily appreciated how FIG. 8C could be modified to accommodate full-duplex sessions or half-duplex sessions other than PTT. Also, while FIG. 8C is specific to a call target UE, it will be readily appreciated how FIG. 8C could be modified for a call originator UE (e.g., instead of page being received at 805C, a PTT button push is detected, etc.). Also, while FIG. 8C shows the given UE receiving the page at 805C while in URA_PCH/CELL_PCH state, the given UE could alternately receive the PTT call announcement while in CELL_DCH state in an alternative implementation.

Figure 8D:
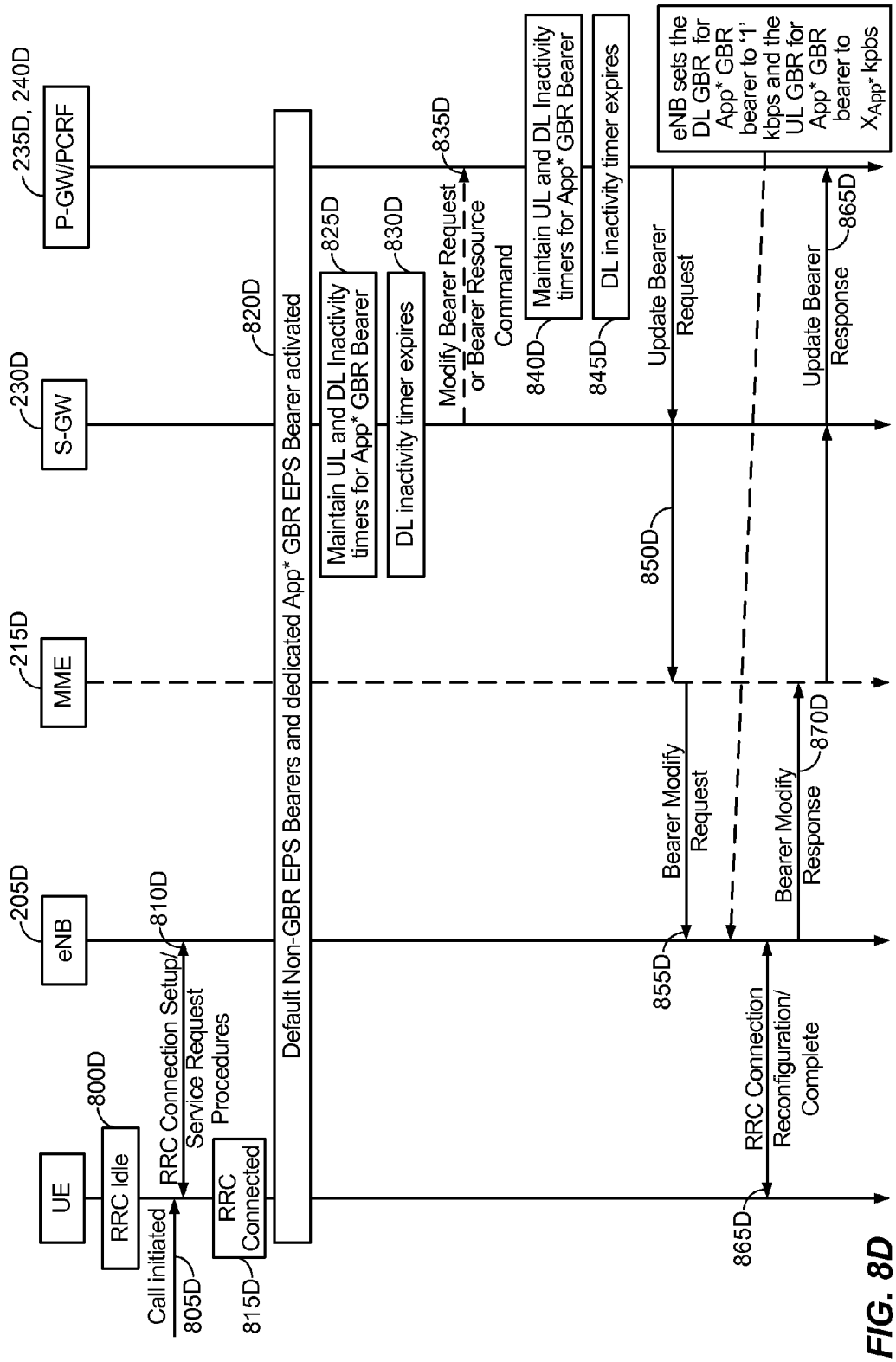
FIG. 8D illustrates an example implementation of FIG. 8B within an LTE network for a given UE that is a call originator of a half-duplex PTT session in accordance with an embodiment of the invention.

FIG. 8D illustrates an example implementation of FIG. 8B within an LTE network for a given UE that is a call originator of a half-duplex App* PTT session in accordance with an embodiment of the invention. Referring to FIG. 8D, 800D through 820D correspond to 600C through 620C from FIG. 6C, respectively. At 825D, the S-GW 230D starts and maintains UL and DL traffic inactivity timers (as in 800B through 820B of FIG. 8B). At some point, assume that the S-GW's 230D DL traffic inactivity timer expires, 830D (e.g., as in 825B of FIG. 8C). Accordingly, the S-GW 230D reduces its GBR on the App* DL GBR bearer to a nominal level, such as 1 kpbs, and notifies the P-GW/PCRF 235D/240D of the GBR reduction, 835D. At 840D, the P-GWPCRF 235D/240D starts (after the App* GBR is brought up at 820D) and maintains UL and DL traffic inactivity timers that are independent of the S-GW's 230D timers from 825D (as in 800B through 820B of FIG. 8B). At some point, assume that the DL traffic inactivity timer maintained by the P-GW/PCRF 235D/240D 225B expires, 845D (e.g., as in 825B of FIG. 8C). Accordingly, the P-GW/PCRF 235D/240D prompts the serving eNodeB 205D to reduce the GBR on the App* DL GBR bearer to a nominal level, such as 1 kpbs, via the signaling between 850D through 874D. While FIG. 8D is specific to a half-duplex PTT session, it will be readily appreciated how FIG. 8D could be modified to accommodate full-duplex sessions or half-duplex sessions other than PTT. Also, while FIG. 8D is specific to a call originator UE, it will be readily appreciated how FIG. 8D could be modified for a call target UE (e.g., instead of a PTT button push at 805D, a PTT page or call announcement message may arrive for the App* session.). Also, while FIG. 8D shows the given UE originating the App* PTT session from RCC-Idle state, the given UE could also originate the App* PTT session while already in RCC-Connected state in an alternative implementation.

Figure 9A:
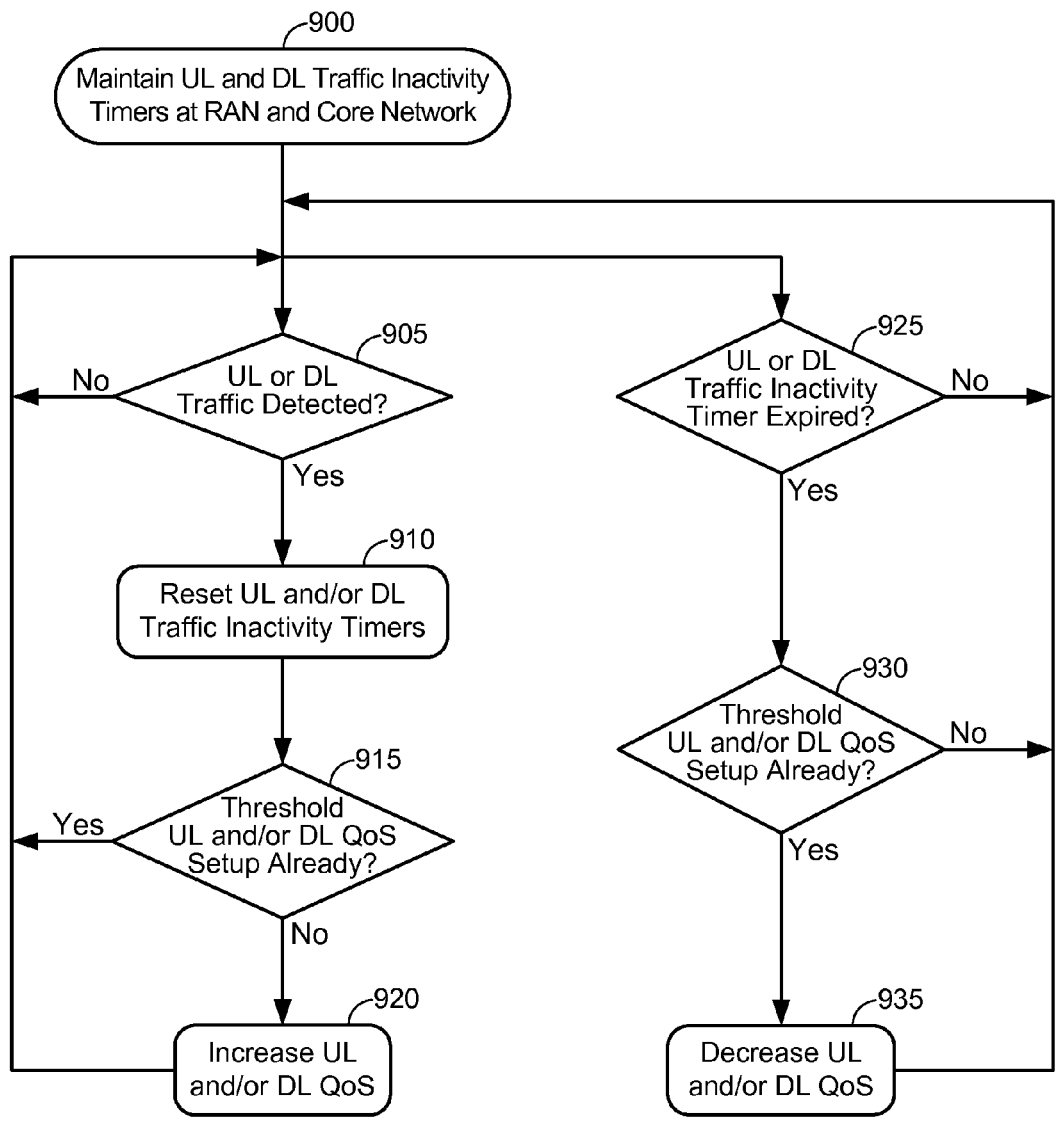
FIG. 9A illustrates a QoS management procedure whereby the GBR resources are managed locally at the RAN and the core network in accordance with an embodiment of the invention.

FIG. 9A illustrates a more detailed implementation example of a QoS management procedure whereby the GBR resources are managed locally at the RAN 120 and the core network 140 in accordance with an embodiment of the invention. As explained in Table 2 (above), the QoS management procedure whereby the GBR resources are managed locally at the RAN 120 and the core network 140 (i.e., #4 from Table 2) can be implemented in the LTE core network of FIG. 2D, but may not be capable of standard-compliant implementation in the 1x EV-DO core network of FIG. 2A, or the W-CDMA core network of FIGS. 2B-2C, or the eHRPD network of FIG. 2E.

Figure 9B:
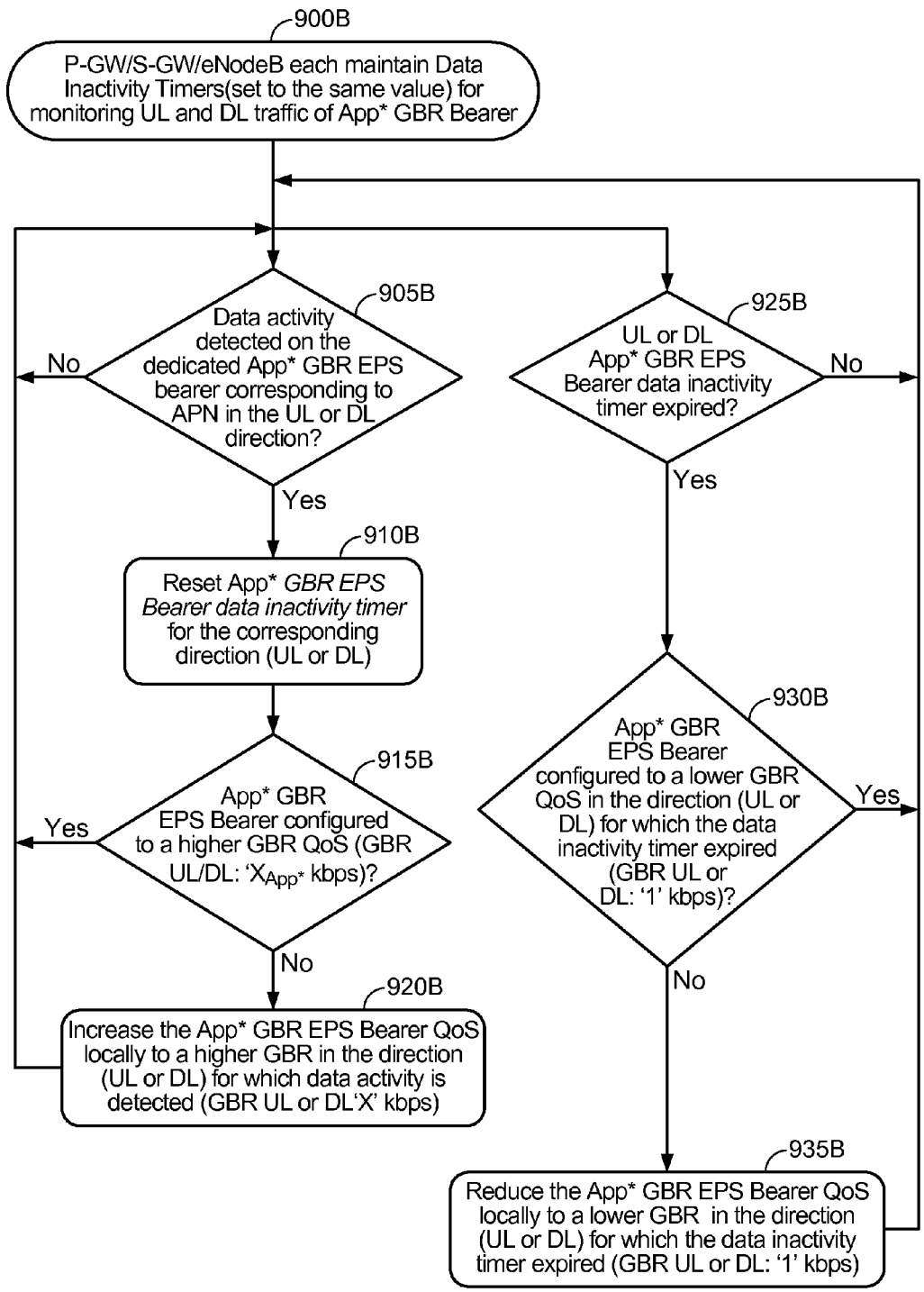
FIG. 9B illustrates an even more detailed implementation of FIG. 9A, respectively, whereby LTE-specific components and messages are referenced more explicitly in accordance with an embodiment of the invention.

Referring to FIG. 9A, in response to detection of setup of an App* GBR media bearer for an App* communication session (e.g., a half-duplex App* session, a full-duplex App* session, etc.), both the serving eNodeBs(s) within the RAN 120 for a particular UE participating in the communication session and the core network 140 (e.g., the S-GW 230D as well as the P-GW 235D) start data inactivity timers that monitor UL and DL traffic on the App* GBR media bearer, 900. Generally, FIG. 9A corresponds to an LTE implementation that is similar to FIG. 8A, except that the RAN 120 also maintains UL and DL traffic inactivity timers for controlling the QoS resources (e.g., GBR) on the UL and DL channels. In other words, the RAN 120 and the LTE core network components independently execute their respective timers and make their own GBR or QoS adjustments, such that coordination between the RAN 120 and the LTE core network (e.g., signaling messages) need not be used to implement the QoS adjustments at the different entities; i.e., each LTE component can independently or unilaterally make QoS decisions based on its own traffic inactivity timer(s). As will be appreciated, this means that each LTE component can change the GBR or QoS in an independent manner, such that the UE (or client device) to which the bearer with the adjusted QoS is assigned need not be notified of the QoS adjustment(s) implemented at the core network, although the UE would still be aware of QoS adjustment(s) implemented by the RAN 120 with respect to its air interface resources. Accordingly, aside from the dual RAN and core network implementation, 900-935 of FIG. 9A is similar to 800-835 of FIG. 8A, respectively, and will not be described further for the sake of brevity. 900B through 935B of FIG. 9B illustrates an even more detailed implementation of 900 through 935 of FIG. 9A, respectively, whereby LTE-specific components and messages are referenced more explicitly.

Figure 10A:
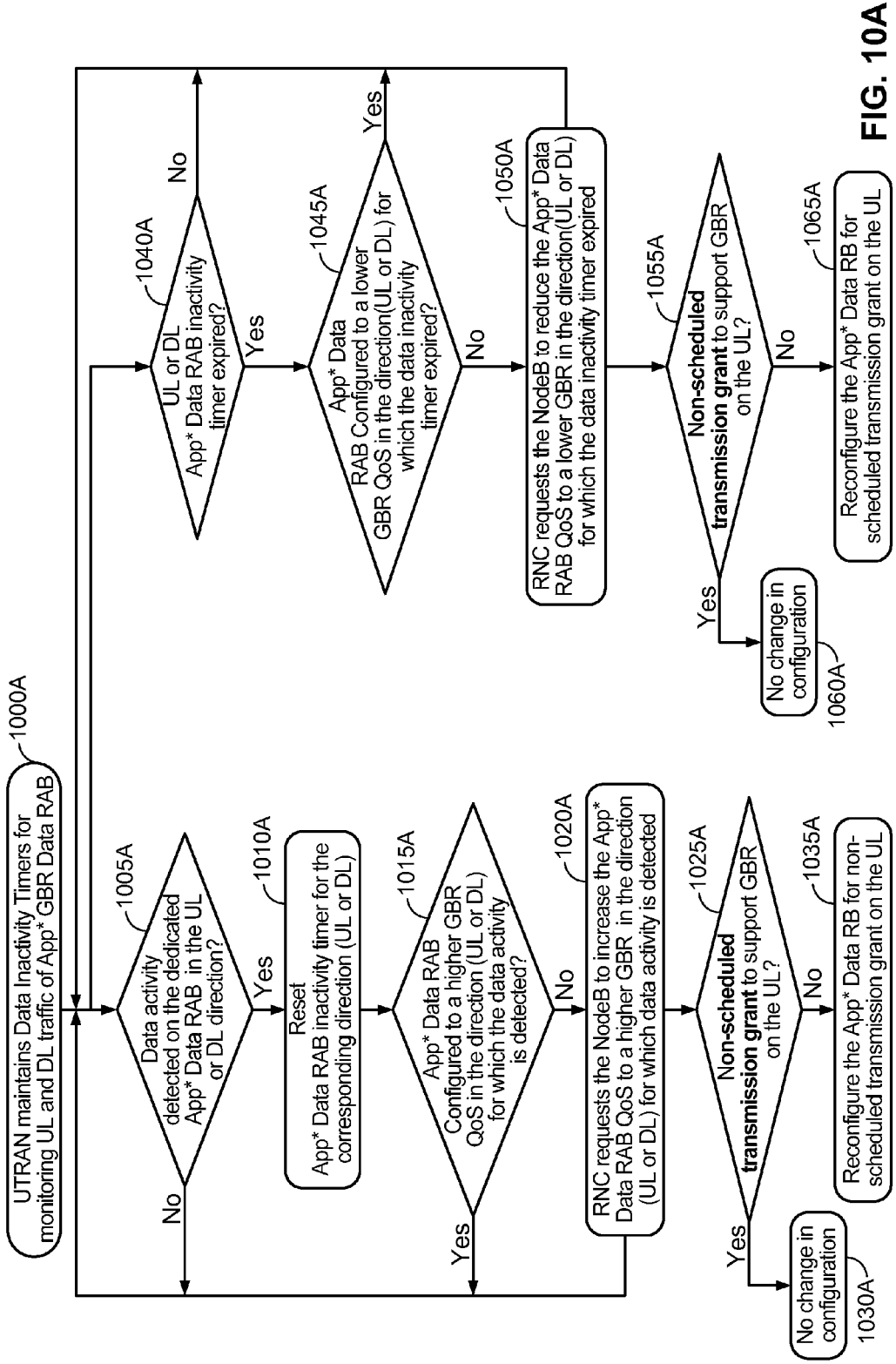
FIGS. 10A-10B illustrate RAN-initiated timer-based direction QoS flow management procedures with respect to W-CDMA and EV-DO architectures, respectively, in accordance with embodiments of the invention.
Figure 10B:
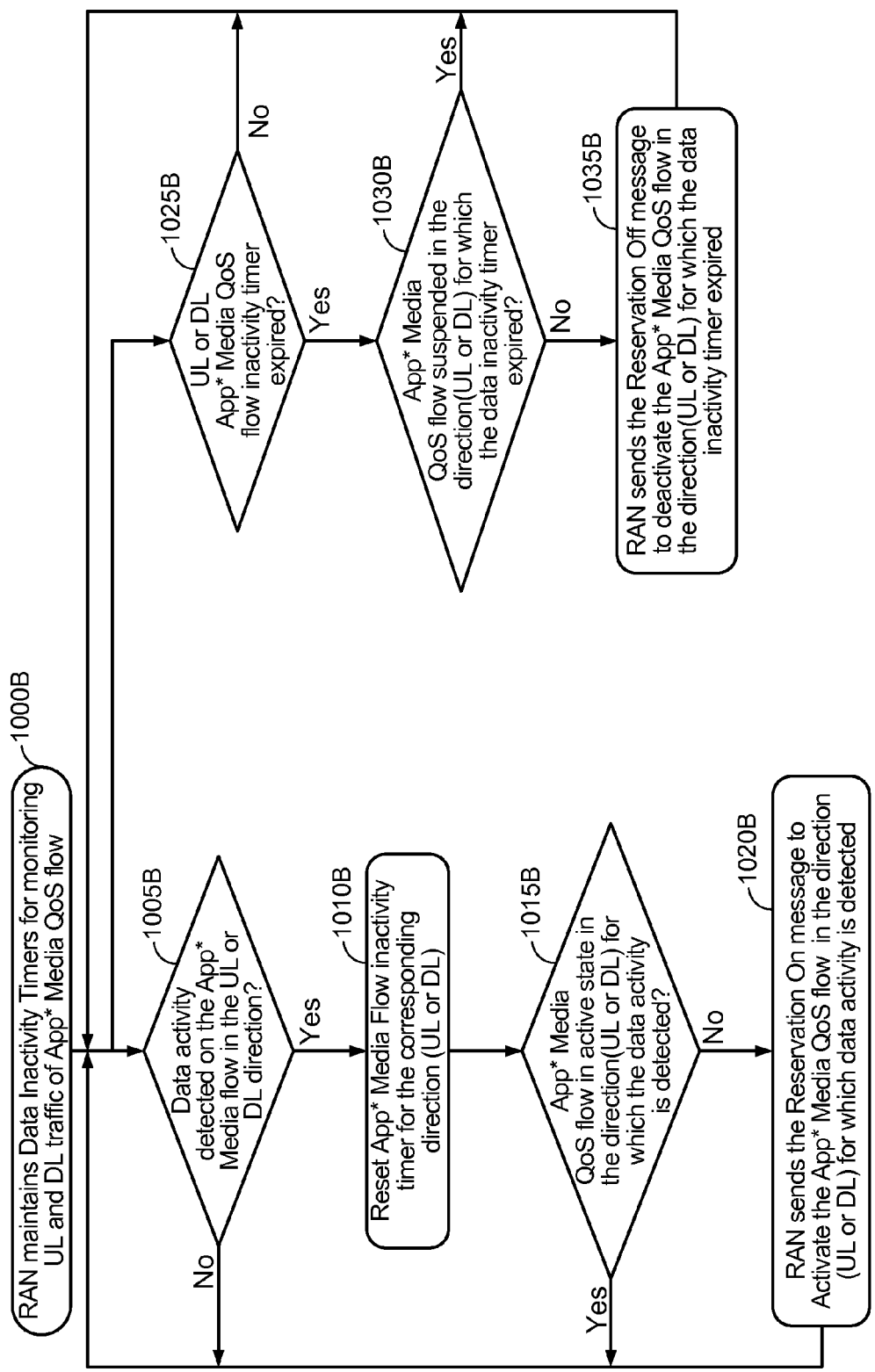

FIGS. 10A-10B illustrate RAN-initiated timer-based direction QoS flow management procedures with respect to W-CDMA and EV-DO architectures, respectively, in accordance with embodiments of the invention. As explained in Table 2 (above), the RAN-initiated timer-based direction QoS flow management procedure (i.e., #5 from Table 2) can be implemented in the W-CDMA core network of FIGS. 2B-2C (if the "Interactive" traffic class is used for the session, shown in FIG. 10A), or can be implemented in the 1x EV-DO core network of FIG. 2A (shown in FIG. 10B), but may not be capable of standard-compliant implementation in the LTE network of FIG. 2D.

Referring to FIG. 10A which describes the W-CDMA-specific implementation, in response to detection of setup of an App* data RAB for a communication session (e.g., a half-duplex App* session, a full-duplex App* session, etc.), the RAN 120 (i.e., the UTRAN) starts data inactivity timers that monitor UL and DL traffic on the App* data RAB, 1000A. In particular, the App* data RAB is configured with the "Interactive" traffic class, signaling indication ("Yes") and ARP attributes at 1000A, or alternatively the App* data RAB can be configured with the "Conversational" traffic class if the RAN 120 is capable of being reconfigured so that the GBR parameters associated with the "Conversational" traffic class can be modified.

At 1005A, the RAN 120 determines whether UL or DL traffic is detected on the App* data RAB for the communication session. In particular, the RAN 120 determines whether traffic for the App* communication session is detected in the UL or DL direction at 1005A. If UL or DL traffic is detected by the RAN 120 at 1005A, the traffic inactivity timer for each direction (UL and/or DL) on which the traffic was detected is reset, 1010A. At 1015A, for each direction (UL and/or DL) in which traffic inactivity timers are still running (i.e., not yet expired), the RAN 120 determines whether a threshold GBR is already setup for the App* data RAB in the respective direction (e.g., similar to 515, 525, 540 and 550 of FIG. 5). For example, at 1015A, the RAN 120 can check whether MAC-es/MAC-hs GBR is set to $X_{App*}$ kpbs on the UL and/or DL of the data RAB. If not, the RNC 215B requests the serving Node B(s) within the RAN 120 to increase the GBR (e.g., to $X_{App*}$ kpbs) in each direction (UL or DL) for which the associated traffic inactivity timer is still running that does not yet have the threshold GBR, 1020A. As will be appreciated, the UE can be notified with respect to the QoS adjustment (or GBR increase) of 1020A because the QoS adjustment is implemented with respect to an air interface resource (i.e., the connection between the UE and the RAN 120).

Referring to FIG. 10A, at 1025A, the RAN 120 further determines if UL data traffic is detected on the App* data RAB, the serving Node B checks whether the App* data RAB is configured with non-scheduled transmission grant to support GBR for the UL, 1025A. If so, no further action is necessary for setting up the UL GBR at the serving Node B for the App* data RAB, 1030A. If not, the serving Node B reconfigures the App* data RAB for non-scheduled transmission grant on the UL, 1035A.

Referring to FIG. 10A, the RAN 120 monitors the UL and DL traffic inactivity timers to determine whether the UL and DL traffic inactivity timers expire, 1040A. If expiration is detected at 1040A, the RAN 120 determines whether a threshold GBR is not already setup for the GBR media bearer in the respective direction for which expiration is detected, 1045A (e.g., similar to 515, 525, 540 and 550 of FIG. 5). For example, at 1045A, the RAN 120 can check whether MAC-es/MAC-hs GBR is set to $X_{App*}$ kpbs on the UL and/or DL of the App* data RAB. If the threshold GBR is not setup for the UL or DL in an expired direction, the process returns to 1005A. Otherwise, if the threshold GBR is setup for the UL or DL in an expired direction, the RNC 215B requests the serving Node B(s) within the RAN 120 to decrease the GBR (e.g., to $X_{App*}$ kpbs) in each direction (UL or DL) for which the associated traffic inactivity timer is expired and has the threshold GBR, 1050A. As will be appreciated, the UE can be notified with respect to the QoS adjustment (or GBR decrease) of 1050A because the QoS adjustment is implemented with respect to an air interface resource (i.e., the connection between the UE and the RAN 120).

Referring to FIG. 10A, at 1055A, if the UL traffic inactivity timer expires at 1040A for the data RAB, the serving Node B checks whether the App* data RAB is configured with non-scheduled transmission grant to support GBR for the UL, 1055A. If not, no further action is necessary 1060A. If so, the serving Node B reconfigures the App* data RAB for scheduled transmission grant on the UL, 1065A.

Turning to FIG. 10B which describes the 1× EV-DO-specific implementation, in response to detection of setup of a media QoS flow for an App* communication session (e.g., a half-duplex session, a full-duplex session, etc.), the RAN 120 starts data inactivity timers that monitor UL and DL traffic on the App* media QoS flow, 1000B.

At 1005B, the RAN 120 determines whether UL or DL traffic is detected on the App* media QoS flow for the communication session. If UL or DL traffic is detected by the RAN 120 at 1005B, the traffic inactivity timer for each direction (UL and/or DL) on which the traffic was detected is reset, 1010B. At 1015B, for each direction (UL and/or DL) in which traffic inactivity timers are still running (i.e., not yet expired), the RAN 120 determines whether QoS is already setup or turned on for the App* media QoS flow in the respective direction (e.g., similar to 515, 525, 540 and 550 of FIG. 5). If so, the process returns to 1005B. If not, the RAN 120 sends a ReservationOnMessage to activate the App* media QoS flow in the direction for which activity was detected, 1020B. As will be appreciated, the UE can be notified with respect to the QoS flow activation of 1020B because the QoS flow activation is implemented with respect to an air interface resource (i.e., the connection between the UE and the RAN 120).

Referring to FIG. 10B, the RAN 120 monitors the UL and DL traffic inactivity timers to determine whether the UL and DL traffic inactivity timers expire, 1025B. If expiration is detected at 1025B, the RAN 120 determines whether QoS is already setup or turned on for the App* media QoS flow in the respective direction for which expiration is detected, 1030B (e.g., similar to 515, 525, 540 and 550 of FIG. 5). If so, the process returns to 1005B. Otherwise, if the QoS is setup for the App* media QoS flow in a direction for which the associated traffic inactivity timer has expired, the RAN 120 sends a ReservationOffMessage to deactivate the media QoS flow in the direction for which expiration was detected, 1035B. As will be appreciated, the UE can be notified with respect to the QoS flow deactivation of 1035B because the QoS flow deactivation is implemented with respect to an air interface resource (i.e., the connection between the UE and the RAN 120).

The Worldwide Web Consortium (W3C) along with the Internet Engineering Task Force (IETF) started development in 2011 of a web developer technology called Web Real-Time Communication (WebRTC). WebRTC is a protocol that permits a browser (or endpoint) to engage in peer-to-peer (P2P) real-time communication with one or more other endpoints regardless of the relative location of the endpoints (e.g., whether the respective endpoints on the same device, in the same private network, both behind distinct Network Address Translation (NATs) and/or firewalls, etc.).

WebRTC leverages the Real-Time Transport Protocol (RTP) for the transmission of real-time media. RTP is a flexible protocol that can serve as a transport protocol for many different media types. These media types can be broadly classified as mapping to audio or video, or can be more specific by designating information such as an associated audio or video codec, bandwidth requirements, audio or video resolution, etc. Moreover, in a mesh conferencing model, multiple media streams may be sent P2P to enable client-based audio mixing or video compositing.

Because endpoints communicating via WebRTC can be separated by one or more NATs and/or firewalls that limit the number of end-to-end connections between the respective endpoints, WebRTC allows for multiplexing of RTP streams through a single IP address and port. Due in part to this limitation, existing WebRTC specifications recommend that multiplexing be employed for RTP and RTP control protocol (RTCP) communications. When streams of multiple types are multiplexed through one IP address and port number, offering differentiated Quality of Service (QoS) to different types of media becomes more challenging.

For example, in non-WebRTC video conferencing sessions, it is typical for the audio stream to be kept separate from the video stream, whereby the audio stream is allocated to a QoS link and the video stream is allocated to a non-QoS link. This is because the audio stream generally consumes less bandwidth than the video stream, and because the video stream can be helped by procedures such as error-concealment strategies at the receiver, use of forward error correction codes, lowering the video resolution, and so on.

A conventional approach for obtaining QoS differentiation for different media types in WebRTC is to disable multiplexing in the browser itself. However, this requires modifications to the browser, and also assumes that the browser will be capable of establishing multiple end-to-end connections (i.e., distinct IP addresses and port numbers) for the different media types.

Other conventional approaches for obtaining QoS differentiation for different media types in WebRTC is to allow 3GPP-defined QoS-enabled traffic flows to trigger off of IP-packet Differentiated Services Code Point markings (DSCP) markings or to allow 3GPP-defined QoS-enabled traffic flows to trigger off of the RTP synchronization source (SSRC). However, each of these conventional approaches changes in 3GPP standards that would affect packet filters and traffic flow templates as a result.

Yet another conventional approach is for the browser itself to leverage the above-described UE-initiated QoS feature, whereby the browser on the UE would attempt to set-up a QoS link and bypass multiplexing at least for audio media. However, this approach requires both changes to the browser as well as to the WebRTC API to permit flows to be identified by application-type for triggering the UE-initiated QoS feature.

Embodiments of the invention are directed to obtaining QoS differentiation for communication sessions that utilize WebRTC without requiring modification to a WebRTC multimedia client application (e.g., a browser) and/or to 3GPP signaling or network design. At a high-level, the embodiments of the invention described below provision the UE with a proxy module that selectively de-multiplexes certain media component(s) from a multiplexed RTP stream obtained from the WebRTC multimedia client application, and also selectively re-multiplexes incoming media into a multiplexed format that is expected by the WebRTC multimedia client application.

Figure 11:
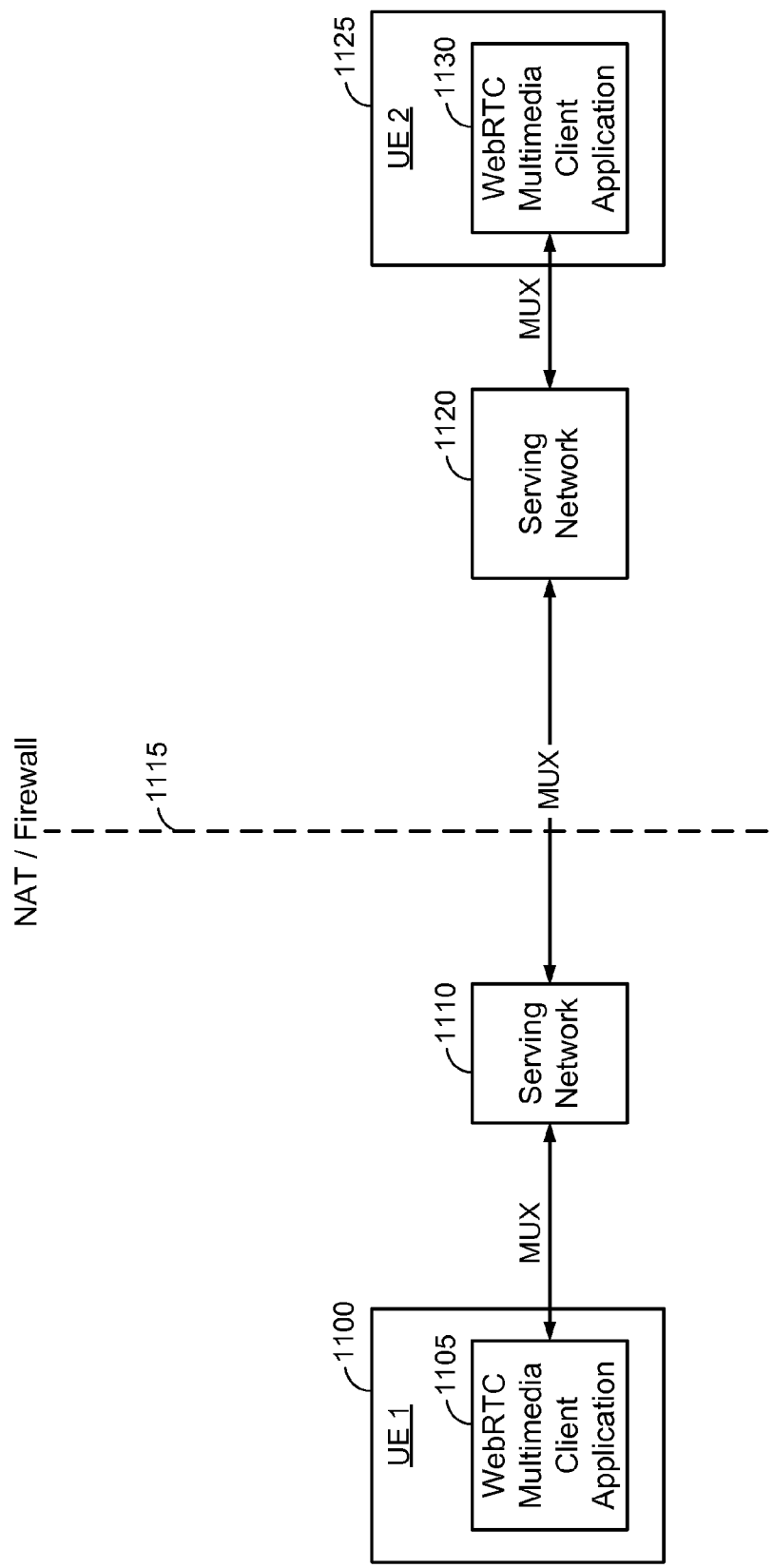
FIG. 11 illustrates a conventional flow of traffic for a Web Real-Time Communication (WebRTC) session between two UEs.

FIG. 11 illustrates a conventional flow of traffic for a WebRTC session between two UEs. Referring to FIG. 11, a first UE 1100 (or UE 1) is provisioned with a first WebRTC multimedia client application 1105, such as a mobile browsing application. The WebRTC multimedia client application 1105 multiplexes media (e.g., audio, video, etc.) into a single multiplexed stream ("MUX") for the WebRTC session, and then delivers the multiplexed stream within one or more RTP/RTPC packets to a serving network 1110 (e.g., a WiFi network, the RAN 120, etc.) via a single IP address and port number. The serving network 1110 uses NAT/firewall traversal techniques to punch through or open a connection through a NAT/firewall 1115 in order to deliver the multiplexed stream to a serving network 1120. The serving network 1120 delivers the multiplexed stream from UE 1 to a second UE 1125 (or UE 2) provisioned with a second WebRTC multimedia client application 1130, such as another mobile browsing application. As will be appreciated, because the first WebRTC multimedia client application 1105 produces MUX by default, MUX would also be used in scenarios where UEs 1 and 2 are both being served by the same serving network such that communication between UEs 1 and 2 is possible without NAT/firewall traversal.

Figure 12A:
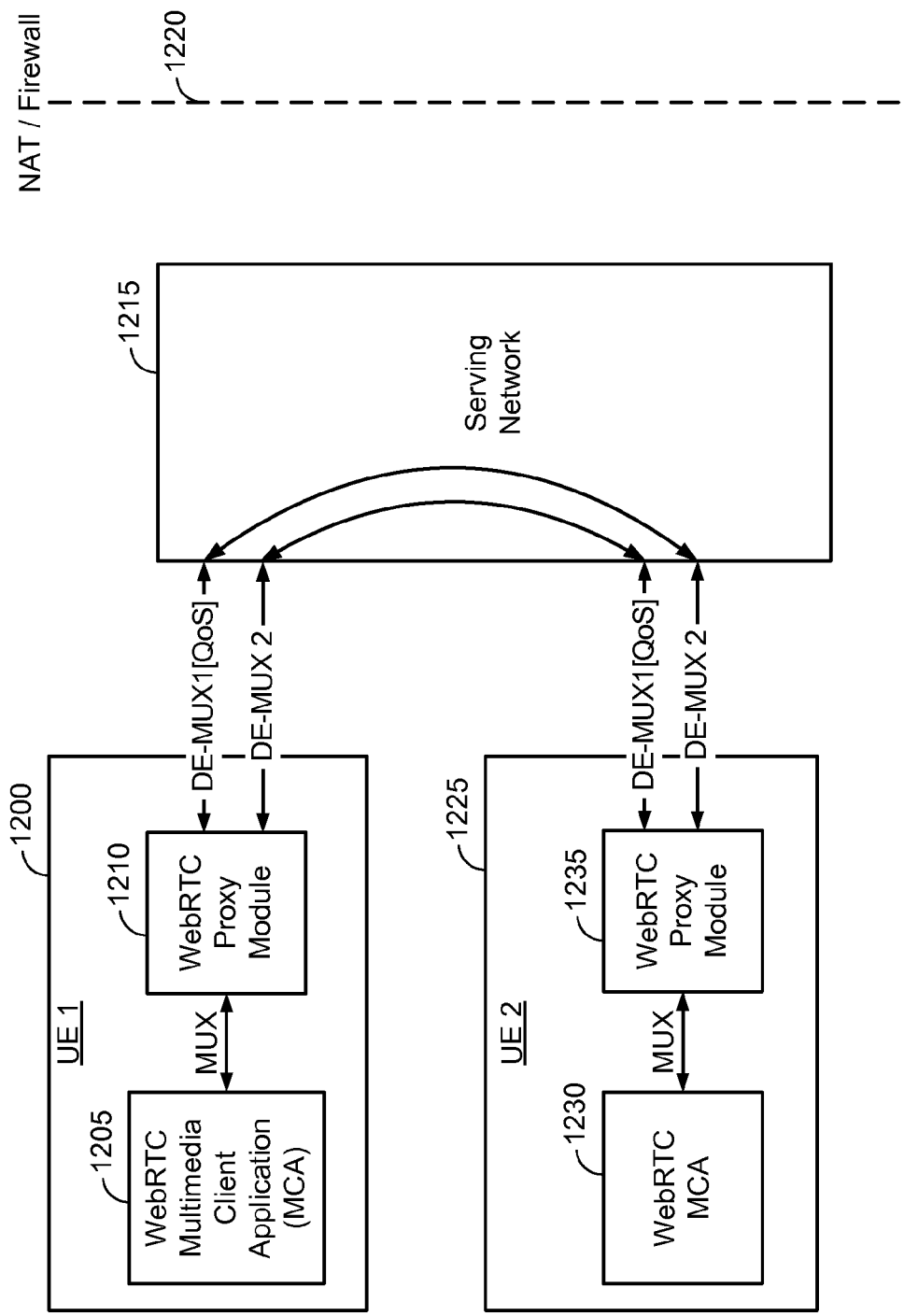
FIG. 12A illustrates a flow of traffic for a WebRTC session between two UEs that are served by the same serving network in accordance with an embodiment of the invention.

FIG. 12A illustrates a flow of traffic for a WebRTC session between two UEs that are served by the same serving network in accordance with an embodiment of the invention. Referring to FIG. 12A, a first UE 1200 (or UE 1) is provisioned with a first WebRTC multimedia client application 1205 (or first WebRTC endpoint), such as a mobile browsing application. UE 1 is also provisioned with a first WebRTC proxy module 1210. As will be described below in more detail, the first WebRTC proxy module 1210 is configured to selectively de-multiplex portions of media from the single multiplexed stream ("MUX") that the first WebRTC multimedia client application 1205 is trying to transmit, and also to "re"-multiplex multiple incoming media streams that were de-multiplexed by another WebRTC proxy module on another UE into a single multiplexed stream for delivery to the first WebRTC multimedia client application 1205.

Referring to FIG. 12A, in an example, the first WebRTC multimedia client application 1205 can be configured similarly (or even identically) to the WebRTC multimedia client application 1105 from FIG. 11. In other words, the embodiment of FIG. 12A does not strictly require any changes to existing WebRTC multimedia client applications for operation, and WebRTC endpoints can continue to operate "normally" while relying upon the WebRTC proxy module 1210 to implement the selective de-multiplexing and/or re-multiplexing of media streams for leveraging a QoS link (if available).

Accordingly, the first WebRTC multimedia client application 1205 multiplexes media (e.g., audio, video, etc.) into a single multiplexed stream ("MUX") for the WebRTC session, and attempts to transmit MUX within one or more RTP/RTPC packets to a serving network 1110 (e.g., a WiFi network, the RAN 120, etc.). However, in FIG. 12A, instead of transmitting MUX to the serving network as in FIG. 11, the WebRTC proxy module 1210 intercepts MUX for special handling (i.e., de-multiplexing).

More specifically, in FIG. 12A, it is assumed that UE 1 is able to obtain both a QoS link (e.g., via proxy-initiated, UE-initiated and/or NW-initiated QoS acquisition procedures as will be discussed below in more detail with respect to FIGS. 13-17) and a non-QoS link. As used herein, the term "non-QoS" link can refer to any connection, bearer or channel that has zero QoS (or GBR), or alternatively a connection, bearer or channel that has an "intermediate" level of QoS (or GBR) that is less than a threshold of QoS by which QoS links are defined while still being above zero (whereby the QoS link has a level of QoS that greater than or equal to the threshold).

The first WebRTC proxy module 1210 applies a set of QoS rules to identify higher-priority media that was already multiplexed into the multiplexed stream by the first WebRTC multimedia client application 1205. Table 3 (below) provides a few examples of QoS rules that can be enforced by the first WebRTC proxy module 1210 as part of a selective de-multiplexing procedure in accordance with embodiments of the invention:

TABLE 3

QoS Rule Examples for De-Multiplexing Operation at WebRTC Proxy Module

| Rule # | Media Type | QoS link or Non-QoS link? |
|---|---|---|
| 1 | Audio Media | QoS Link |
| 2 | 'Bulk' Video Media: B-Frames and/or P-Frames | Non-QoS Link |
| 3 | Non-Bulk Video Media: I-Frame or I-Slice; Header Information (e.g., macroblock (MB) type, quantization parameters and/or motion vectors); Sequence Parameter Set (SPS); Picture Parameter Set (PPS); Alternate representations of a picture frame or slice via a lower quantization size (e.g., thumbnails, etc.); and/or Lip Sync Info. | QoS Link (e.g., during period of audio silence) |
| 4 | High-Priority Non-Video File Data: Decryption Keys for a corresponding file; Header Information (e.g., file size, file type or MIME type, a thumbnail version of an image); and/or A self-contained file that is small in size and includes high-priority content | QoS Link (e.g., during period of audio silence) |
| 5 | Lower-Priority Non-Video File Data | Non-QoS Link |

With respect to Table 3 (above), it will be appreciated that certain non-audio data can be mapped to a QoS link instead of a non-QoS link based on certain rules, such as moving non-audio data to the QoS link during periods of silence or periods of audio activity if sufficient QoS is available on the QoS link, and these same rules (summarized in Table 3 above) can also be used as part of the set of QoS rules for determining which media types are de-multiplexed for transmission on the QoS link instead of the non-QoS link. Thus, the media transmitted on the QoS link does not need to be strictly limited to audio, but could include certain higher-priority types of video media and/or non-video file media as well.

Turning back to FIG. 12A, if the first WebRTC proxy module 1210 is able to identify higher-priority media present within the multiplexed stream based on the set of QoS rules, the first WebRTC proxy module 1210 de-multiplexes (or strips out) the higher-priority media (e.g., audio media and/or a limited amount of video media such as video control frames, I-frames, etc.) from lower-priority media (e.g., bulk video media, etc.). It will be appreciated that, functionally, the lower-priority media could also be stripped out (or de-multiplexed) from the multiplexed stream, so long as the first WebRTC proxy module 1210 produces a first de-multiplexed WebRTC stream ("DE-MUX1") that includes the higher-priority media and a second de-multiplexed WebRTC stream ("DE-MUX2") that includes the lower-priority media. The first WebRTC proxy module 1210 transmits DE-MUX1 to a serving network 1215 on the QoS link, and transmits DE-MUX2 to the serving network 1215 on the non-QoS link.

In a further embodiment, the de-multiplexing operation that produces DE-MUX1 and DE-MUX2 from MUX can include transcoding. If this is the case, as part of an offer/answer exchange (e.g., in 1435 of FIG. 14, 1540 of FIG. 15, etc.) a codec supported by WebRTC-enabled browsers (e.g., G.711, Opus, etc.) can be selected by the WebRTC proxy module 1210. For example, if spectral efficiency were desired, then G.711 (which is essentially companded PCM) can be selected for transcoding a spectrally-efficient narrow-band codec such AMR-NB. On the other hand, if both spectral efficiency and audio quality are desired, then one of the wideband Opus codec modes could be selected for transcoding to AMR-WB. In an example, Opus could be selected by default for VoLTE bearers if VoLTE is used to support the WebRTC session.

Referring to FIG. 12A, assume that a second UE 1225 (or UE 2) is provisioned with a second WebRTC multimedia client application 1230 (or second WebRTC endpoint) and a second WebRTC proxy module 1235, which can each be configured similarly (or even identically) to the first WebRTC multimedia client application 1205 and the first WebRTC proxy module 1210, respectively, on UE 1. Further assume that, similar to UE 1, UE 2 is able to obtain both a QoS link (e.g., via a UE-initiated or NW-initiated QoS acquisition procedure as will be discussed below in more detail with respect to FIGS. 13-17) and a non-QoS link.

In the embodiment of FIG. 12A, both UEs 1 and 2 are served by the same serving network 1215, such that DE-MUX1 and DE-MUX2 need not traverse the NAT/firewall 1220. Instead, the serving network 1215 transmits DE-MUX1 to UE 2 on UE 2's QoS link and transmits DE-MUX2 to UE 2 on UE 2's non-QoS link. The second WebRTC proxy module 1210 receives DE-MUX1 and DE-MUX2 and then "re"-multiplexes DE-MUX1 and DE-MUX2 to reconstruct or reconstitute the multiplexed stream ("MUX") that was initially provided to the first WebRTC proxy module 1210 by the first WebRTC multimedia client application 1205. In other words, the second WebRTC proxy module 1235 reverses the de-multiplexing procedure performed by the first WebRTC proxy module 1210 in order to reconstruct MUX. The second WebRTC proxy module 1235 then provides the reconstructed (or re-multiplexed) MUX to the WebRTC multimedia client application 1230.

As will be appreciated by one of ordinary skill in the art, QoS is used to transfer part of the media (e.g., audio media, higher-priority video media, etc.) for the WebRTC session in FIG. 12A in part because UEs 1 and 2 are both served by the same serving network 1215 and can obtain end-to-end QoS. This is not possible in FIG. 11, because WebRTC multimedia client applications would conventionally default to exchanging MUX without setting up QoS for any portion of the multiplexed media within MUX.

Figure 12B:
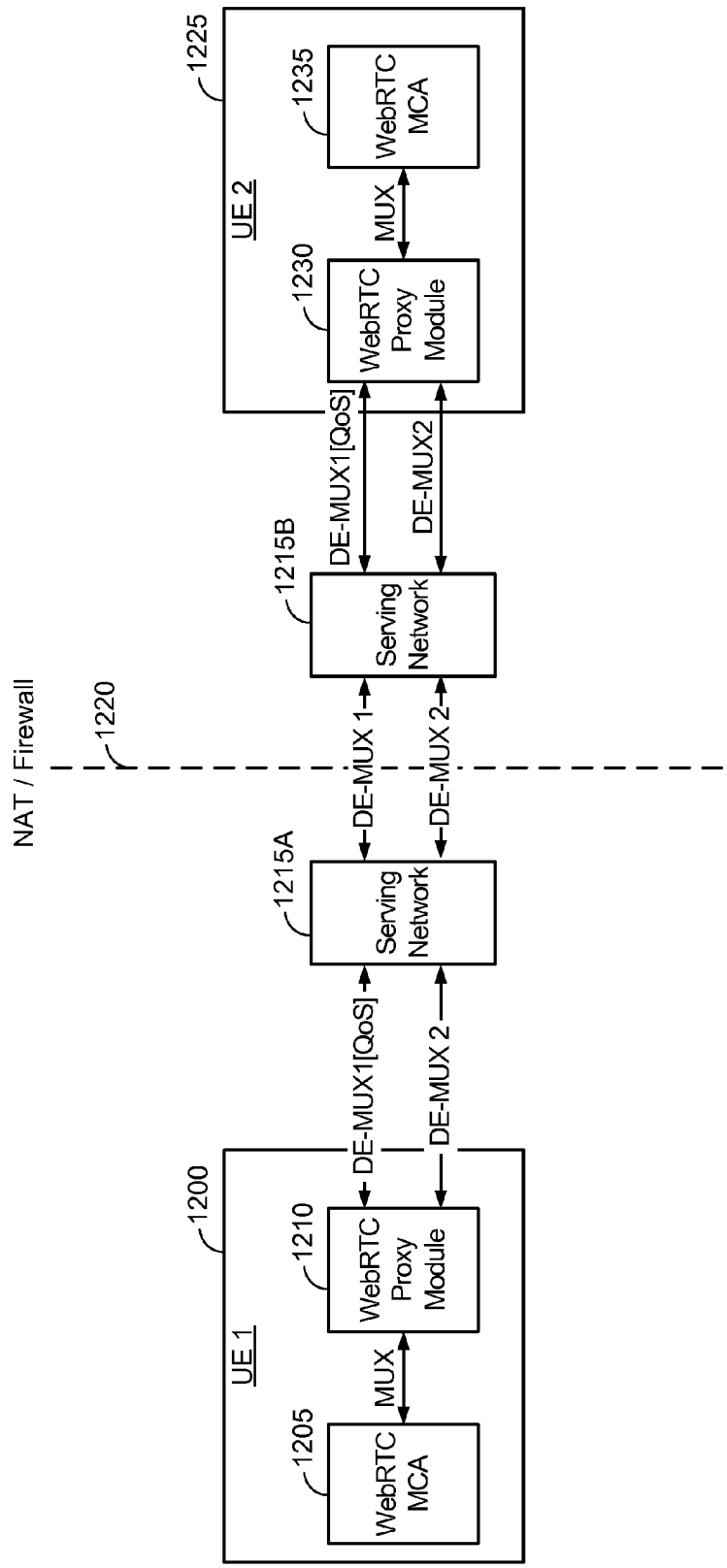
FIG. 12B illustrates a flow of traffic for a WebRTC session between two UEs that are served by different serving networks in accordance with an embodiment of the invention.

FIG. 12B illustrates a flow of traffic for a WebRTC session between two UEs that are served by different serving networks in accordance with an embodiment of the invention. FIG. 12B is similar to FIG. 12A, except that the single serving network 1215 in FIG. 12A is replaced with two distinct serving networks 1215A and 1215B which serve UEs 1 and 2, respectively, and are separated by the NAT/firewall 1220.

In FIG. 12B, the serving network 1215A does not directly transmit DE-MUX1 and/or DE-MUX2 to UE 2 because the serving network 1215A is not serving UE 2. Instead, the serving network 1215A uses NAT/firewall traversal techniques to punch through or open at least one connection through the NAT/firewall 1220 in order to deliver DE-MUX1 and DE-MUX2 to the serving network 1215B. In an example, the serving network 1215A can bundle DE-MUX1 and DE-MUX2 into a single stream so that a single IP address and port number can be used to pass both DE-MUX1 and DE-MUX2 to the serving network 1215B, whereby the serving network 1215B then de-bundles the single stream to reconstitute DE-MUX1 and DE-MUX2. Alternatively, the serving network 1215A can simply use two distinct IP addresses and port numbers for DE-MUX1 and DE-MUX2. In any case, even if QoS is unavailable over the trunk from the serving network 1215A to the serving network 1215B, QoS is at least obtained within the serving networks so that a portion of the end-to-end WebRTC media transfer is allocated QoS.

The serving network 1215B transmits DE-MUX1 to UE 2 on UE 2's QoS link and transmits DE-MUX2 to UE 2 on UE 2's non-QoS link. The second WebRTC proxy module 1210 receives DE-MUX1 and DE-MUX2 and then "re"-multiplexes DE-MUX1 and DE-MUX2 to reconstruct or reconstitute the multiplexed stream ("MUX") that was initially provided to the first WebRTC proxy module 1210 by the first WebRTC multimedia client application 1205. In other words, the second WebRTC proxy module 1235 reverses the de-multiplexing procedure performed by the first WebRTC proxy module 1210 in order to reconstruct MUX (e.g., either the original version of MUX or a different version of MUX, such as a compressed or reduced-resolution version of MUX including compressed versions of some or all of the media components from the original MUX, etc.). The second WebRTC proxy module 1235 then provides the reconstructed (or re-multiplexed) MUX to the WebRTC multimedia client application 1230.

The de-multiplexing and re-multiplexing operations described with respect to the WebRTC streams of FIGS. 12A-12B are based upon UEs 1 and 2 being able to obtain a QoS link to carry the higher-priority de-multiplexed WebRTC flow, or DE-MUX1. In FIGS. 12A-12B, it is simply assumed that the QoS link is available, but typically, the WebRTC multimedia client application does not attempt to acquire QoS for MUX, in part because MUX includes components that typically would not receive QoS such as bulk video content and also because the WebRTC multimedia client application does not even necessarily have the capacity to identify the QoS resources available at its respective UE.

Figure 13:
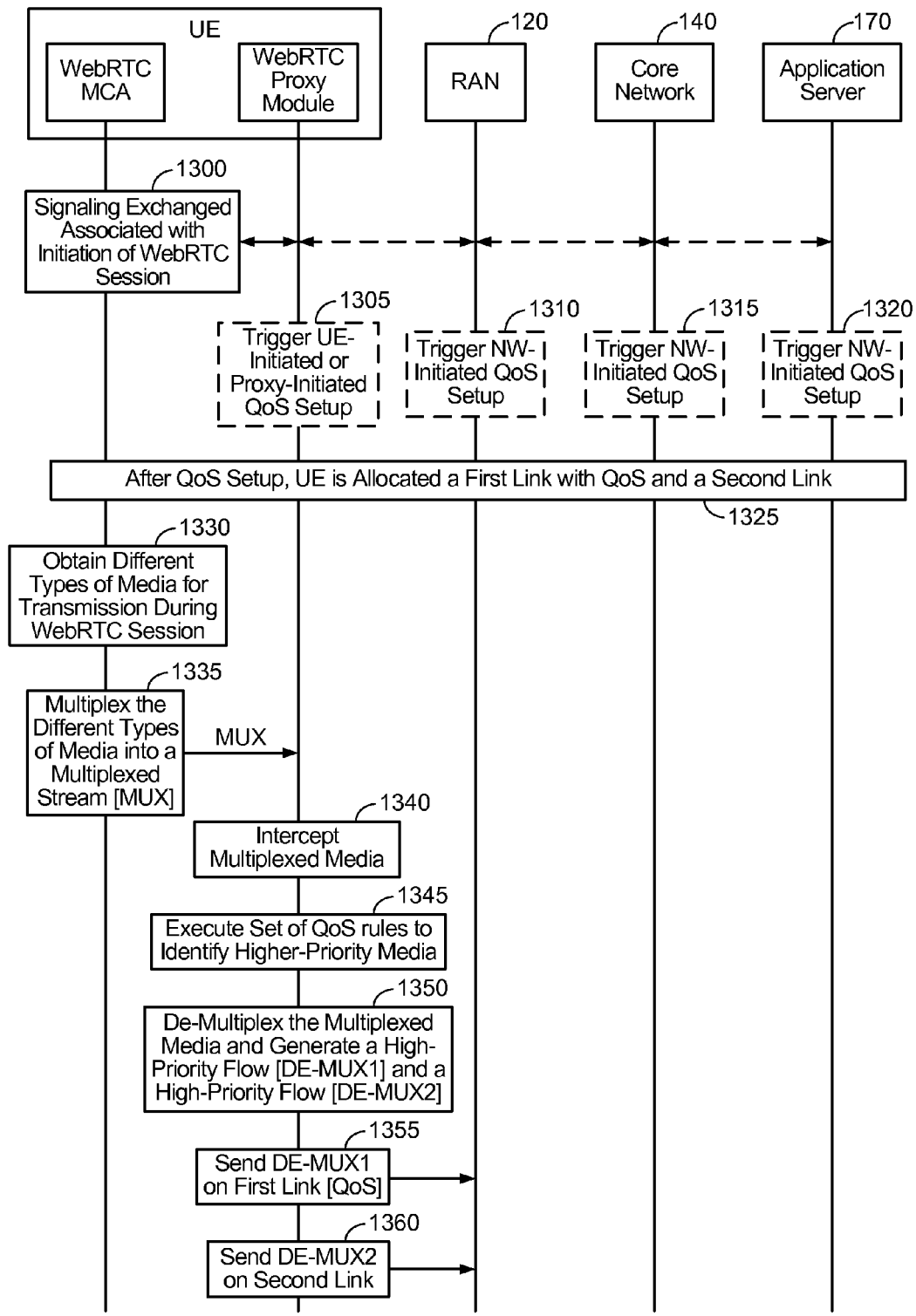
FIG. 13 illustrates a process of setting up a QoS link for the WebRTC session followed by de-multiplexing at the source UE in the WebRTC session in accordance with an embodiment of the invention.

With this in mind, FIGS. 13-17 illustrate processes of selectively establishing QoS for a WebRTC session in conjunction with the de-multiplexing and/or re-multiplexing operations described above in accordance with embodiments of the invention. In particular, FIG. 13 illustrates a high-level process of setting-up a QoS link for the WebRTC session followed by de-multiplexing at the source UE in the WebRTC session in accordance with an embodiment of the invention.

With respect to FIG. 13, signaling is exchanged between a WebRTC multimedia client application (e.g., either the first WebRTC multimedia client application 1205 or the second WebRTC multimedia client application 1230 from FIG. 12A or FIG. 12B) provisioned at a given UE, a WebRTC proxy module provisioned at the given UE, the RAN 120 that is serving the given UE, the core network 140 and/or the application server 170 that indicates initiation or potential initiation of a WebRTC session involving the given UE, 1300. Based on the signaling from 1300, the WebRTC proxy module on the given UE, the RAN 120, the core network 140 and/or the application server 170 initiate a QoS setup procedure for allocating a QoS link to the given UE at 1305, 1310, 1315 or 1320, respectively.

In an example, in 1300, the WebRTC session may be originated by the given UE, in which case the signaling of 1300 can include a session initiation message that is generated by the WebRTC multimedia client application and intercepted by the WebRTC proxy module for UE-initiated QoS at 1305. In this case, 1305 is somewhat similar to the UE-initiated QoS procedures described above with respect to FIGS. 5-6C, and is described in more detail below specifically with respect to the WebRTC de-multiplexing implementation in FIG. 14. Alternatively, the UE-initiated QoS procedure of 1305 can be implemented in a scenario where the WebRTC session is originated by a different UE. In this case, a session announcement message for the WebRTC session and/or a session acceptance message transmitted by the WebRTC multimedia client application can be used by the WebRTC proxy module at the given UE for triggering the UE-initiated QoS procedure.

In a further example, 1305 need not be implemented as a UE-initiated QoS procedure whereby the given UE triggers the RAN 120 and/or the core network 140 to set-up QoS on its behalf. Instead, in another LTE-specific embodiment, the WebRTC proxy module can instead negotiate an end-to-end VoLTE connection if the other endpoint is VoLTE compatible and/or is executing its own WebRTC proxy module. Establishing end-to-end VoLTE connections in this manner restricts the flexibility of QoS bearer negotiation for WebRTC, but also obviates the need to implement UE-initiated and/or NW-initiated QoS procedures. As used herein, an end-to-end VoLTE implementation for QoS setup is referred to as a "proxy-initiated" QoS procedure.

In another example, in 1300, the WebRTC session may be originated by the given UE, in which case the signaling of 1300 can include a session initiation message that is generated by the WebRTC multimedia client application and intercepted by the WebRTC proxy module. The WebRTC proxy module then sends a message to the application server 170 to prompt the application server 170 to implement a NW-initiated QoS procedure at 1320 that results in the given UE being allocated the QoS link. In this case, 1320 is somewhat similar to the server-based NW-initiated QoS procedures described above with respect to FIGS. 7A-7C, and is described in more detail below specifically with respect to the WebRTC de-multiplexing implementation in FIG. 15. Alternatively, the server-based NW-initiated QoS procedure of 1320 can be implemented in a scenario where the WebRTC session is originated by a different UE. In this case, a session announcement message for the WebRTC session and/or a session acceptance message transmitted by the WebRTC multimedia client application can be used by the WebRTC proxy module at the given UE for triggering the message to the application server 170 that prompts the application server 170 to start the server-based NW-initiated QoS procedure.

In another example, in 1300, irrespective of whether the given UE is the originator of the WebRTC session, the RAN 120 and/or the core network 140 can evaluate application-identifying information and/or can perform deep-packet inspection for triggering the NW-initiated QoS procedure at 1310 and/or 1315. For example, the WebRTC session can be interpreted as an App* session, which triggers QoS setup at the RAN 120 and/or the core network as described above with respect to FIGS. 8A-10B. In another example, any of the WebRTC traffic can be inspected via deep-packet inspection by the RAN 120 and/or the core network 140. In this case, if the RAN 120 and/or core network 140 identify the session as involving WebRTC, the RAN 120 and/or core network 140 can trigger the NW-initiated QoS procedure for allocating the QoS link to the given UE. The aspects of 1310 and 1315 are somewhat similar to the NW-initiated QoS procedures described above with respect to FIGS. 8A-10B, and are described in more detail below specifically with respect to the WebRTC de-multiplexing implementation in FIG. 16.

Accordingly, after 1305, 1310, 1315 and/or 1320 are implemented, the given UE is allocated both a QoS link and a non-QoS link, 1325. The WebRTC multimedia client application obtains different types (e.g., audio, video, etc.) of media for transmission during the WebRTC session, 1330, and the WebRTC multimedia client application multiplexes the different types of media into a multiplex stream ("MUX"), 1335. While attempting to transmit MUX, MUX is instead intercepted by the WebRTC proxy module on the given UE, 1340. The WebRTC proxy module executes the set of QoS rules described above to identify higher-priority media (e.g., audio media, a limited amount of video media, etc.) that is contained within MUX, 1345. The WebRTC proxy module then de-multiplexes the higher-priority media identified at 1345 to generate a first de-multiplexed WebRTC stream ("DE-MUX1") that includes the higher-priority media and a second de-multiplexed WebRTC stream ("DE-MUX2") that includes any remaining lower-priority media, 1350. The WebRTC proxy module transmits DE-MUX1 to the RAN 120 over the QoS link, 1355, and the WebRTC proxy module also transmits DE-MUX2 to the RAN 120 on the non-QoS link, 1360. While not shown explicitly in FIG. 13, DE-MUX1 and DE-MUX2 can then be conveyed to a target UE (not shown in FIG. 13) as in FIGS. 12A-12B and also described in more detail below with respect to FIG. 17.

Figure 14:
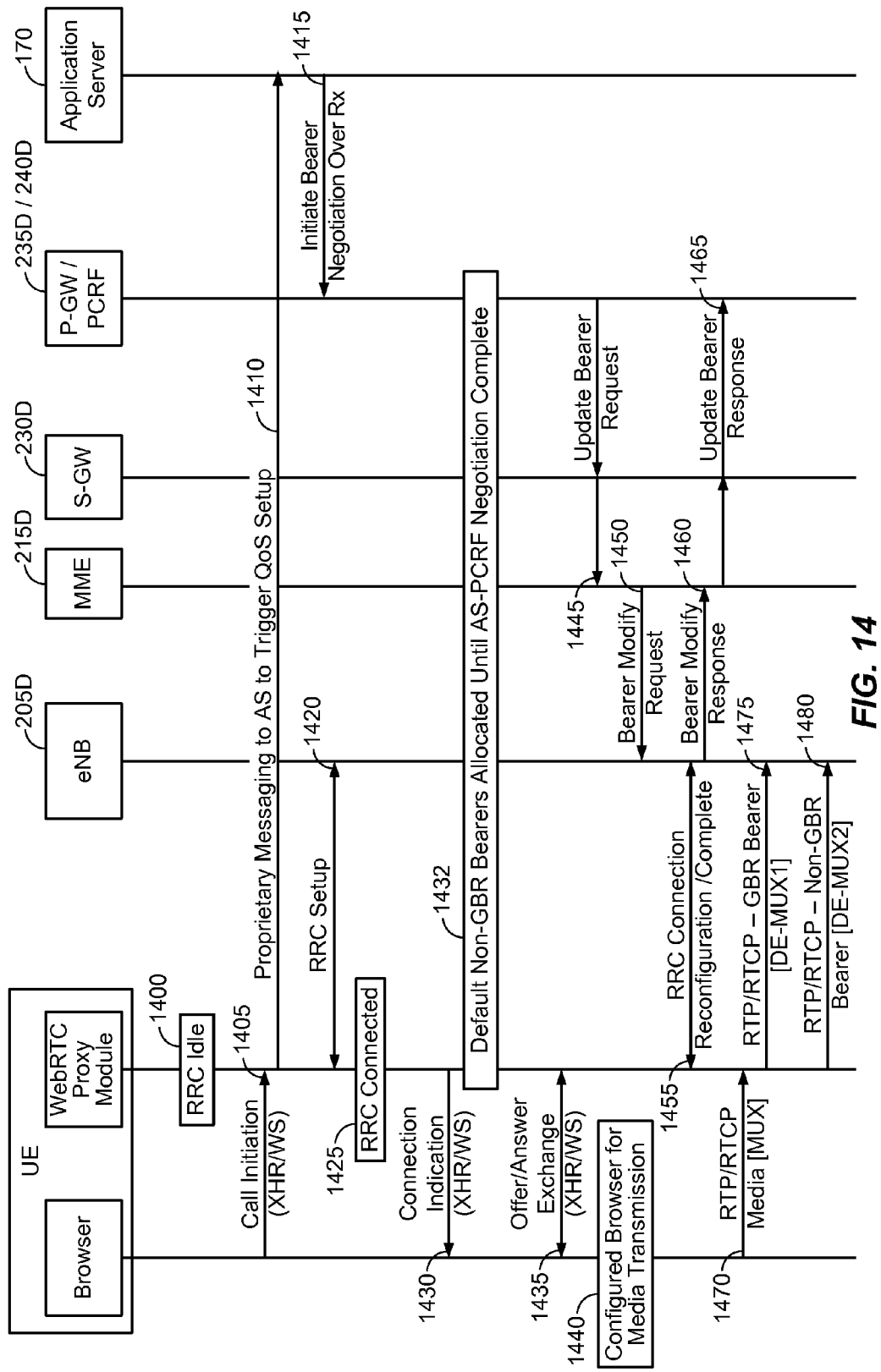
FIG. 14 illustrates an LTE-specific implementation of the process of FIG. 13 based on a server-based NW-initiated QoS procedure for a UE-originated WebRTC session in accordance with an embodiment of the invention.

FIG. 14 illustrates an LTE-specific implementation of the process of FIG. 13 based on a server-based NW-initiated QoS procedure for a UE-originated WebRTC session in accordance with an embodiment of the invention.

Referring to FIG. 14, the given UE is in an RRC-Idle state, 1400, when a WebRTC web browsing application ("browser") on the given UE sends a Call Initiation message that is intercepted by the WebRTC proxy module, 1405. Receipt of the Call Initiation message triggers the WebRTC proxy module to send a proprietary message to the application server 170 to request that the application server 170 trigger a NW-initiated QoS procedure, 1410. In response to the proprietary message, the application server 170 initiates bearer negotiation over an Rx connection to the P-GW 235D and PCRF 240D, 1415.

Turning back to the given UE, receipt of the Call Initiation message also triggers the given UE to perform an RRC setup procedure for transitioning the given UE from the RRC-Idle state to the RRC-Connected state, 1420. When the RRC setup completes at 1420 such that the given UE enters an RRC-Connected state, 1425, and the WebRTC proxy module delivers a Connection Indication to the browser, 1430. At this point, the given UE has a non-GBR bearer (i.e., the non-QoS link) but does not yet have the QoS link because the bearer negotiation has not yet completed, 1432. The browser and WebRTC proxy module execute an offer/answer exchange, 1435 (e.g., whereby the WebRTC proxy module can select a transcoding codec to be used for DE-MUX1 and/or DE-MUX2), after which the browser begins to configure media for transmission during the WebRTC session, 1440.

Turning back to the network, the P-GW 235D sends an update bearer request to the MME 215D, 1445, the MME 215D sends a bearer modify request to the eNB 205D, 1450, which prompts the eNB 205D and the given UE to reconfigure the RRC connection, 1455 (e.g., RRC Connection Reconfiguration/Complete). The eNB 205D then transmits a bearer modify response back to the MME 215D, and the MME 215D transmits an update bearer response back to the P-GW 235D. While triggered differently, 1445-1465 are somewhat similar to 725C-750C of FIG. 7C. Also, if the WebRTC session is an App* session, the GBR established for the GBR bearer can be configured as in 735C of FIG. 7C with a QoS configuration that is specific for App* (or in this case, WebRTC).

After obtaining the GBR bearer (or QoS link) via the signaling of 1445-1465, the browser begins to send MUX (e.g., a stream of RTP/RTCP packets with multiplexed media components for transmission) to the WebRTC proxy module, 1470, the WebRTC proxy module de-multiplexes MUX to generate DE-MUX1 and DE-MUX2 and then transmits DE-MUX1 on the GBR bearer, 1475, and transmits DE-MUX2 on the non-GBR bearer, 1480.

Figure 15:
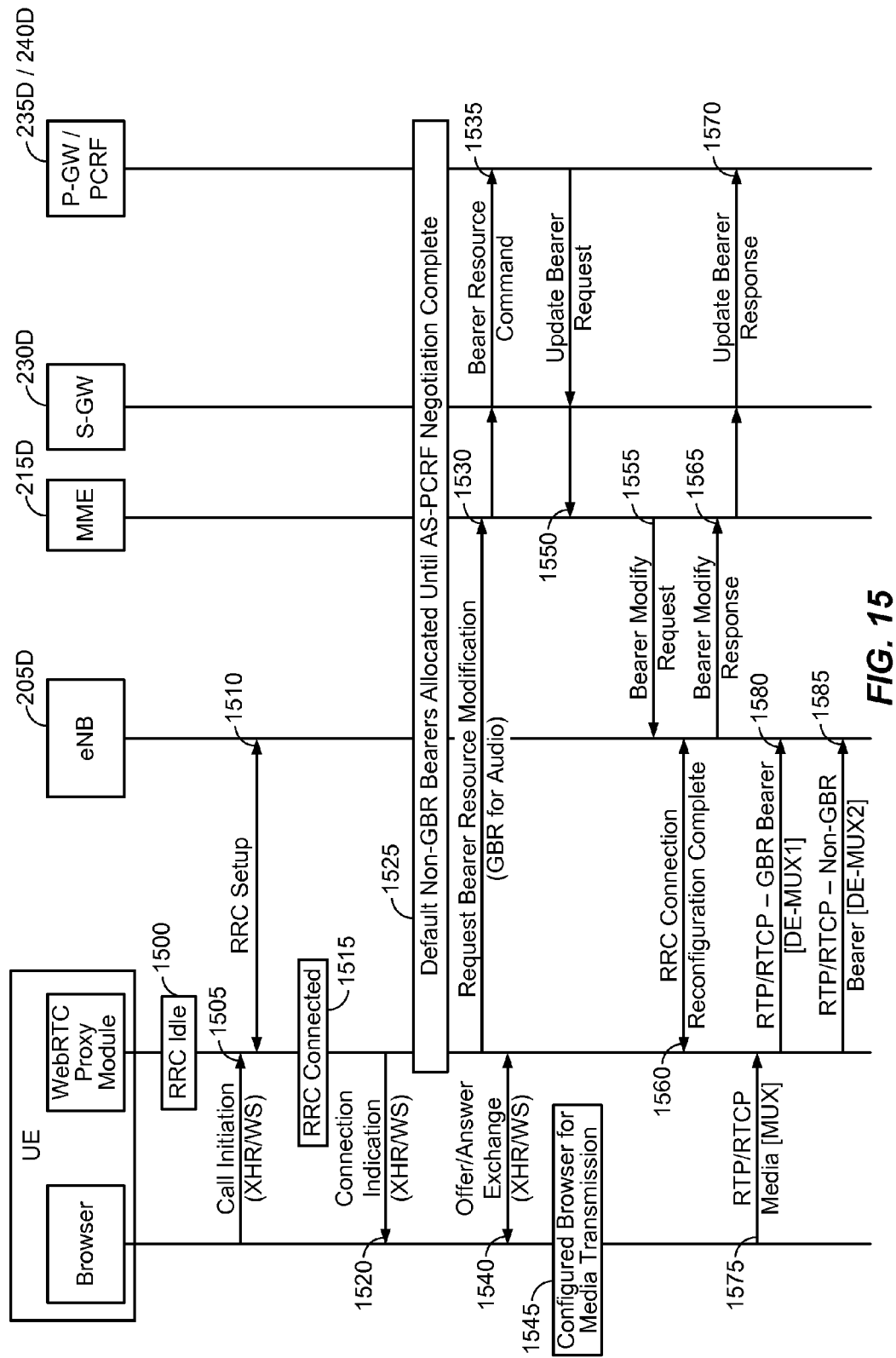
FIG. 15 illustrates an LTE-specific implementation of the process of FIG. 13 based on a UE-initiated QoS procedure in accordance with an embodiment of the invention.

FIG. 15 illustrates an LTE-specific implementation of the process of FIG. 13 based on a UE-initiated QoS procedure in accordance with an embodiment of the invention.

Referring to FIG. 15, the given UE is in an RRC-Idle state, 1500, when a WebRTC web browsing application ("browser") on the given UE sends a Call Initiation message that is intercepted by the WebRTC proxy module, 1505. The Call Initiation message triggers the given UE to perform an RRC setup procedure for transitioning the given UE from the RRC-Idle state to the RRC-Connected state, 1510. When the RRC setup completes at 1510, the given UE enters an RRC-Connected state, 1515, and the WebRTC proxy module delivers a Connection Indication to the browser, 1520. At this point, the given UE has a non-GBR bearer (i.e., the non-QoS link) but does not yet have the QoS link because the bearer negotiation has not yet completed, 1525.

In the embodiment of FIG. 15, the WebRTC proxy module determines to execute a UE-initiated QoS procedure to obtain a QoS link. In an example, the UE-initiated QoS procedure can be used as a fallback mechanism if a NW-initiated QoS procedure as in FIG. 14 fails to obtain the QoS link. For example, while not shown in FIG. 15, the WebRTC proxy module can send the proprietary message as in 1410 of FIG. 14 and then start a timer, and if the QoS link is not obtained prior to expiration of the timer, the WebRTC proxy module can then execute the UE-initiated QoS procedure. Alternatively, the WebRTC proxy module can automatically determine to execute the UE-initiated QoS procedure without waiting to first attempt the NW-initiated QoS procedure based on the session-type being WebRTC.

In any case, irrespective of how the WebRTC proxy module reaches the decision to implement the UE-initiated QoS procedure, the UE-initiated QoS procedure is implemented by transmitting a Request Bearer Resource Modification message from the given UE to the MME 215D via the eNB 205D, 1530. The Request Bearer Resource Modification message of 1530 is configured to request the GBR bearer for an audio media component of the WebRTC session (e.g., and potentially other media components as well, such as a limited amount of video media and/or file content). The MME 215D receives the Request Bearer Resource Modification message and delivers a Bearer Resource Command to the P-GW 235D via the S-GW 230D, 1535. At this point, 1540-1585 substantially correspond 1435-1480 of FIG. 14, respectively, except that 1540-1585 is triggered by a message delivered by the given UE to the LTE core network 140, whereas 1435-1480 is triggered by a message delivered by the application server 170 to the LTE core network 140.

Figure 16:
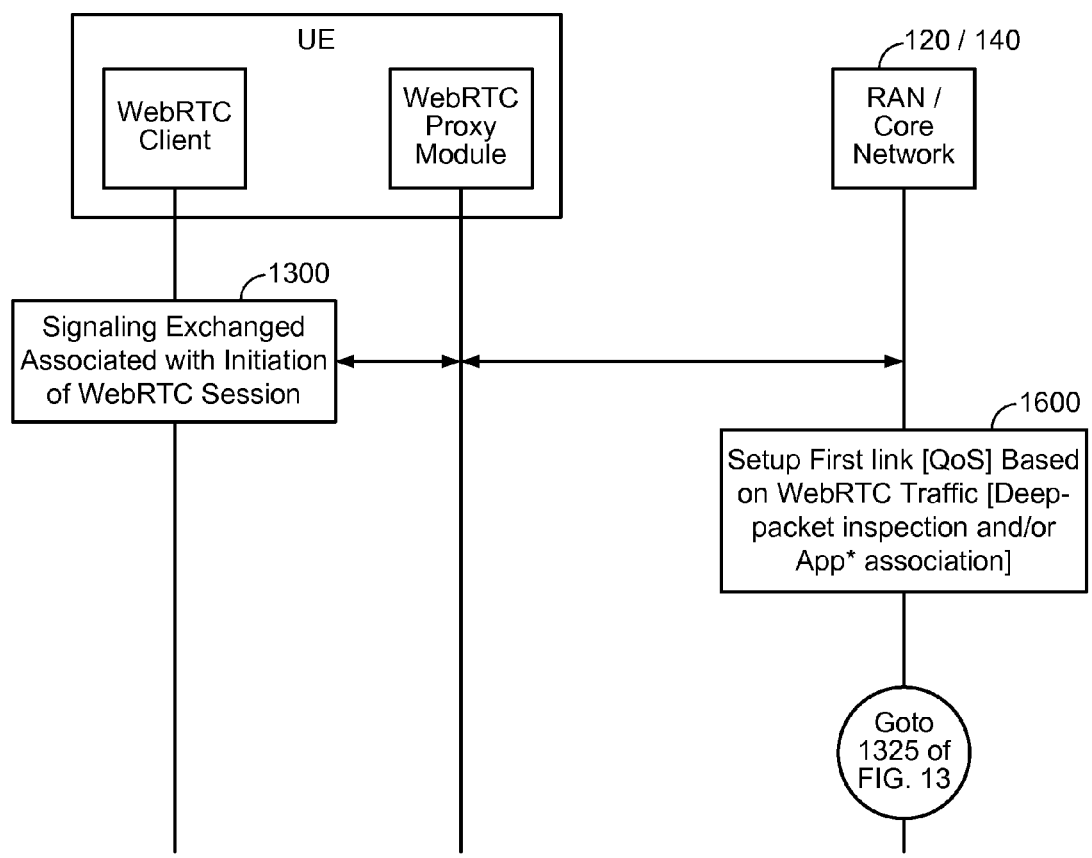
FIG. 16 illustrates an example implementation of a portion of the process of FIG. 13 based on another NW-initiated QoS procedure in accordance with an embodiment of the invention.

FIG. 16 illustrates an example implementation of a portion of the process of FIG. 13 based on another NW-initiated QoS procedure in accordance with an embodiment of the invention. Referring to FIG. 16, based on the signaling exchanged at 1300 of FIG. 13, the RAN 120 and/or core network 140 triggers setup of the QoS link for the given UE without an explicit request to do so provided from the application server 170 (as in FIG. 14) or the given UE itself (as in FIG. 15). Instead, the RAN 120 and/or the core network 140 evaluate the signaling itself to detect whether the RAN 120 and/or core network 140 should preemptively setup the QoS link on behalf of the given UE, 1600 (e.g., similar to 1310 and/or 1315 of FIG. 13).

In particular, the RAN 120 and/or the core network 140 can identify that the session being established is WebRTC, and this identification can prompt the RAN 120 and/or the core network 140 to trigger the NW-initiated QoS procedure. The identification of the session as being a WebRTC session can be performed in a number of ways. For example, the WebRTC application can correspond to App*, which is described above in detail, such that the WebRTC nature of the session can be identified based on application-identifying information (e.g., the APN, etc.). In another example, the RAN 120 and/or the core network 140 can perform deep-packet inspection on one or more signaling packets being exchanged during setup of the WebRTC session, and the deep-packet inspection may be used to infer that the session is a WebRTC session. The signaling evaluated at 1600 can be associated with uplink and/or downlink signaling traffic.

Figure 17:
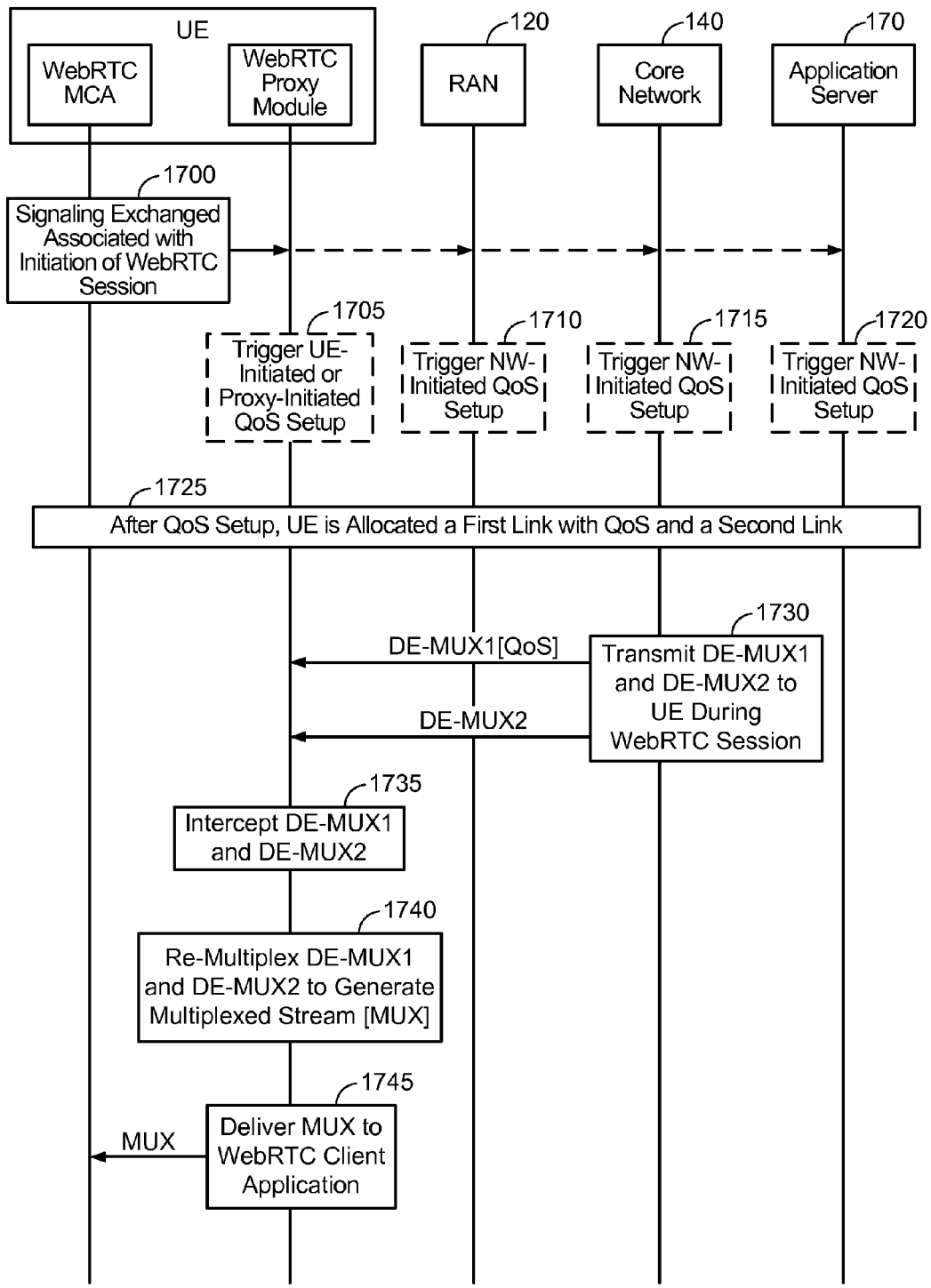
FIG. 17 is directed to a high-level process of setting up a QoS link for the WebRTC session followed by re-multiplexing at the target UE in the WebRTC session in accordance with an embodiment of the invention.

While FIG. 13 focuses on the de-multiplexing that occurs at the source UE in the WebRTC session, FIG. 17 is directed to a high-level process of setting up a QoS link for the WebRTC session followed by re-multiplexing at the target UE in the WebRTC session. Of course, a UE in the WebRTC can be both a source UE and a target UE for a bidirectional or two-way media session, such that the processes of FIGS. 13 and 17 can be implemented in parallel at both the source and target UEs.

Referring to FIG. 17, 1700-1725 correspond to 1300-1325 and will not be described further for the sake of brevity. After 1725, the core network 140 obtains DE-MUX1 and DE-MUX2 from another UE (e.g., served by the same core network 140 as in FIG. 12A or a different serving network as in FIG. 12B). At 1730, the core network 140 transmits via the RAN 120, DE-MUX1 to the given UE on the QoS link and DE-MUX2 to the given UE on the non-QoS link, 1730. The WebRTC proxy module intercepts DE-MUX1 and DE-MUX2 prior to their delivery to the WebRTC multimedia client application, 1735, and the WebRTC proxy module re-multiplexes DE-MUX1 and DE-MUX2 to reconstruct MUX, 1740. To put another way, as described above, the WebRTC proxy module on the reconstructs MUX by reversing the de-multiplexing performed by the WebRTC proxy module on the other UE to re-obtain MUX as initially prepared by the WebRTC multimedia client application on the other UE. The WebRTC proxy module then delivers MUX to the WebRTC multimedia client application on the given UE, 1745.

Further, while FIGS. 14-16 describe detailed implementations of the process of FIG. 13 with respect to how the QoS link is established for the given UE in a "de"-multiplexing context, it will be appreciated that these same QoS setup procedures can be used in context with FIG. 17 with respect to a "re"-multiplexing context. In other words, the QoS link established between 1700-1725 can be setup via a server-based NW-initiated QoS procedure as in FIG. 14, a UE-initiated QoS procedure as in FIG. 15 and/or by a NW-initiated QoS procedure that is independent of a server-based trigger as in FIG. 16. Also, as noted above, the same UE can perform the processes of both FIG. 13 and FIG. 17 in parallel, such that the WebRTC proxy module provisioned at the given UE can be responsible for de-multiplexing an outgoing MUX as in FIG. 13 while also re-multiplexing incoming de-multiplexed stream in order to reconstruct an incoming MUX from another UE as in FIG. 17.

Further, while the embodiments of FIGS. 12A-17 refer to an "original" or "source" MUX and a "re-multiplexed" or "reconstructed" MUX, it will be appreciated that the original and reconstructed versions of MUX can be identical or alternatively can be somewhat different (e.g., the reconstructed MUX may be compressed so as to have a lower resolution for certain media components as compared to the original MUX due to transcoding or other factors, etc.).

Further, while the embodiments of FIGS. 12A-17 generally refer to two (2) de-multiplexed streams (i.e., DE-MUX1 and DE-MUX2), it will be appreciated that other embodiments can be directed to three (3) or more de-multiplexed streams (e.g., DE-MUX3, DE-MUX4, etc.), depending on the number of available QoS and/or non-QoS links. For example, if the UE has access to a first QoS link with high QoS, a second QoS link with low QoS and a non-QoS link, the WebRTC proxy module can generate DE-MUX1 with high-priority media, DE-MUX2 with intermediate-priority media and DE-MUX3 with low-priority media. The WebRTC proxy module can then send DE-MUX1 on the first QoS link, DE-MUX2 on the second QoS link and DE-MUX3 on the non-QoS link, and so on.

In a further example, the QoS link can correspond to a first set of links and the non-QoS link can correspond to a second set of links. The first set of links can include one or more QoS links, and the second set of links can include one or more non-QoS links. Each link in the first set of links can carry a DE-MUX stream, and each link in the second set of links can also carry a DE-MUX stream. Generally, higher-priority media is transported via the DE-MUX stream(s) on the first set of links, while lower-priority media is transported via the DE-MUX stream(s) on the second set of links. Thus, in scenarios where the UE has access to multiple QoS links and/or multiple non-QoS links, the UE can leverage these multiple links to send multiple DE-MUX streams (or even the same DE-MUX stream redundantly). Thereby, the embodiments are not limited to a single DE-MUX stream being sent on the QoS link and a single DE-MUX stream being sent on the non-QoS link when additional links (QoS and/or non-QoS) are available. In particular, additional de-multiplexed media components from MUX can be carried on any of the aforementioned 'extra' DE-MUX streams. Likewise, at the target UE, any of the 'extra' DE-MUX streams can be re-multiplexed along with DE-MUX1 and DE-MUX2 to reconstruct MUX.

In another embodiment of the invention, it is possible for browser-originated multimedia traffic to not be multiplexed, or to be partially multiplexed. In other words, the output from the WebRTC multimedia client application need not be MUX, but could be non-MUX1 and non-MUX2 (i.e., two non-multiplexed RTP streams), MUX1 and MUX2 (e.g., two partially multiplexed RTP streams), or non-MUX1 and MUX1 (e.g., a non-multiplexed RTP stream and a multiplexed RTP stream). In these cases, the WebRTC proxy module can still handle the mapping of the respective RTP streams to the non-QoS and QoS links. As an example, assume a multiparty video call where the browser sends/receives audio traffic over one RTP stream, and also sends/receives multiple video tracks over another RTP stream (where the video tracks would be unique to each participant in the call). The WebRTC proxy module may be aware that the UE has access to both QoS and non-QoS links, but the browser (or WebRTC multimedia client application) does not necessarily have the ability to detect this information. Thus, the WebRTC multimedia client applications can RTP streams that do not require de-multiplexing while the WebRTC proxy module, instead of performing a de-multiplexing operation, simply maps the respective RTP streams to the appropriate link (i.e., the QoS link or the non-QoS link).

While the embodiments above have been described primarily with reference to 1× EV-DO architecture in CDMA2000 networks, GPRS architecture in W-CDMA or UMTS networks and/or EPS architecture in LTE-based networks, it will be appreciated that other embodiments can be directed to other types of network architectures and/or protocols.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of operating a Web Real-Time Communication (WebRTC) proxy module at a user equipment (UE) that is engaged in a WebRTC session, comprising:
    obtaining a first set of links with each link in the first set of links being allocated at least a threshold level of Quality of Service (QoS) and a second set of links that is different than the first set of links;
    obtaining, during the WebRTC session, a multiplexed stream from a WebRTC multimedia client application that the WebRTC multimedia client application is attempting to deliver to a target WebRTC multimedia client application on a target UE, the multiplexed stream including at least a first media component and a second media component;
    de-multiplexing the multiplexed stream to generate a first de-multiplexed stream that includes the first media component and a second de-multiplexed stream that includes the second media component;
    transmitting the first de-multiplexed stream to a serving network on a first link from the first set of links for delivery to the target UE; and
    transmitting the second de-multiplexed stream to the serving network on a second link from the second set of links for delivery to the target UE.

2. The method of claim 1, wherein each link in the second set of links is allocated either zero QoS or an intermediate level of QoS that is greater than zero QoS and is less than the threshold level of QoS.

3. The method of claim 2, wherein at least one link in the second set of links is allocated zero QoS.

4. The method of claim 2, wherein at least one link in the second set of links is allocated the intermediate level of QoS.

5. The method of claim 2,
    wherein the threshold level of QoS includes at least a given Guaranteed Bit Rate (GBR) for each link in the first set of links,
    wherein each link in the second set of links has zero GBR and/or a GBR that is lower than the given GBR.

6. The method of claim 1, wherein the first set of links includes only the first link and the second set of links includes only the second link.

7. The method of claim 1,
    wherein the first set of links includes the first link and at least one additional link,
    wherein the second set of links includes only the second link,
    wherein the multiplexed stream further includes at least one additional media component and the de-multiplexing further de-multiplexes the multiplexed stream to generate at least one additional de-multiplexed stream that includes the at least one additional media component, further comprising:
    transmitting the at least one additional de-multiplexed stream to the serving network on the at least one additional link from the first set of links for delivery to the target UE.

8. The method of claim 1,
    wherein the second set of links includes the second link and at least one additional link, wherein the first set of links includes only the first link,
wherein the multiplexed stream further includes at least one additional media component and the de-multiplexing further de-multiplexes the multiplexed stream to generate at least one additional de-multiplexed stream that includes the at least one additional media component, further comprising:
transmitting the at least one additional de-multiplexed stream to the serving network on the at least one additional link from the second set of links for delivery to the target UE.

9. The method of claim 1,
wherein the first set of links includes the first link and at least one additional link,
wherein the second set of links includes the second link and one or more additional links,
wherein the multiplexed stream further includes at least one additional media component and the de-multiplexing further de-multiplexes the multiplexed stream to generate at least one additional de-multiplexed stream that includes the at least one additional media component,
wherein the multiplexed stream further includes one or more additional media components and the de-multiplexing further de-multiplexes the multiplexed stream to generate one or more additional de-multiplexed streams that include the one or more additional media components, further comprising:
transmitting the at least one additional de-multiplexed stream to the serving network on the at least one additional link from the first set of links for delivery to the target UE; and
transmitting the one or more additional de-multiplexed streams to the serving network on the one or more additional links from the second set of links for delivery to the target UE.

10. The method of claim 1, wherein the first media component includes audio media for the WebRTC session and the second media component includes video media for the WebRTC session.

11. The method of claim 1, wherein the first media component includes audio media and higher-priority video media for the WebRTC session and the second media component includes lower-priority video media for the WebRTC session.

12. The method of claim 1,
wherein the UE and the target UE are each served by the serving network, and
wherein an end-to-end connection between the UE and the target UE does not traverse inter-network Network Address Translation (NAT) and/or an inter-network firewall based on the UE and the target UE each being served by the serving network.

13. The method of claim 1,
wherein the target UE is served by another serving network that is different than the serving network serving the UE, and
wherein an end-to-end connection between the UE and the target UE traverses inter-network Network Address Translation (NAT) and/or an inter-network firewall based on the UE and the target UE being served by different serving networks.

14. A method of operating a Web Real-Time Communication (WebRTC) proxy module at a user equipment (UE) that is engaged in a WebRTC session, comprising:
obtaining a first set of links with each link in the first set of links being allocated at least a threshold level of Quality of Service (QoS) and a second set of links that is different than the first set of links;
receiving, during the WebRTC session, a first stream from a serving network on a first link from the first set of links and a second stream from the serving network on a second link from the second set of links, the first and second streams including de-multiplexed portions of a multiplexed stream that a source WebRTC multimedia client application at a source UE is attempting to deliver to a WebRTC multimedia client application on the UE;
re-multiplexing the first and second streams to produce a reconstructed version of the multiplexed stream; and
delivering the re-multiplexed stream to the WebRTC multimedia client application.

15. The method of claim 14, wherein each link in the second set of links is allocated either zero QoS or an intermediate level of QoS that is greater than zero QoS and is less than the threshold level of QoS.

16. The method of claim 15, wherein at least one link in the second set of links is allocated zero QoS.

17. The method of claim 15, wherein at least one link in the second set of links is allocated the intermediate level of QoS.

18. The method of claim 15,
wherein the threshold level of QoS includes at least a given Guaranteed Bit Rate (GBR) for each link in the first set of links,
wherein each link in the second set of links has zero GBR and/or a GBR that is lower than the given GBR.

19. The method of claim 14, wherein the first set of links includes only the first link and the second set of links includes only the second link.

20. The method of claim 14,
wherein the first set of links includes the first link and at least one additional link,
wherein the second set of links includes only the second link,
further comprising:
receiving at least one additional stream from the serving network on the at least one additional link, the at least one additional stream including at least one additional de-multiplexed portion from the multiplexed stream,
wherein the re-multiplexing re-multiplexes the at least one additional stream along with the first and second streams to produce the reconstructed version of the multiplexed stream.

21. The method of claim 14,
wherein the second set of links includes the second link and at least one additional link,
wherein the first set of links includes only the first link,
further comprising:
receiving at least one additional stream from the serving network on the at least one additional link, the at least one additional stream including at least one additional de-multiplexed portion from the multiplexed stream,
wherein the re-multiplexing re-multiplexes the at least one additional stream along with the first and second streams to produce the reconstructed version of the multiplexed stream.

22. The method of claim 14,
wherein the first set of links includes the first link and at least one additional link,
wherein the second set of links includes the second link and one or more additional links,
further comprising:
receiving at least one additional stream from the serving network on the at least one additional link, the at least one additional stream including at least one additional de-multiplexed portion from the multiplexed stream; and receiving one or more additional streams from the serving network on the one or more additional links, the one or more additional streams including one or more additional de-multiplexed portions from the multiplexed stream, wherein the re-multiplexing re-multiplexes the at least one additional stream and the one or more additional streams along with the first and second streams to produce the reconstructed version of the multiplexed stream.

23. The method of claim 14, wherein the first stream includes audio media for the WebRTC session and the second stream includes video media for the WebRTC session.

24. The method of claim 14, wherein the first stream includes audio media and higher-priority video media for the WebRTC session and the second stream includes lower-priority video media for the WebRTC session.

25. The method of claim 14,
wherein the UE and the source UE are each served by the serving network, and
wherein an end-to-end connection between the UE and the source UE does not traverse inter-network Network Address Translation (NAT) and/or an inter-network firewall based on the UE and the source UE each being served by the serving network.

26. The method of claim 14,
wherein the source UE is served by another serving network that is different than the serving network serving the UE, and
wherein an end-to-end connection between the UE and the source UE traverses inter-network Network Address Translation (NAT) and/or an inter-network firewall based on the UE and the source UE being served by different serving networks.

27. The method of claim 14, wherein the reconstructed version of the multiplexed stream is identical to the multiplexed stream generated by the source WebRTC multimedia client application.

28. The method of claim 14, wherein the reconstructed version of the multiplexed stream is modified from the multiplexed stream generated by the source WebRTC multimedia client application.

29. The method of claim 28, wherein the reconstructed version is compressed and/or is configured with a lower resolution relative to the multiplexed stream generated by the source WebRTC multimedia client application.

30. A user equipment (UE) configured to execute a Web Real-Time Communication (WebRTC) proxy module that is engaged in a WebRTC session, comprising:
means for obtaining a first set of links with each link in the first set of links being allocated at least a threshold level of Quality of Service (QoS) and a second set of links that is different than the first set of links;
means for obtaining, during the WebRTC session, a multiplexed stream from a WebRTC multimedia client application that the WebRTC multimedia client application is attempting to deliver to a target WebRTC multimedia client application on a target UE, the multiplexed stream including at least a first media component and a second media component;
means for de-multiplexing the multiplexed stream to generate a first de-multiplexed stream that includes the first media component and a second de-multiplexed stream that includes the second media component;
means for transmitting the first de-multiplexed stream to a serving network on a first link from the first set of links for delivery to the target UE; and
means for transmitting the second de-multiplexed stream to the serving network on a second link from the second set of links for delivery to the target UE.

31. A user equipment (UE) configured to execute a Web Real-Time Communication (WebRTC) proxy module that is engaged in a WebRTC session, comprising:
means for obtaining a first set of links with each link in the first set of links being allocated at least a threshold level of Quality of Service (QoS) and a second set of links that is different than the first set of links;
means for receiving, during the WebRTC session, a first stream from a serving network on a first link from the first set of links and a second stream from the serving network on a second link from the second set of links, the first and second streams including de-multiplexed portions of a multiplexed stream that a source WebRTC multimedia client application at a source UE is attempting to deliver to a WebRTC multimedia client application on the UE;
means for re-multiplexing the first and second streams to produce a reconstructed version of the multiplexed stream; and
means for delivering the re-multiplexed stream to the WebRTC multimedia client application.

32. A user equipment (UE) configured to execute a Web Real-Time Communication (WebRTC) proxy module that is engaged in a WebRTC session, comprising:
a processor, memory and/or transceiver configured to:
obtain a first set of links with each link in the first set of links being allocated at least a threshold level of Quality of Service (QoS) and a second set of links that is different than the first set of links;
obtain, during the WebRTC session, a multiplexed stream from a WebRTC multimedia client application that the WebRTC multimedia client application is attempting to deliver to a target WebRTC multimedia client application on a target UE, the multiplexed stream including at least a first media component and a second media component;
de-multiplex the multiplexed stream to generate a first de-multiplexed stream that includes the first media component and a second de-multiplexed stream that includes the second media component;
transmit the first de-multiplexed stream to a serving network on a first link from the first set of links for delivery to the target UE; and
transmit the second de-multiplexed stream to the serving network on a second link from the second set of links for delivery to the target UE.

33. A user equipment (UE) configured to execute a Web Real-Time Communication (WebRTC) proxy module that is engaged in a WebRTC session, comprising:
a processor, memory and/or transceiver configured to:
obtain a first set of links with each link in the first set of links being allocated at least a threshold level of Quality of Service (QoS) and a second set of links that is different than the first set of links;
receive, during the WebRTC session, a first stream from a serving network on a first link from the first set of links and a second stream from the serving network on a second link from the second set of links, the first and second streams including de-multiplexed portions of a multiplexed stream that a source WebRTC multimedia client application at a source UE is attempting to deliver to a WebRTC multimedia client application on the UE;

re-multiplex the first and second streams to produce a reconstructed version of the multiplexed stream; and deliver the re-multiplexed stream to the WebRTC multimedia client application.

34. A non-transitory computer-readable medium containing instructions stored thereon, which, when executed by a user equipment (UE) configured to execute a Web Real-Time Communication (WebRTC) proxy module that is engaged in a WebRTC session, cause the UE to perform operations, the instructions comprising:

at least one instruction to cause the UE to obtain a first set of links with each link in the first set of links being allocated at least a threshold level of Quality of Service (QoS) and a second set of links that is different than the first set of links;

at least one instruction to cause the UE to obtain, during the WebRTC session, a multiplexed stream from a WebRTC multimedia client application that the WebRTC multimedia client application is attempting to deliver to a target WebRTC multimedia client application on a target UE, the multiplexed stream including at least a first media component and a second media component;

at least one instruction to cause the UE to de-multiplex the multiplexed stream to generate a first de-multiplexed stream that includes the first media component and a second de-multiplexed stream that includes the second media component;

at least one instruction to cause the UE to transmit the first de-multiplexed stream to a serving network on a first link from the first set of links for delivery to the target UE; and at least one instruction to cause the UE to transmit the second de-multiplexed stream to the serving network on a second link from the second set of links for delivery to the target UE.

35. A non-transitory computer-readable medium containing instructions stored thereon, which, when executed by a user equipment (UE) configured to execute a Web Real-Time Communication (WebRTC) proxy module that is engaged in a WebRTC session, cause the UE to perform operations, the instructions comprising:

at least one instruction to cause the UE to obtain a first set of links with each link in the first set of links being allocated at least a threshold level of Quality of Service (QoS) and a second set of links that is different than the first set of links;

at least one instruction to cause the UE to receive, during the WebRTC session, a first stream from a serving network on a first link from the first set of links and a second stream from the serving network on a second link from the second set of links, the first and second streams including de-multiplexed portions of a multiplexed stream that a source WebRTC multimedia client application at a source UE is attempting to deliver to a WebRTC multimedia client application on the UE;

at least one instruction to cause the UE to re-multiplex the first and second streams to produce a reconstructed version of the multiplexed stream; and at least one instruction to cause the UE to deliver the re-multiplexed stream to the WebRTC multimedia client application.

* * * * *